United States Patent
Piao et al.

(10) Patent No.: US 12,167,017 B2
(45) Date of Patent: Dec. 10, 2024

(54) MOTION INFORMATION ENCODING APPARATUS AND METHOD, AND MOTION INFORMATION DECODING APPARATUS AND METHOD FOR HIGH-RESOLUTION OR STEREOSCOPIC IMAGES

(71) Applicant: SAMSUNG ELECTRONICS CO., LTD., Suwon-si (KR)

(72) Inventors: Yinji Piao, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 17/698,638

(22) Filed: Mar. 18, 2022

(65) Prior Publication Data

US 2022/0210461 A1    Jun. 30, 2022

Related U.S. Application Data

(63) Continuation of application No. PCT/KR2020/012643, filed on Sep. 18, 2020.
(Continued)

(51) Int. Cl.
H04N 19/513    (2014.01)
H04N 19/44    (2014.01)

(52) U.S. Cl.
CPC .......... *H04N 19/513* (2014.11); *H04N 19/44* (2014.11)

(58) Field of Classification Search
None
See application file for complete search history.

(56) References Cited

U.S. PATENT DOCUMENTS 10,218,998 B2    2/2019    Lee et al.
2013/0272377 A1*    10/2013    Karczewicz ............ H03M 7/30
                                                  341/51
(Continued)

FOREIGN PATENT DOCUMENTS

KR    10-2007-0076391 A    7/2007
KR    10-1441874 B1    9/2014
(Continued)

OTHER PUBLICATIONS

Communication dated Jan. 12, 2021, issued by the International Searching Authority in counterpart International Application No. PCT/KR2020/012643 (PCT/ISA/220, 210, 237).
(Continued)

*Primary Examiner* — Edemio Navas, Jr.
(74) *Attorney, Agent, or Firm* — Sughrue Mion, PLLC

(57) ABSTRACT

Methods and apparatuses for encoding and decoding motion information are provided. In an embodiment, a method of decoding motion information includes obtaining, from a bitstream, a resolution index indicating a motion vector resolution for inter-predicting a current block, a reference index of the current block, and prediction direction information of the current block. The method further includes determining a reference picture of the current block. The method further includes determining whether a prediction direction of the current block is unidirectional prediction in an L0 or L1 direction or bidirectional prediction. The method further includes determining a motion vector resolution set including one or more selectable motion vector resolutions. The method further includes determining a motion vector based on the prediction direction, according to the motion vector resolution indicated by the resolution index from among the motion vector resolution set. The
(Continued)

method further includes reconstructing an image using the motion vector.

13 Claims, 28 Drawing Sheets

Related U.S. Application Data

(60) Provisional application No. 62/901,890, filed on Sep. 18, 2019.

(56) References Cited

U.S. PATENT DOCUMENTS

| | | |
|---|---|---|
| 2013/0322536 A1 | 12/2013 | Yang |
| 2018/0352221 A1 | 12/2018 | Lee et al. |
| 2020/0267408 A1 | 8/2020 | Lee et al. |
| 2020/0296408 A1 | 9/2020 | Kim et al. |
| 2020/0351517 A1* | 11/2020 | Jeong .................. H04N 19/109 |
| 2021/0112268 A1* | 4/2021 | Ko ....................... H04N 19/593 |
| 2021/0258605 A1 | 8/2021 | Jeong et al. |
| 2022/0053206 A1* | 2/2022 | Ko ......................... H04N 19/54 |

FOREIGN PATENT DOCUMENTS

| | | |
|---|---|---|
| WO | 2018/097693 A2 | 5/2018 |
| WO | 2019/168347 A1 | 9/2019 |

OTHER PUBLICATIONS

Benjamin Bross et al., "Versatile Video Coding (Draft 6)," Joint Video Experts Team (JVET) of ITU-T SG 16 WP 3 and ISO/IEC JTC 1/SC 29/WG 11, [Document: JVET-O2001-vE], 15th Meeting: Gothenburg, SE, pp. 1-439, Jul. 31, 20196 (total 457 pages).

Jianle Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, [Document: JVETO2002-v2], 15th Meeting: Gothenburg, SE, pp. 1-87, Sep. 10, 2019 (total 89 pages).

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 22

| CANDIDATE MOTION VECTOR RESOLUTION | CANDIDATE BLOCK |
|---|---|
| 1/4 PIXEL UNIT | LEFT BLOCK |
| 1/2 PIXEL UNIT | RIGHT BLOCK |
| 1 PIXEL UNIT | UPPER RIGHT BLOCK |
| 2 PIXEL UNIT | UPPER LEFT BLOCK |
| 4 PIXEL UNIT | LOWER LEFT BLOCK |

FIG. 23

1/4-PIXEL UNIT

1/2-PIXEL UNIT

1-PIXEL UNIT

2-PIXEL UNIT

MOTION INFORMATION ENCODING APPARATUS AND METHOD, AND MOTION INFORMATION DECODING APPARATUS AND METHOD FOR HIGH-RESOLUTION OR STEREOSCOPIC IMAGES

CROSS-REFERENCE TO RELATED APPLICATIONS

This application is a Continuation Application of International Application PCT/KR2020/012643 filed on Sep. 18, 2020, which claims benefit of priority from U.S. Provisional Application No. 62/901,890, filed on Sep. 18, 2019, the disclosures of which are incorporated by reference herein in their entireties.

BACKGROUND

1. Field

The disclosure relates to the video encoding and decoding field. More particularly, the disclosure relates to a method and apparatus for encoding motion information of a video and a method and apparatus for decoding motion information of a video.

2. Description of Related Art

In a video encoding and decoding method, one picture may be divided into macroblocks to encode an image, and each macroblock may be predictively encoded through inter prediction or intra prediction.

Inter prediction may refer to a method of removing temporal redundancy between pictures to compress an image. A representative example of inter prediction is motion estimation coding. Motion estimation coding predicts blocks of a current picture using at least one reference picture. A reference block that is most similar to a current block is searched for within a preset search range using a preset evaluation function.

The current block is predicted based on the reference block, and a prediction block generated as a result of prediction is subtracted from the current block to generate a residual block. The residual block is then encoded. To more accurately perform the prediction, interpolation is performed on the search range of a reference picture to generate pixels in a sub pel unit that is smaller than an integer pel unit, and inter prediction is performed based on the pixels in the sub pel unit.

In a codec, such as H.264 Advanced Video Coding (AVC) and High Efficiency Video Coding (HEVC), motion vectors of previously encoded blocks adjacent to a current block or blocks included in a previously encoded picture are used as a motion vector predictor of the current block in order to predict a motion vector of the current block.

In a video encoding and decoding process of a high-resolution image or a stereoscopic image, the resolution of a motion vector used to perform inter prediction needs to be precise. As the resolution of the motion vector becomes more precise, the amount of related data increases, which may affect encoding efficiency.

SUMMARY

According to an aspect of the present disclosure, a method of decoding motion information includes obtaining, from a bitstream, a resolution index indicating a motion vector resolution for inter-predicting a current block, a reference index of the current block, and prediction direction information of the current block. The method further includes determining a reference picture of the current block using the reference index of the current block The method further includes determining whether a prediction direction of the current block is unidirectional prediction in an L0 or L1 direction or bidirectional prediction, using the prediction direction information of the current block The method further includes determining a motion vector resolution set including one or more selectable motion vector resolutions, based on at least one of the reference picture of the current block or the prediction direction The method further includes determining a motion vector based on the prediction direction, according to a motion vector resolution indicated by the resolution index from among the motion vector resolution set. The method further includes reconstructing an image using the motion vector.

According to an embodiment, the motion vector resolution set includes at least one of a ¼-pixel unit, a ½-pixel unit, a 1-pixel unit, a 2-pixel unit, or a 4-pixel unit.

According to an embodiment, the determining of the motion vector resolution set includes, when a picture order count (POC) distance between a current picture including the current block and the reference picture of the current block is less than a preset POC distance, determining a first motion vector resolution set including one or more first motion vector resolutions from among the one or more selectable motion vector resolutions. Alternatively or additionally, the determining of the motion vector resolution set includes, when the POC distance between the current picture and the reference picture is greater than or equal to the preset POC distance, determining a second motion vector resolution set including one or more second motion vector resolutions from among the selectable motion vector resolutions. The first motion vector resolution set is different from the second motion vector resolution set. A highest motion vector resolution included in the first motion vector resolution set is greater than or equal to a highest motion vector resolution included in the second motion vector resolution set.

According to an embodiment, the determining of the motion vector resolution set includes, when a POC distance between a current picture including the current block and the reference picture of the current block is less than a first preset POC distance, determining a first motion vector resolution set including one or more first motion vector resolutions from among the one or more selectable motion vector resolutions. Alternatively or additionally, the determining of the motion vector resolution set includes, when the POC distance between the current picture and the reference picture is greater than a second preset POC distance, determining a second motion vector resolution set including one or more second motion vector resolutions from among the one or more selectable motion vector resolutions. Alternatively or additionally, the determining of the motion vector resolution set includes, when the POC distance between the current picture and the reference picture is greater than or equal to the first preset POC distance and less than or equal to the second preset POC distance, determining a third motion vector resolution set including one or more third motion vector resolutions from among the one or more selectable motion vector resolutions. The first motion vector resolution set, the second motion vector resolution set, and the third motion vector resolution set are different from one another. The highest motion vector resolution included in the first motion vector resolution set is greater than or equal to a highest motion vector resolution included in the second motion vector resolution set. The highest motion vector resolution included in the third motion vector resolution set is within a first precision range of the motion vector resolutions included in the first motion vector resolution set. The lowest motion vector resolution included in the third motion vector resolution set is within a second precision range of the motion vector resolutions included in the second motion vector resolution set.

According to an embodiment, the determining of the motion vector resolution set includes, when the prediction direction of the current block is unidirectional prediction, determining a first motion vector resolution set including one or more first motion vector resolutions from among the one or more selectable motion vector resolutions. Alternatively or additionally, the determining of the motion vector resolution set includes, when the prediction direction of the current block is bidirectional prediction, determining a second motion vector resolution set including one or more second motion vector resolutions from among the one or more selectable motion vector resolutions. The first motion vector resolution set is different from the second motion vector resolution set. The highest motion vector resolution included in the first motion vector resolution set is greater than or equal to a highest motion vector resolution included in the second motion vector resolution set.

According to an embodiment, the determining of the motion vector resolution set includes, when the prediction direction of the current block is unidirectional prediction, determining a first motion vector resolution set including one or more first motion vector resolutions from among the one or more selectable motion vector resolutions. Alternatively or additionally, the determining of the motion vector resolution set includes, when the prediction direction of the current block is bidirectional prediction, determining, for a L0 motion vector, a second motion vector resolution set including one or more second motion vector resolutions from among the one or more selectable motion vector resolutions, and determining, for a L1 motion vector, a third motion vector resolution set including one or more motion third vector resolutions from among the one or more selectable motion vector resolutions.

According to an embodiment, the determining of the motion vector resolution set includes, when the prediction direction of the current block is unidirectional prediction and a POC distance between a current picture including the current block and the reference picture of the current block is less than a first preset POC distance, determining a first motion vector resolution set including one or more first motion vector resolutions from among the one or more selectable motion vector resolutions Alternatively or additionally, the determining of the motion vector resolution set includes, when the prediction direction of the current block is unidirectional prediction and the POC distance between the current picture and the reference picture is greater than or equal to the first preset POC distance, determining a second motion vector resolution set including one or more second motion vector resolutions from among the one or more selectable motion vector resolutions.

According to an embodiment, the determining of the motion vector resolution set includes, when the prediction direction of the current block is bidirectional prediction, the POC distance between a current picture including the current block and an L0 reference picture of the current block is less than a second preset POC distance, and the POC distance between the current picture including the current block and an L1 reference picture of the current block is less than a first preset POC distance, determining a first motion vector resolution set for an L0 motion vector and an L1 motion vector Alternatively or additionally, the determining of the motion vector resolution set includes, when the prediction direction of the current block is bidirectional prediction, the POC distance between the current picture including the current block and the L0 reference picture of the current block is greater than or equal to the second preset POC distance, and the POC distance between the current picture including the current block and an L1 reference picture of the current block is greater than or equal to the first preset POC distance, determining a second motion vector resolution set for the L0 motion vector and the L1 motion vector.

According to an embodiment, the determining of the motion vector includes applying the resolution index applied to the second motion vector resolution set for the L0 motion vector, to the third motion vector resolution set for the L1 motion vector.

According to an embodiment, the obtaining of the resolution index includes obtaining an L0 resolution index indicating an L0 motion vector resolution and an L1 resolution index indicating an L1 motion vector resolution.

According to an embodiment, the determining of the motion vector includes determining a debinarization method for parsing the resolution index, based on the determined motion vector resolution set.

According to an embodiment, the determining of the motion vector resolution set includes determining a predictor candidate list including a selectable motion vector predictor candidate, based on the determined motion vector resolution set, when the motion vector resolution of the current block is coupled to a motion vector predictor candidate.

According to an aspect of the present disclosure, an apparatus for decoding motion information includes an obtainer configured to obtain, from a bitstream, a resolution index indicating a motion vector resolution for inter-predicting a current block, a reference index of the current block, and prediction direction information of the current block; and a prediction decoder configured to determine a reference picture of the current block using the reference index of the current block, determine whether a prediction direction of the current block is unidirectional prediction in an L0 or L1 direction or bidirectional prediction, using the prediction direction information of the current block, determine a motion vector resolution set including one or more selectable motion vector resolutions, based on at least one of a POC distance between a current picture including the current block and the reference picture of the current block or the prediction direction of the current block, determine a motion vector based on the prediction direction, according to the motion vector resolution indicated by the resolution index from among the motion vector resolution set, and reconstruct an image using the motion vector.

According to an aspect of the present disclosure, an apparatus for decoding motion information includes a memory storing instructions and at least one processor in communication with the memory. The at least one processor is configured to execute the instructions stored in the memory that, when executed by the at least one processor, cause the apparatus to obtain, from a bitstream, a resolution index indicating a motion vector resolution for inter-predicting a current block, a reference index of the current block, and prediction direction information of the current block. The at least one processor further causes the apparatus to determine a reference picture of the current block using the reference index of the current block. The at least one processor further causes the apparatus to determine whether a prediction direction of the current block is unidirectional prediction in an L0 or L1 direction or bidirectional prediction, using the prediction direction information of the current block. The at least one processor further causes the apparatus to determine a motion vector resolution set including one or more selectable motion vector resolutions, based on at least one of a POC distance between a current picture including the current block and the reference picture of the current block or the prediction direction of the current block. The at least one processor further causes the apparatus to determine a motion vector based on the prediction direction, according to the motion vector resolution indicated by the resolution index from among the motion vector resolution set. The at least one processor further causes the apparatus to reconstruct an image using the motion vector.

According to an aspect of the present disclosure, a method of encoding motion information includes determining a motion vector, a reference picture, and a prediction direction of a current block by inter-predicting the current block. The method further includes determining a motion vector resolution set including one or more selectable motion vector resolutions, based on at least one of a POC distance between a current picture including the current block and the reference picture of the current block or the prediction direction. The method further includes generating a resolution index indicating a motion vector resolution. The method further includes inter-predicting the current block from among the determined motion vector resolution set, using the resolution index.

According to an aspect of the present disclosure, a method of decoding motion information includes determining a motion vector resolution set by obtaining, from a bitstream, information representing the motion vector resolution set including one or more selectable motion vector resolutions in a current sequence or a current slice. The method further includes obtaining, from the bitstream, a resolution index indicating a motion vector resolution for inter-predicting a current block included in the current sequence or the current slice. The method further includes determining a motion vector of the current block using the motion vector resolution indicated by the resolution index from among the motion vector resolution set. The method further includes reconstructing the current block using the motion vector.

According to an embodiment of the disclosure, a computer readable recording medium has recorded thereon a program, executable by a computer, that performs the method of encoding motion information.

According to an embodiment of the disclosure, a computer readable recording medium has recorded thereon a program, executable by a computer, that performs the method of decoding motion information.

In an apparatus and method of encoding a motion information and an apparatus and method of decoding motion information, according to an embodiment, some of several pieces of motion information necessary for decoding an inter-predicted block may be omitted, leading to a reduction in the number of bits.

BRIEF DESCRIPTION OF THE DRAWINGS

A brief description of each drawing is provided for better understanding of the drawings cited herein.

FIG. 13 illustrates a process of determining a depth of a coding unit as a shape and size of the coding unit change, when the coding unit is recursively split such that a plurality of coding units are determined, according to an embodiment.

FIG. 22 is a table showing a mapping relationship between one or more candidate motion vector resolutions and one or more candidate blocks.

FIG. 23 is a view for explaining interpolation for determining a motion vector according to various motion vector resolutions.

DETAILED DESCRIPTION

Figure 1:
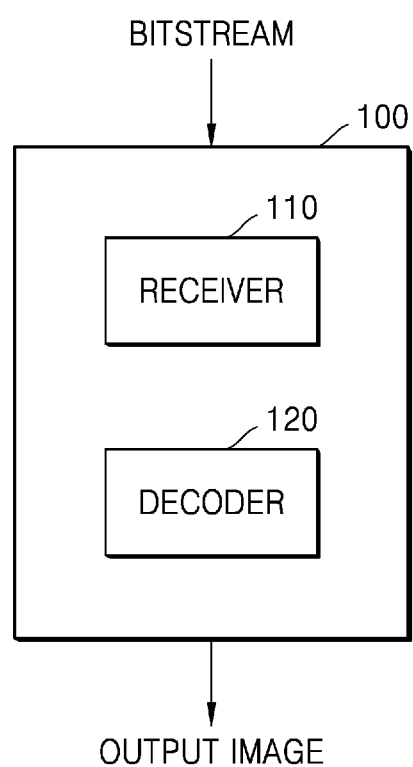
FIG. 1 is a schematic block diagram of an image decoding apparatus according to an embodiment.

As the disclosure allows for various changes and numerous embodiments, particular embodiments are illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion (unit)" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' or 'picture' used herein may denote a still image of video or a moving picture, e.g., video.

A 'sample' used herein may refer to, as data assigned to a sampling location of an image, data to be processed. For example, pixel values on a spatial-domain image and transform coefficients on a transform domain may be samples. A unit including such one or more samples may be defined as a block.

A 'current block' used herein may denote a block of a largest coding unit, coding unit, prediction unit, or transform unit of a current image to be encoded or decoded.

'Motion vector resolution' used herein may refer to precision of a location of a pixel that may be indicated by a motion vector determined through inter prediction from among the pixels included in a reference image (or an interpolated reference image). The motion vector resolution having an N pixel unit (where N is a rational number) means that a motion vector may have precision of an N pixel unit. For example, motion vector resolution of a ¼ pixel unit may mean that a motion vector may indicate a pixel location of a ¼ pixel unit (e.g., a subpixel unit) in an interpolated reference image, and motion vector resolution of a 1 pixel unit may mean that a motion vector may indicate a pixel location of a 1 pixel unit (e.g., an integer pixel unit) in an interpolated reference image.

'Candidate motion vector resolution' used herein may refer to one or more motion vector resolutions that may be selected as the motion vector resolution of a block, and a 'candidate block' used herein may refer to one or more blocks that are mapped to the candidate motion vector resolution and are usable as a block for a motion vector predictor of an inter-predicted block.

A 'pixel unit' used herein may be replaced with terms such as pixel precision and pixel accuracy.

An image encoding method and apparatus and an image decoding method and apparatus based on coding units and transformation units having a tree structure according to an embodiment are described with reference to FIGS. 1 through 16. An image encoding apparatus and an image decoding apparatus to be described with reference to FIGS. 1 through 16 may include a motion information encoding apparatus and a motion information decoding apparatus to be described with reference to FIGS. 17 through 26.

A method and apparatus for adaptively selecting split types of coding units, based on various types of coding units, according to an embodiment of the disclosure, are described with reference to FIGS. 1 and 2.

FIG. 1 is a schematic block diagram of an image decoding apparatus 100 according to an embodiment.

The image decoding apparatus 100 may include a receiver 110 and a decoder 120. The receiver 110 and the decoder 120 may include at least one processor. The receiver 110 and the decoder 120 may include a memory storing instructions that are to be executed by the at least one processor (not shown).

The receiver 110 may receive a bitstream. The bitstream may include information resulting from image encoding by an image encoding apparatus (e.g., encoder 1610 of FIG. 16) which is described later. The bitstream may be transmitted from the image encoding apparatus. The image encoding apparatus and the image decoding apparatus 100 may be connected to each other in a wired and/or wireless manner, and the receiver 110 may receive a bitstream in a wired and/or wireless manner. The receiver 110 may receive a bitstream from a storage medium such as optical media or a hard disk. The decoder 120 may reconstruct an image, based on information obtained from the received bitstream. The decoder 120 may obtain a syntax element for reconstructing an image from the bitstream. The decoder 120 may reconstruct the image, based on the syntax element.

Operations of the image decoding apparatus 100 are described in more detail with reference to FIG. 2.

Figure 2:
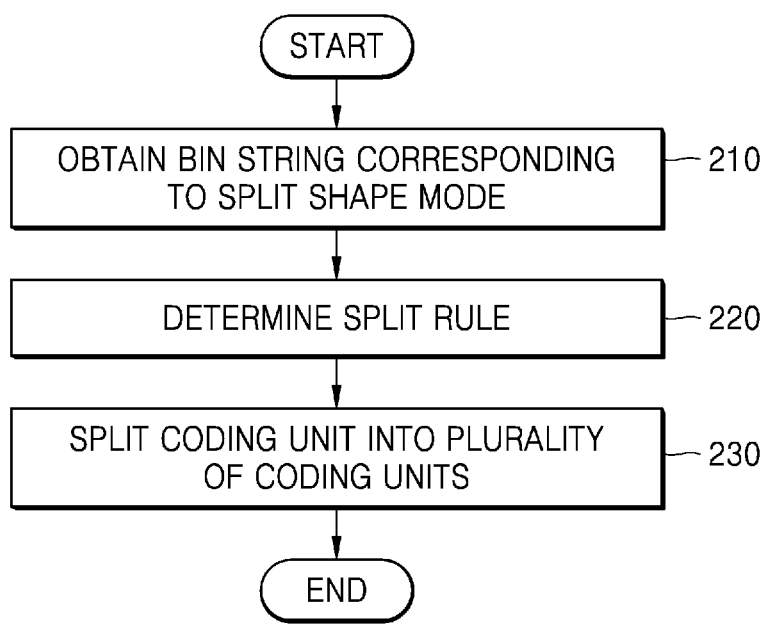
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 may perform an operation 210 of obtaining a bin string corresponding to a split shape mode of a coding unit from the bitstream. The image decoding apparatus 100 may perform an operation 220 of determining a split rule of a coding unit. The image decoding apparatus 100 may perform an operation 230 of splitting a coding unit into a plurality of coding units, based on at least one of the bin string corresponding to the split shape mode or the split rule. The image decoding apparatus 100 may determine a first range which is an allowable size range of a coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, splitting of a coding unit is described in detail according to an embodiment of the disclosure.

First, one picture may be split into one or more slices and/or one or more tiles. One slice and/or one tile may be a sequence of one or more largest coding units (e.g., coding tree units (CTUs)). A largest coding block (e.g., coding tree block (CTB)) may be conceptually comparable to a largest coding unit (e.g., CTU).

The largest coding block (e.g., CTB) denotes an N×N block including N×N samples (where N is an integer). Each color component may be split into one or more largest coding blocks.

When a picture has three sample arrays (e.g., sample arrays for Y, Cr, and Cb components), a largest coding unit (e.g., CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (e.g., CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. In other words, a (largest) coding unit refers to a data structure including a (largest) coding block including a corresponding sample and a syntax structure corresponding to the (largest) coding block. As such, it may be understood by one of ordinary skill in the art that a (largest) coding unit or a (largest) coding block refers to a block of a preset size including a preset number of samples, a largest coding block and a largest coding unit, or a coding block and a coding unit in the present disclosure without being distinguished unless otherwise described.

An image may be split into largest coding units (CTUs). A size of each largest coding unit may be determined based on information obtained from a bitstream. A shape of each largest coding unit may be a square shape of the same size. However, embodiments of the disclosure are not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

A largest coding unit may be hierarchically split into coding units, based on split shape mode information obtained from a bitstream. At least one of information indicating whether quad splitting is performed, information indicating whether multi-splitting is performed, split direction information, or split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_BT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Alternatively or additionally, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit is described in detail with reference to FIGS. 3 through 16.

Alternatively or additionally, one or more prediction blocks for prediction may be determined from a coding unit. The prediction block may be the same as or smaller than the coding unit. Alternatively or additionally, one or more transform blocks for transformation may be determined from a coding unit. The transform block may be equal to or smaller than the coding unit.

The shapes and sizes of the transform block and prediction block may not be related to each other.

In another embodiment, prediction may be performed using a coding unit as a predictor. Alternatively or additionally, transformation may be performed using a coding unit as a transform block.

The splitting of the coding unit is described in detail with reference to FIGS. 3 to 16. A current block and a neighboring block of the disclosure may indicate one of the largest coding unit, the coding unit, the prediction block, and the transform block. Alternatively or additionally, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
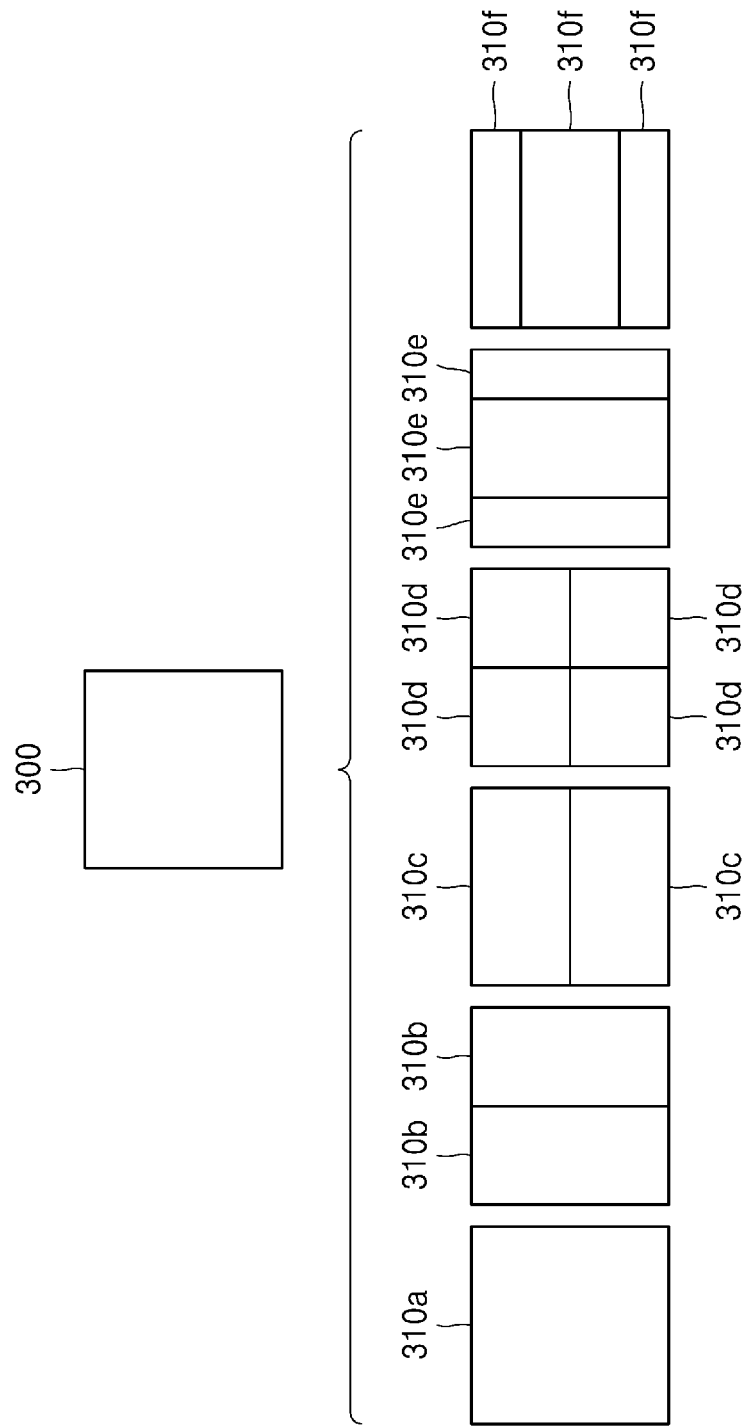
FIG. 3 illustrates a process, performed by an image decoding apparatus, of determining at least one coding unit by splitting a current coding unit, according to an embodiment.

FIG. 3 illustrates a process, performed by an image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and/or a non-square. When the lengths of the width and height of the coding unit are the same (e.g., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (e.g., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, or 32:1. Alternatively or additionally, the image decoding apparatus 100 may determine whether the coding unit is in a horizontal direction or a vertical direction, based on the length of the width and the length of the height of the coding unit. Alternatively or additionally, the image decoding apparatus 100 may determine the size of the coding unit, based on at least one of the length of the width, the length of the height, or the area of the coding unit.

According to an embodiment, the image decoding apparatus 100 may determine the shape of the coding unit using the block shape information, and may determine a splitting method of the coding unit using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Alternatively or additionally, the image decoding apparatus 100 may determine split shape mode information regarding the smallest coding unit to be "not to perform splitting". That is, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Alternatively or additionally, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310*a* having the same size as the current coding unit 300, based on the split shape mode information indicating not to perform splitting, or may determine coding units 310*b*, 310*c*, 310*d*, 310*e*, or 310*f* split based on the split shape mode information indicating a preset splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*e* obtained by splitting the current coding unit 300 in a vertical direction, based on the split shape mode information indicating to perform ternary splitting in a vertical direction. The image decoding apparatus 100 may determine three coding units 310*f* obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit are described in detail below in relation to various embodiments.

Figure 4:
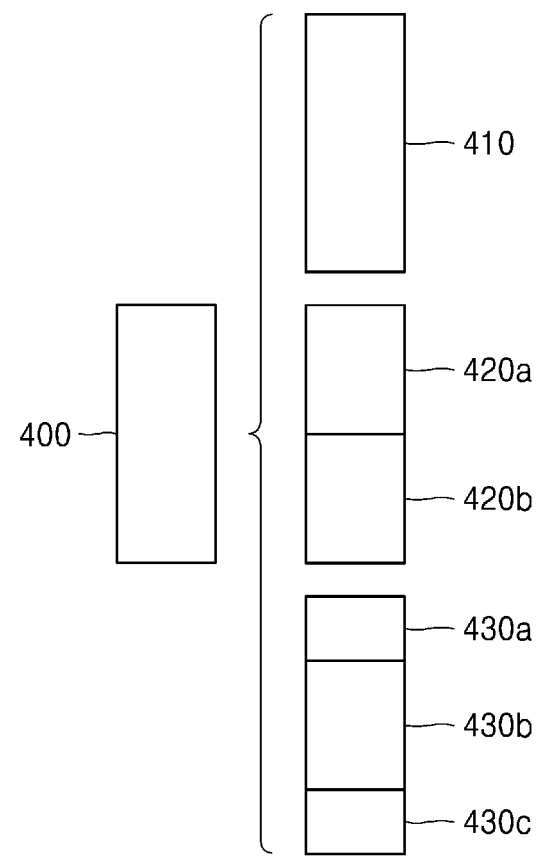
FIG. 4 illustrates a process, performed by an image decoding apparatus, of determining at least one coding unit by splitting a non-square coding unit, according to an embodiment.
Figure 4:
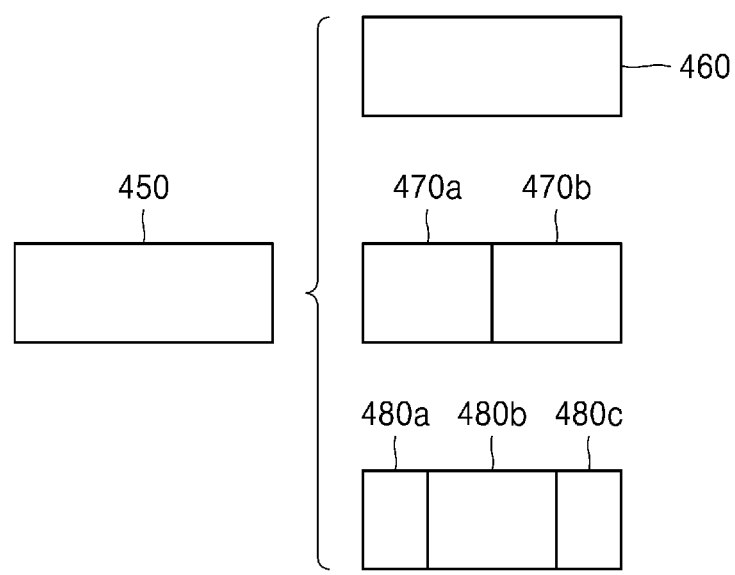

FIG. 4 illustrates a process, performed by an image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit using a preset splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420*a* and 420*b*, 430*a* to 430*c*, 470*a* and 470*b*, or 480*a* to 480*c* split based on the split shape mode information indicating a preset splitting method. Preset splitting methods of splitting a non-square coding unit are described in detail below in relation to various embodiments.

According to an embodiment, the image decoding apparatus 100 may determine a splitting method of a coding unit using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (e.g., a ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Alternatively or additionally, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a*, 430*b*, and 430*c* by splitting the current coding unit 400 in the horizontal direction. Alternatively or additionally, when the current coding unit 450 is in the horizontal direction, the image decoding apparatus 100 may determine the coding units 480*a*, 480*b*, and 480*c* by splitting the current coding unit 450 in the vertical direction.

According to an embodiment, the image decoding apparatus 100 may determine an odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a preset number of times, unlike the other coding units 430a and 430c, or 480a and 480c.

Figure 5:
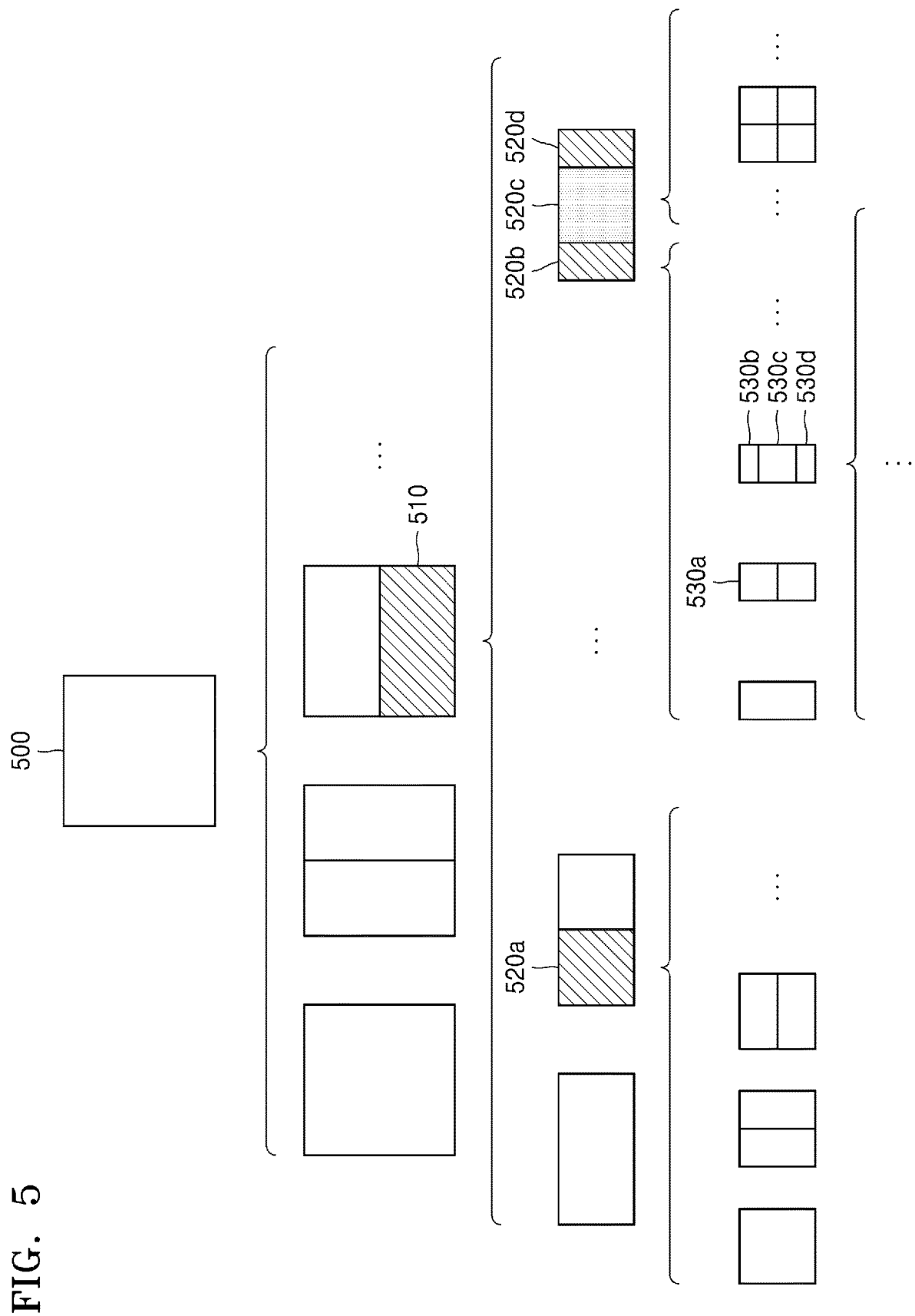
FIG. 5 illustrates a process, performed by an image decoding apparatus, of splitting a coding unit based on at least one of block shape information or split shape mode information, according to an embodiment.

FIG. 5 illustrates a process, performed by an image decoding apparatus 100, of splitting a coding unit based on at least one of block shape information or split shape mode information, according to an embodiment.

According to an embodiment, the image decoding apparatus 100 may determine to split or not to split a square first coding unit 500 into coding units, based on at least one of the block shape information or the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It may be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, 520b, 520c, and 520d based on the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 510 may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit is described below in relation to various embodiments.

According to an embodiment, the image decoding apparatus 100 may split each of the third coding units 520a, or 520b, 520c, and 520d into coding units, based on the split shape mode information. Alternatively or additionally, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split using a preset splitting method (e.g., split into only four coding units or split using a splitting method of the second coding unit 510), or to be split only a preset number of times (e.g., split only n times, where n is a positive integer). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
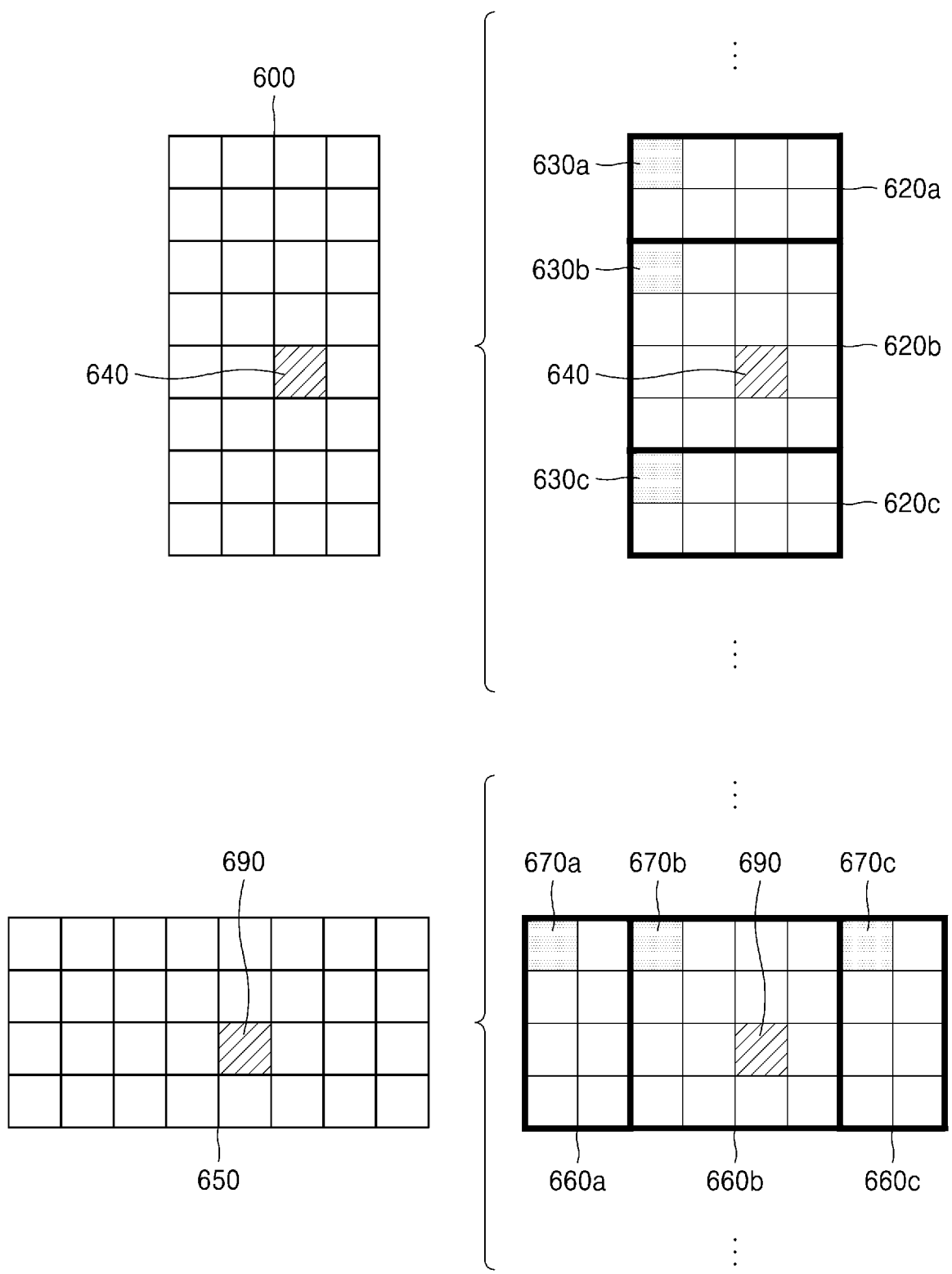
FIG. 6 illustrates a method, performed by an image decoding apparatus, of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as are described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the center coding unit 620b may include coordinates (xb, yb), and information indicating the location of the upper-left sample 630c of the lower coding unit 620c may include coordinates (xc, yc). The image decoding apparatus 100 may determine the middle coding unit 620b using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a preset location using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that are the information indicating the location of the upper-left sample 630c of the lower coding unit 620c. The image decoding apparatus 100 may determine the respective sizes of the coding units 620a, 620b, and 620c using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit of the preset location. However, the above-described method, performed by the image decoding apparatus 100, of determining a coding unit having a size different from the size of the other coding units merely corresponds to an example of determining a coding unit at a preset location using the sizes of coding units, which are determined based on coordinates of samples, and thus various methods of determining a coding unit at a preset location by comparing the sizes of coding units, which are determined based on coordinates of preset samples, may be used without deviating from the scope of the disclosure.

The image decoding apparatus 100 may determine the width or height of each of the coding units 660*a*, 660*b*, and 660*c* using the coordinates (xd, yd) that are information indicating the location of an upper-left sample 670*a* of the left coding unit 660*a*, the coordinates (xe, ye) that are information indicating the location of an upper-left sample 670*b* of the middle coding unit 660*b*, and the coordinates (xf, yf) that are information indicating a location of the upper-left sample 670*c* of the right coding unit 660*c*. The image decoding apparatus 100 may determine the respective sizes of the coding units 660*a*, 660*b*, and 660*c* using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe minus xd (e.g., xe−xd). The image decoding apparatus 100 may determine the height of the left coding unit 660*a* to be the height of the current coding unit 650. According to an embodiment, the image decoding apparatus 100 may determine the width of the middle coding unit 660*b* to be xf minus xe (e.g., xf−xe). The image decoding apparatus 100 may determine the height of the middle coding unit 660*b* to be the height of the current coding unit 650. According to an embodiment, the image decoding apparatus 100 may determine the width or height of the right coding unit 660*c* using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the sizes of the left and right coding units 660*a* and 660*c*, as the coding unit of the preset location. However, the above-described method, performed by the image decoding apparatus 100, of determining a coding unit having a size different from the size of the other coding units merely corresponds to an example of determining a coding unit at a preset location using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, having a longer width than a height, the image decoding apparatus 100 may determine the coding unit at the preset location in a horizontal direction. In other words, the image decoding apparatus 100 may determine one of coding units at different locations in a horizontal direction and may put a restriction on the coding unit. When the current coding unit has a non-square shape, having a longer height than a width, the image decoding apparatus 100 may determine the coding unit at the preset location in a vertical direction. In other words, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of coding units 620a, 620b, and 620c determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620b including a sample, from which preset information (e.g., the split shape mode information) can be obtained, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center location of the current coding unit 600 as the sample from which the preset information may be obtained, and may put a preset restriction on the coding unit 620b including the sample 640, in a decoding operation. However, the location of the sample from which the preset information can be obtained is not limited to the above-described location, and may include arbitrary locations of samples included in the coding unit 620b to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width or height of the current coding unit in half, as the sample from which the preset information can be obtained, using at least one of information about the width of the current coding unit or information about the height of the current coding unit. As another example, when the block shape information of the current coding unit indicates a non-square shape, the image decoding apparatus 100 may determine one of samples including a boundary for splitting a long side of the current coding unit in half, as the sample from which the preset information may be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof are not provided here.

According to an embodiment, the image decoding apparatus 100 may determine one or more coding units by splitting the current coding unit, and may determine an order of decoding the one or more coding units, based on a preset block (e.g., the current coding unit).

Figure 7:
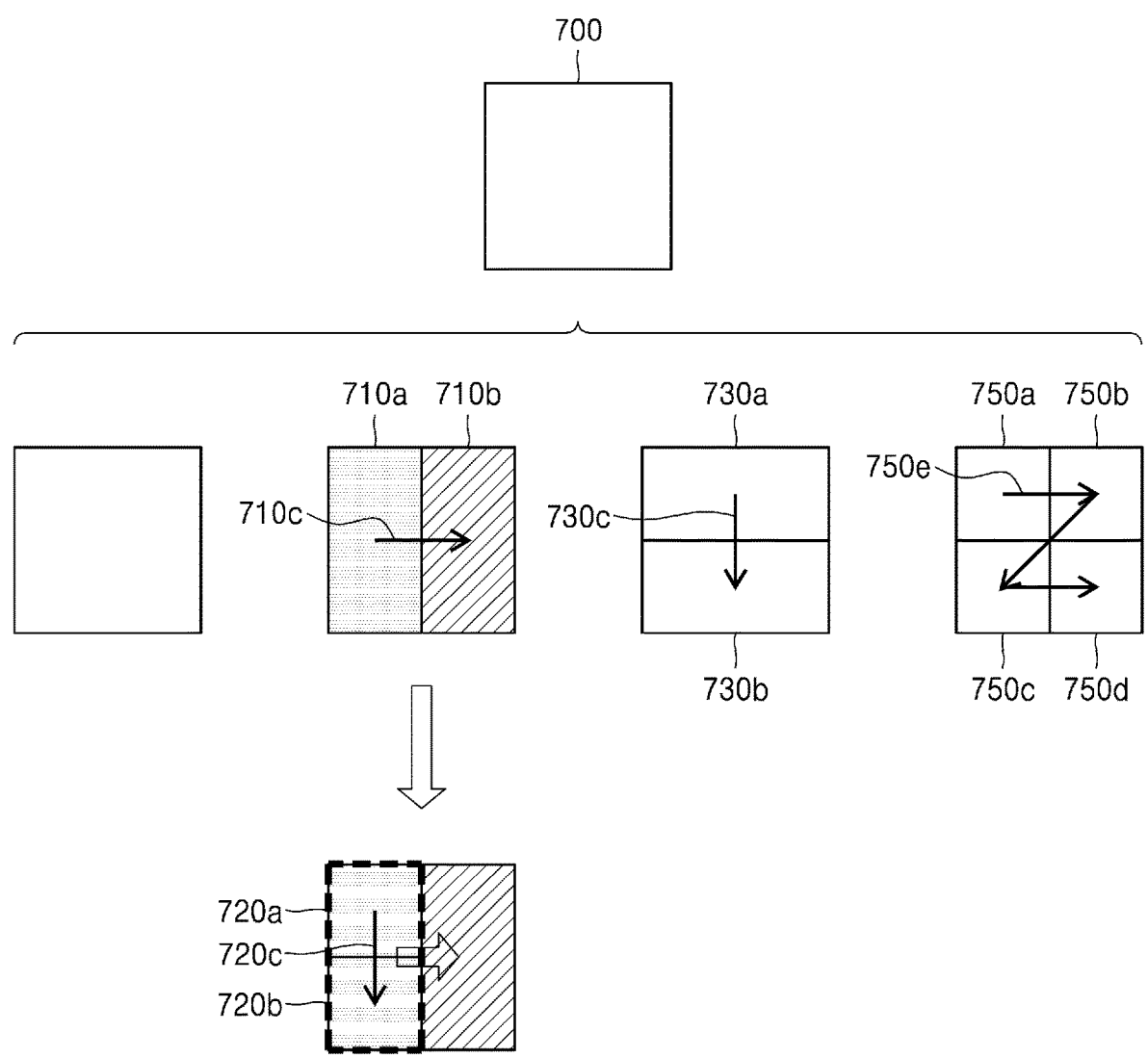
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
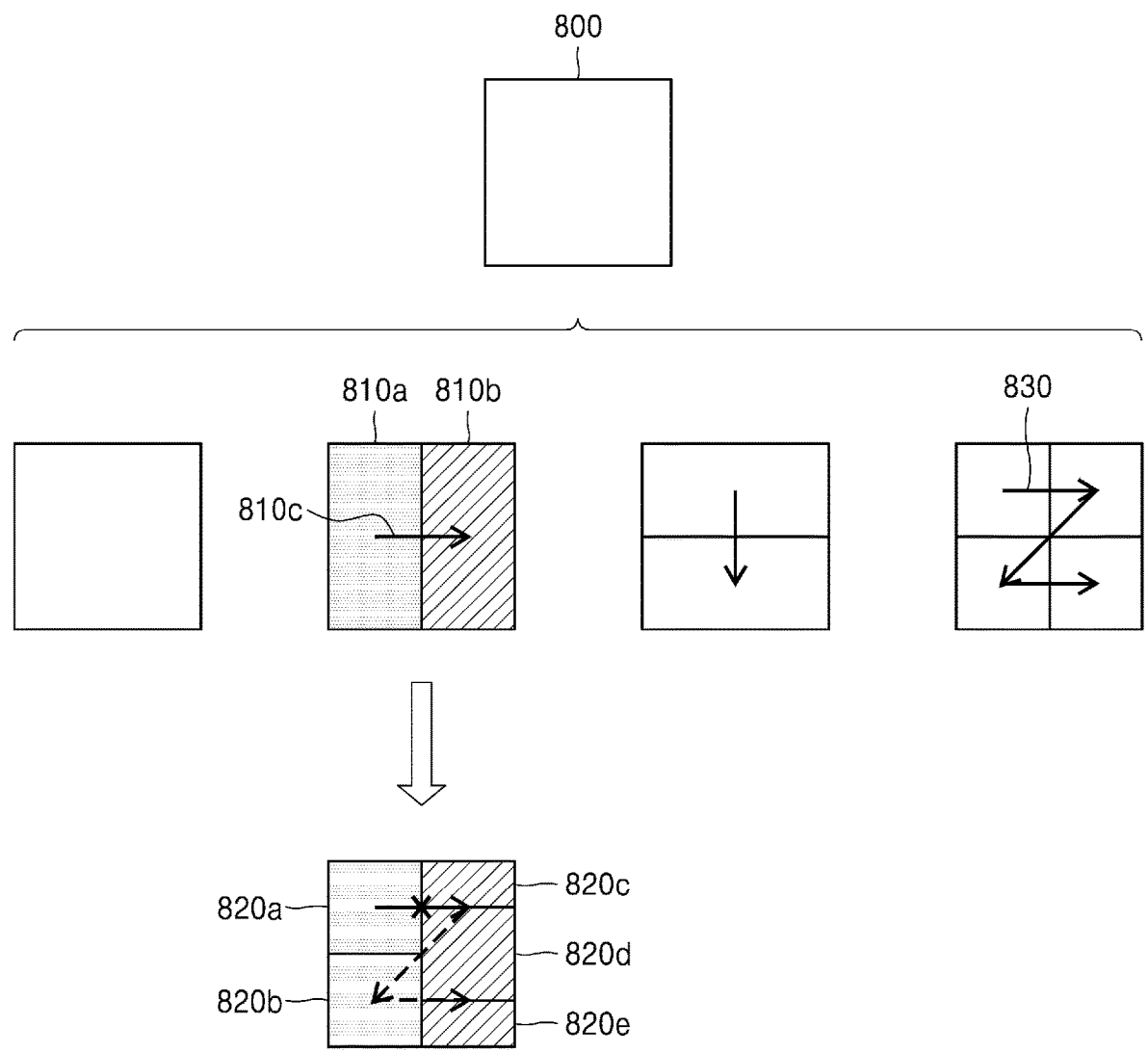
FIG. 8 illustrates a process, performed by an image decoding apparatus, of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether any coding unit is split into an odd number of coding units, by determining whether the third coding units 820a and 820b, and 820c, 820d, and 820e are processable in a preset order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information or the split shape mode information. For example, a coding unit located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition for processing in the preset order, and the condition relates to whether at least one of a width or height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof are not provided herein.

Figure 9:
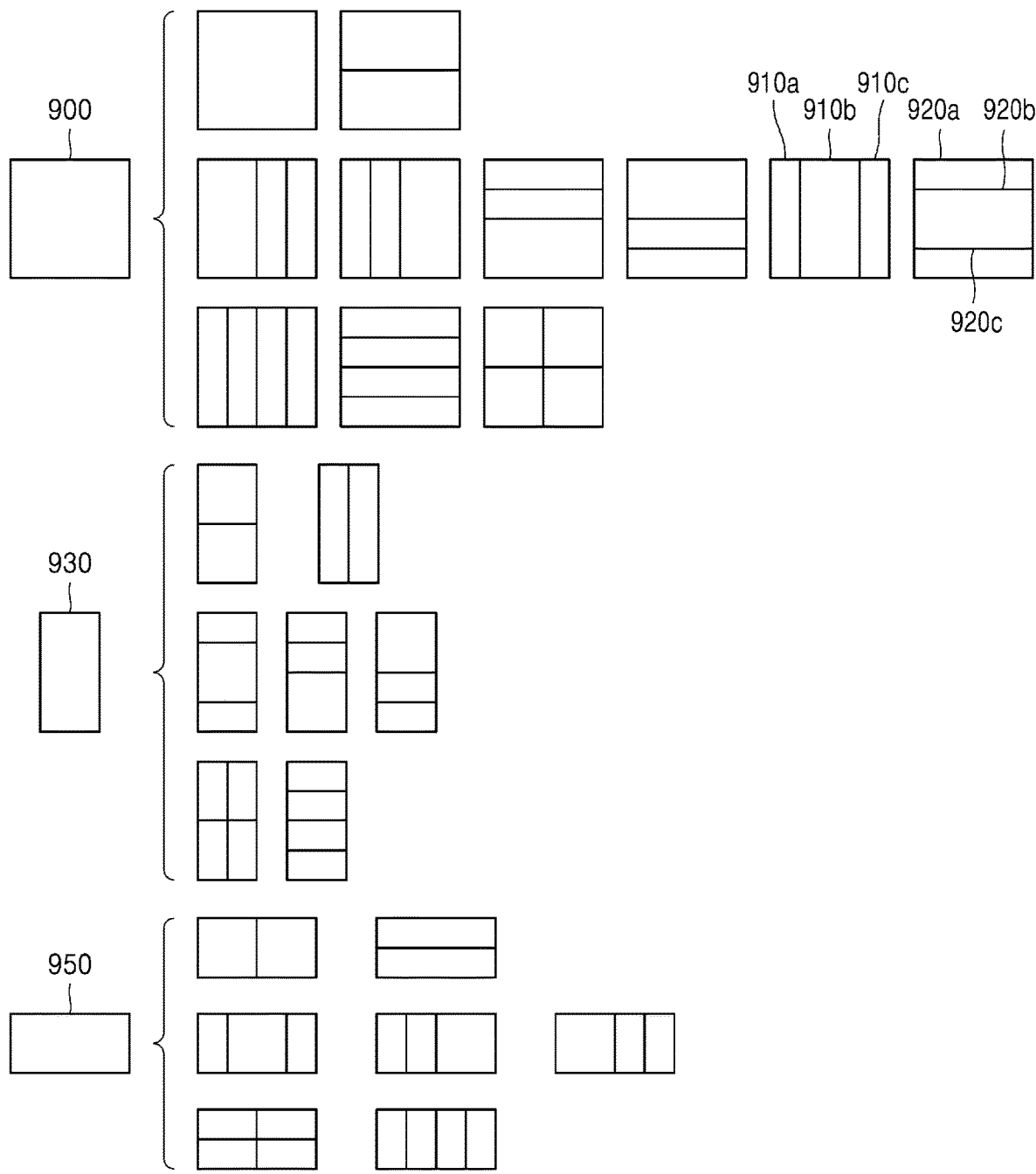
FIG. 9 illustrates a process, performed by an image decoding apparatus, of determining at least one coding unit by splitting a current coding unit, according to an embodiment.

FIG. 9 illustrates a process, performed by the image decoding apparatus 100, of determining at least one coding unit by splitting a current coding unit, according to an embodiment.

According to an embodiment, the image decoding apparatus 100 may split a first coding unit 900, based on split shape mode information obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width or height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the preset order. Because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof are not provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
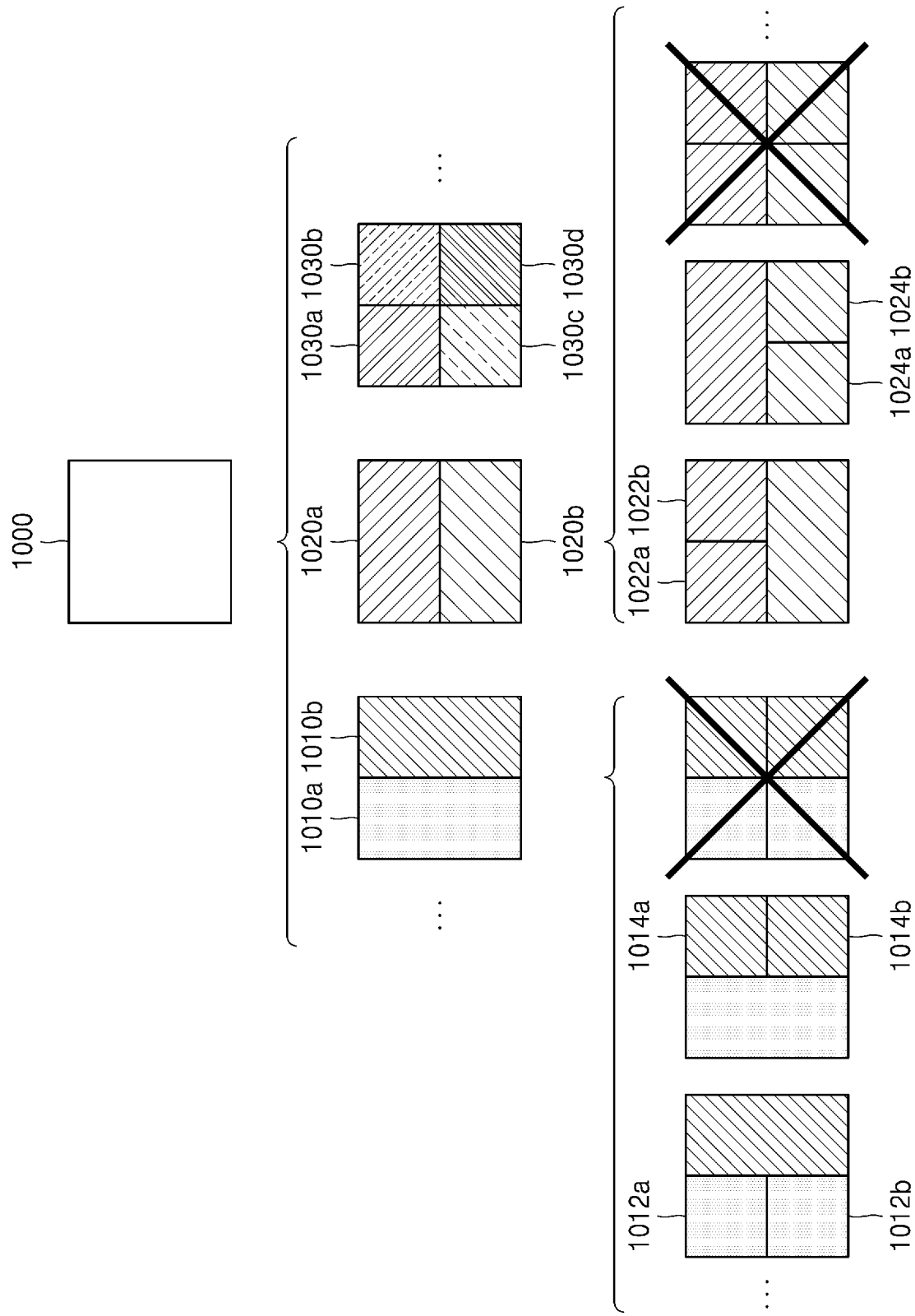
FIG. 10 illustrates that a shape into which a second coding unit is splittable is restricted when the second coding unit having a non-square shape, which is determined when an image decoding apparatus splits a first coding unit, satisfies a preset condition, according to an embodiment.

FIG. 10 illustrates that a shape into which a second coding unit is splittable is restricted when the second coding unit having a non-square shape, which is determined when the image decoding apparatus 100 splits a first coding unit, satisfies a preset condition, according to an embodiment.

According to an embodiment, the image decoding apparatus 100 may determine to split a square first coding unit 1000 into non-square second coding units 1010a, and 1010b or 1020a and 1020b, based on split shape mode information obtained by the receiver 110. The second coding units 1010a and 1010b, or 1020a and 1020b may be independently split. As such, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
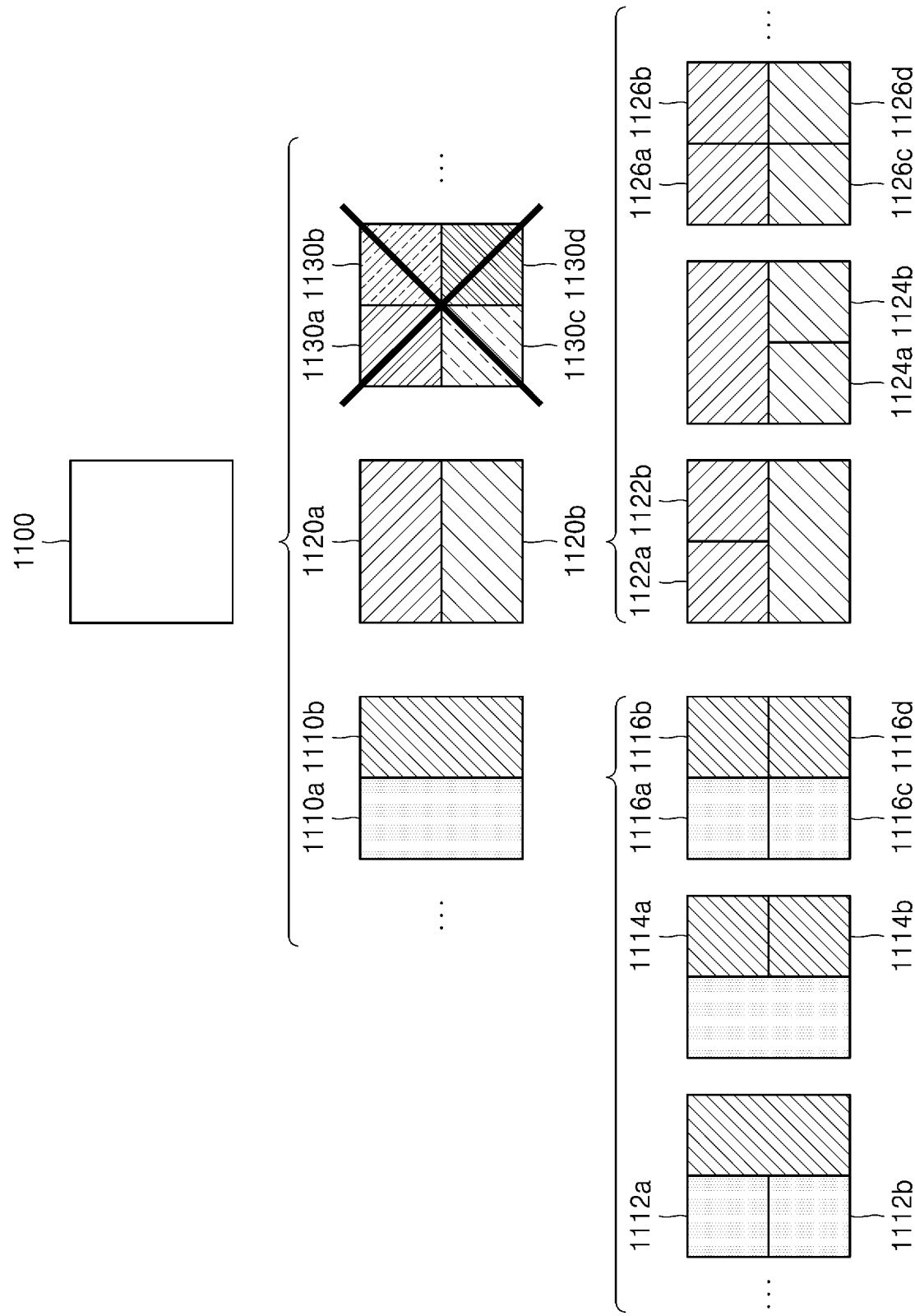
FIG. 11 illustrates a process, performed by an image decoding apparatus, of splitting a square coding unit when split shape mode information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit, but the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. For example, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. For example, coding units having the same shape as the four square second coding units 1130a, 1130b, 1130c, and 1130d split from the first coding unit 1100 may be determined.

Figure 12:
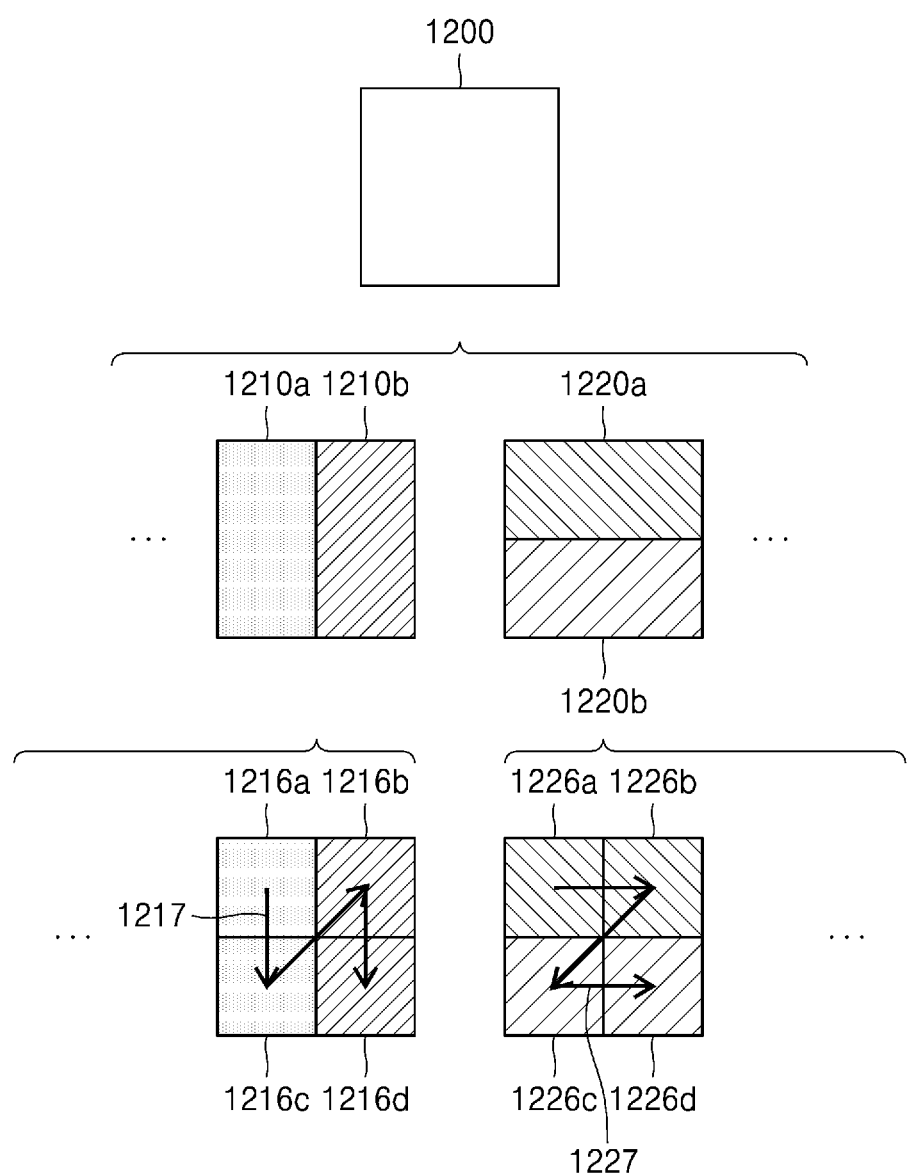
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal or vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof are not provided herein.

According to an embodiment, the image decoding apparatus 100 may process coding units in a preset order. An operation of processing coding units in a preset order has been described above in relation to FIG. 7, and thus detailed descriptions thereof are not provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (where n is a positive integer) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0:SQUARE'). For example, assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. For example, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1:NS_VER' indicating a non-square shape, having a longer height than a width, or as '2:NS_HOR' indicating a non-square shape, having a longer width than a height).

The image decoding apparatus 100 may determine a second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
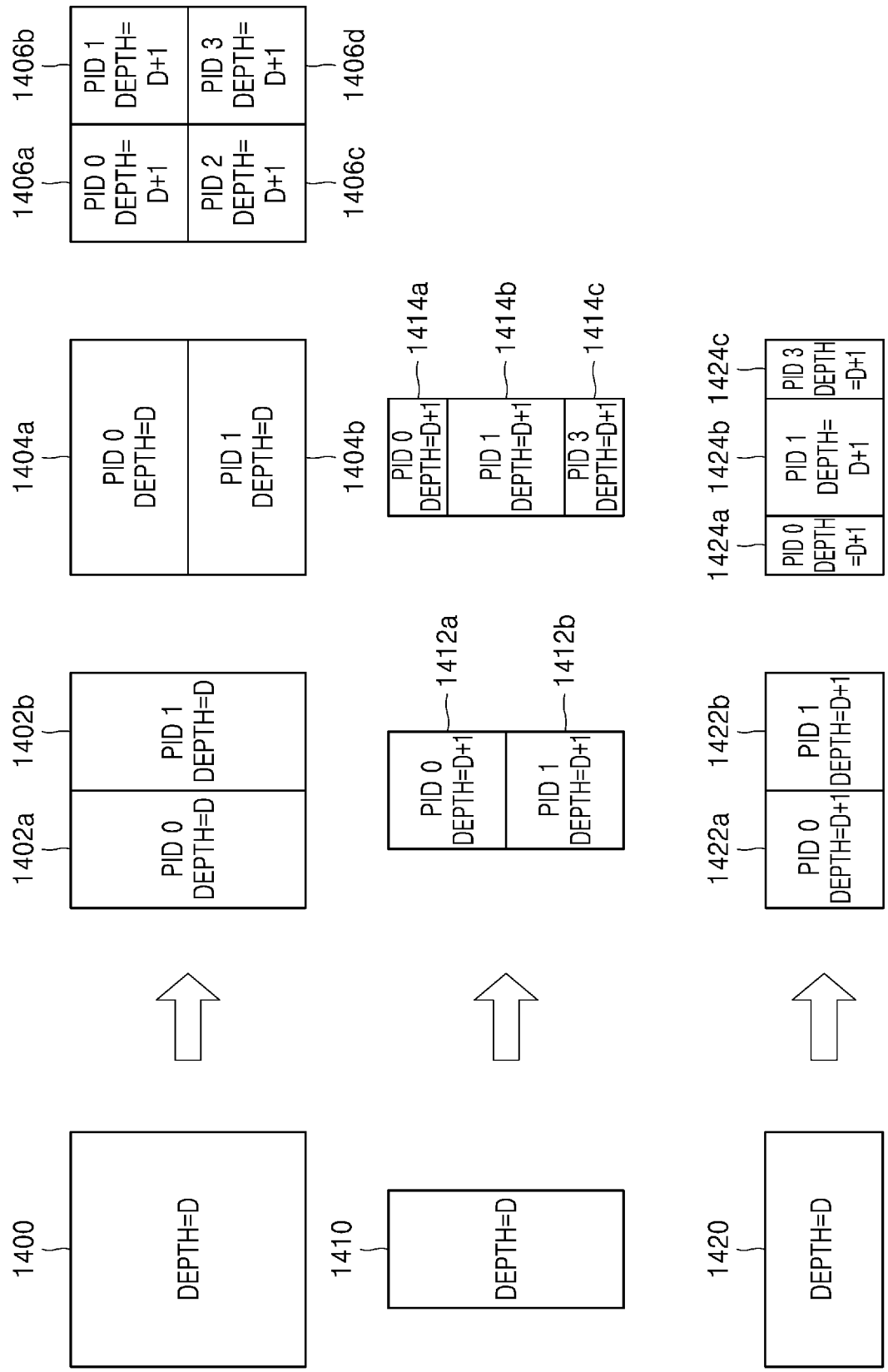
FIG. 14 illustrates depths that are determinable based on shapes and sizes of coding units, and part indexes (PIDs) for distinguishing the coding units, according to an embodiment.

FIG. 14 illustrates depths that are determinable based on shapes and sizes of coding units, and part indexes (PIDs) for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of a vertical direction or a horizontal direction based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth (e.g., D). However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, having a longer height than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, having a longer width than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, having a longer height than a width, a depth of the square second coding units 1412a and 1412b is D+1 which is lower than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. For example, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is lower than the depth D of the non-square first coding unit 1410 by 1. The image decoding apparatus 100 may determine depths of coding units split from the first coding unit 1420 having a non-square shape, having a longer width than a height, using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, having a longer height than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, using the PIDs for distinguishing the coding units. According to an embodiment, when the split shape mode information of the first coding unit 1410 having a rectangular shape, having a longer height than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. For example, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a center location) has a size different from that of the other coding units. For example, the image decoding apparatus 100 may determine the coding unit of the center location, which has a different size, using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
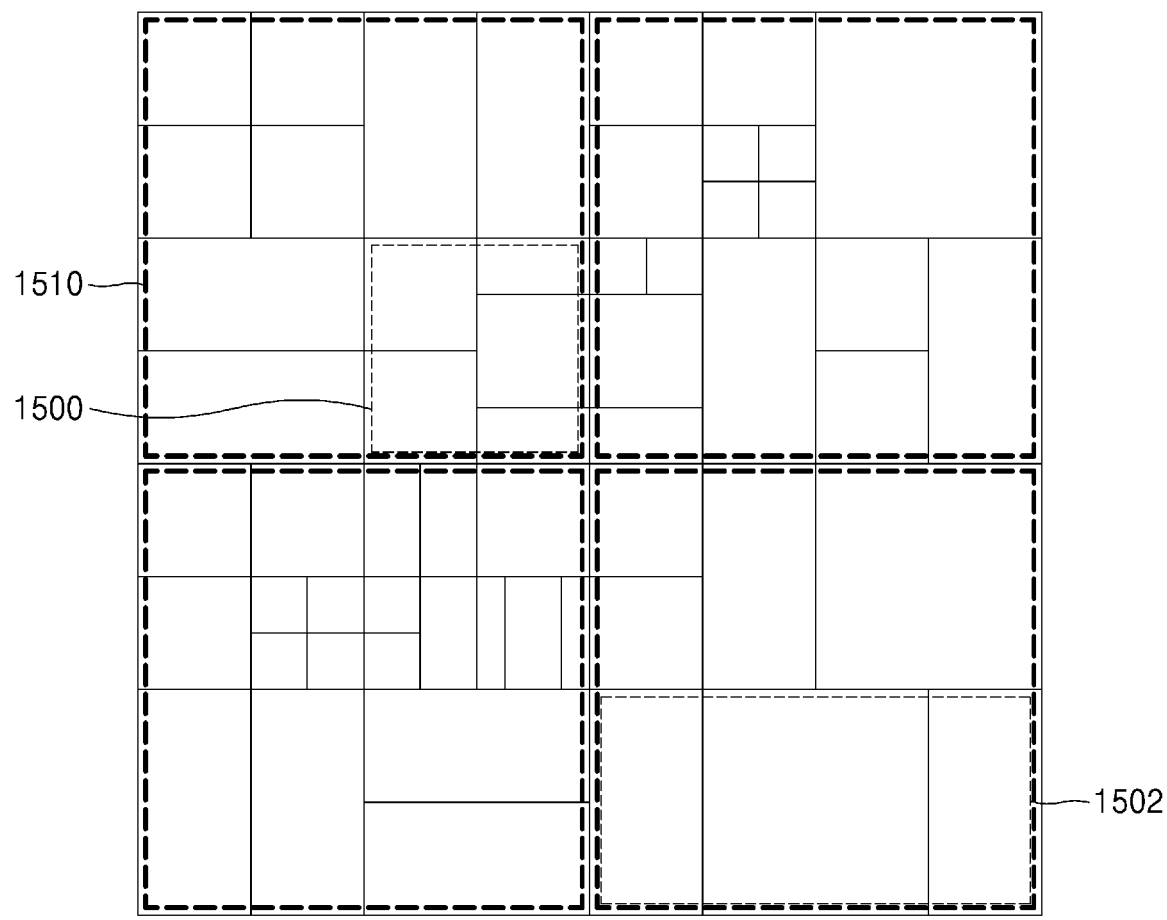
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, using the split shape mode information of each reference data unit. The operation of splitting the reference data unit may correspond to a splitting operation using a quadtree structure.

According to an embodiment, the image decoding apparatus 100 may predetermine the minimum size allowed for the reference data units included in the current picture. Accordingly, the image decoding apparatus 100 may determine various reference data units having sizes equal to or greater than the minimum size, and may determine one or more coding units using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information or reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof are not provided herein.

According to an embodiment, the image decoding apparatus 100 may use a PID for identifying the size and shape of reference coding units, to determine the size and shape of reference coding units according to some data units predetermined based on a preset condition. In other words, the receiver 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. For example, at least one of the size or shape of reference coding units corresponding to the PID for identifying the size and shape of reference coding units may be predetermined. That is, the image decoding apparatus 100 may determine at least one of the size or shape of reference coding units included in a data unit serving as a unit for obtaining the PID, by selecting the predetermined at least one of the size or shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width or height of the largest coding unit may be integer times at least one of the width or height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing unit, and may use the obtained syntax element.

Hereinafter, a method of determining a split rule, according to an embodiment of the disclosure is described in detail.

The image decoding apparatus 100 may determine a split rule of an image. The split rule may be predetermined between the image decoding apparatus 100 and the image encoding apparatus. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image decoding apparatus 100 may previously determine the split rule, based on a block shape of a coding unit. However, embodiments of the disclosure are not limited thereto. The image decoding apparatus 100 may determine the split rule, based on information obtained from a received bitstream.

The shape of the coding unit may include a square and a non-square. When the lengths of the width and height of the coding unit are the same, the image decoding apparatus 100 may determine the shape of the coding unit to be a square. In addition, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Alternatively or additionally, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Alternatively or additionally, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Alternatively or additionally, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Alternatively or additionally, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. The decoding processing orders are described above with reference to FIG. 12, thus, details thereof are not provided again.

Figure 16:
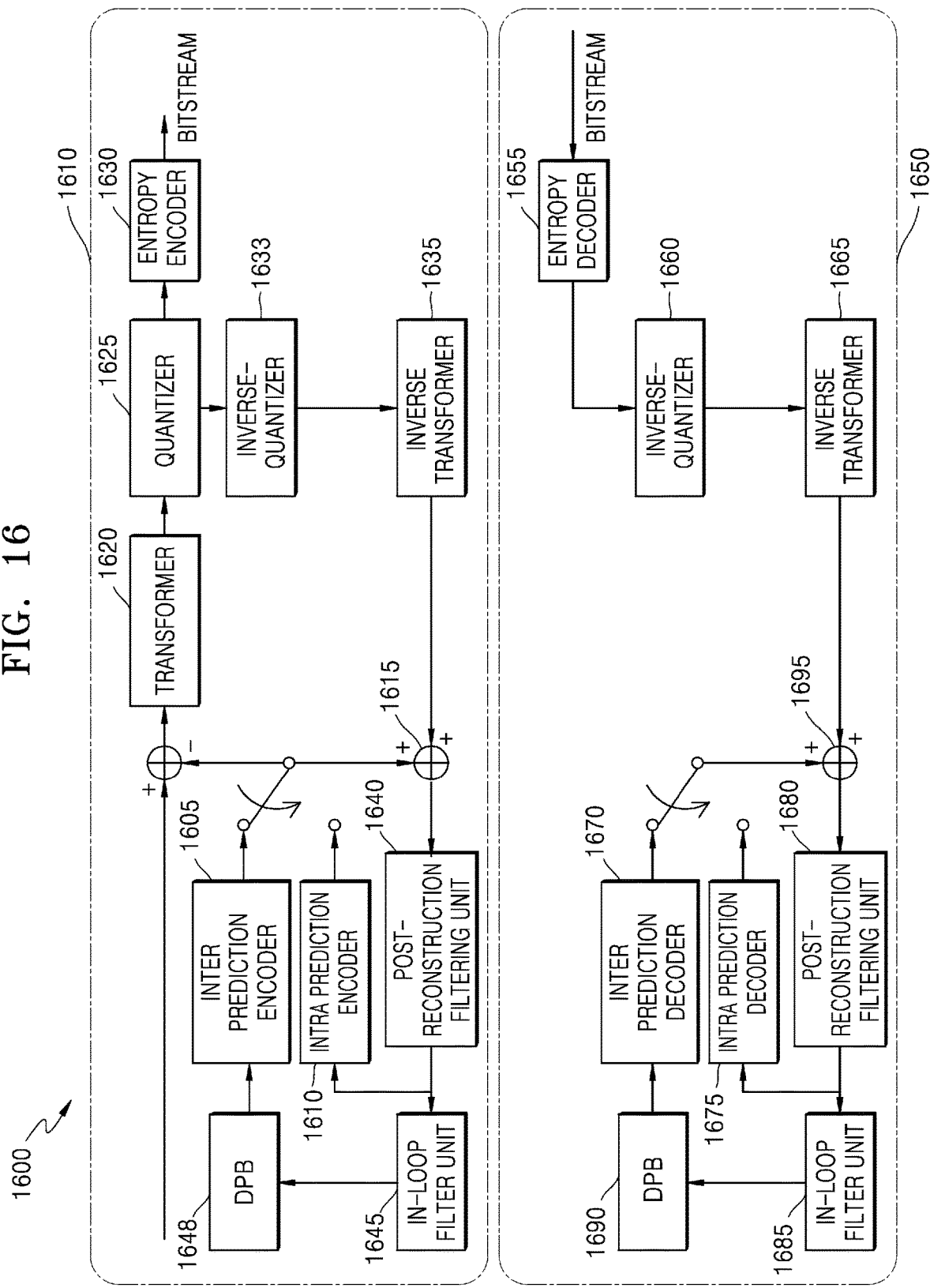
FIG. 16 is a block diagram of an image encoding and decoding system.

FIG. 16 is a block diagram of an image encoding and decoding system.

An encoder 1610 of an image encoding and decoding system 1600 may transmit an encoded bitstream of an image, and a decoder 1650 of the image encoding and decoding system 1600 may receive a bitstream and decode the bitstream to output a reconstructed image. Herein, the decoder 1650 may be a configuration that is similar to the image decoding apparatus 100.

In the encoder 1610, when a prediction mode of a current block is an inter prediction mode, an inter prediction encoder 1605 generates motion information of the current block indicating a reference block of a reference picture temporally adjacent to a current picture. The inter prediction encoder 1605 may determine prediction samples of the current block using samples of reference blocks. To determine prediction samples of the current block using neighboring samples spatially adjacent to the current block, an intra prediction encoder 1610 may determine intra prediction information indicating a direction in which neighboring samples similar to the current block are located or a method of determining the prediction samples. The inter prediction encoder 1605 and the intra prediction encoder 1610 may determine reference samples that are to be used for predicting the current block, from among pre-reconstructed samples stored in a decoded picture buffer (DPB) 1648.

A transformer 1620 outputs transform coefficients by performing transformation on residual sample values obtained by subtracting the prediction samples generated by the inter prediction encoder 1605 or the intra prediction encoder 1610 from an original sample of the current block. A quantizer 1625 quantizes the transform coefficients output by the transformer 1620 to output quantized transform coefficients. An entropy encoder 1630 may encode residual syntax elements including level values of the quantized transform coefficients in the form of a bitstream.

The quantized transform coefficients output by the quantizer 1625 may be inversely quantized and inversely transformed through an inverse-quantizer 1633 and an inverse transformer 1635, and thus residual sample values may be generated again.

An adder 1615 adds the residual sample values to prediction sample values to output a reconstructed sample value. A post-reconstruction filtering unit 1640 may perform post-reconstruction filtering with respect to reconstructed samples, and reconstructed sample values updated through post-reconstruction filtering may be used as reference sample values for intra prediction that is to be performed in the intra prediction encoder 1610. The post-reconstruction filtering unit 1640 may perform Hadamard transform domain filtering or bilateral filtering on the reconstructed sample values.

An in-loop filtering unit 1645 may perform at least one of deblocking filtering or adaptive loop filtering on the reconstructed samples updated through post-reconstruction filtering. Reconstructed sample values updated through the filtering by the in-loop filtering unit 1645 may be stored in the DPB 1648 and may be used as reference sample values for inter prediction to be performed by the inter prediction encoder 1605.

An entropy decoder 1655 of the decoder 1650 may parse residual syntax elements including level values by performing entropy decoding on the received bitstream. The entropy decoder 1655 may reconstruct quantized transform coefficients from the residual syntax elements. An inverse-quantizer 1660 may output transform coefficients by performing inverse quantization on the quantized transform coefficients, and an inverse-transformer 1665 may output residual sample values by performing inverse transformation on the transform coefficients.

An inter prediction decoder 1670 of the decoder 1650 may determine a reference picture temporally adjacent to a current picture using motion information of a current block parsed by the entropy decoder 1655, and may determine a reference block within the reference picture. The inter prediction decoder 1670 may determine prediction samples of the current block using samples of reference blocks. An intra prediction decoder 1675 of the decoder 1650 may determine reference samples spatially adjacent to the current block using intra prediction information of the current block parsed by the entropy decoder 1655, and may determine prediction samples of the current block using the determined neighboring samples. The inter prediction decoder 1670 and the intra prediction decoder 1675 may determine reference samples that are to be used for predicting the current block, from among pre-reconstructed samples stored in a DPB 1690.

An adder 1695 of the decoder 1650 adds the residual sample values to prediction sample values to output a reconstructed sample value of the current block. A post-reconstruction filtering unit 1680 of the decoder 1650 may perform Hadamard transform domain filtering or bilateral filtering on the reconstructed sample values. Reconstructed sample values updated through the post-reconstruction filtering by the post-reconstruction filtering unit 1680 may be used as reference sample values for intra prediction that is to be performed in the intra prediction decoder 1675.

An in-loop filtering unit 1685 of the decoder 1650 may perform at least one of deblocking filtering or adaptive loop filtering on the reconstructed samples updated through post-reconstruction filtering. Reconstructed sample values updated through the filtering by the in-loop filtering unit 1685 may be stored in the DPB 1690 and may be used as reference sample values for inter prediction to be performed by the inter prediction decoder 1670.

An apparatus and method for encoding a motion vector and an apparatus and method for decoding a motion vector, according to an embodiment, are described with reference to FIGS. 17 through 20.

Figure 17:
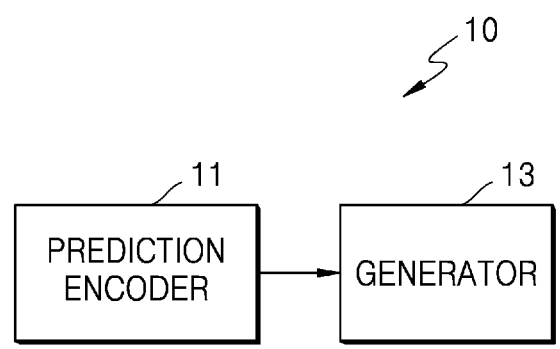
FIG. 17 is a block diagram of a structure of a motion information encoding apparatus according to an embodiment.

A motion information encoding apparatus 10 of FIG. 17 and a motion information encoding method may be included in the above-described encoder 1610 of FIG. 16 and the above-described video encoding method. A motion information decoding apparatus 30 of FIG. 19 and a motion information decoding method may be included in the above-described decoder 1650 of FIG. 16 and the above-described video encoding method.

FIG. 17 is a block diagram of a structure of the motion information encoding apparatus 10 according to an embodiment.

Inter prediction in a video encoding process may refer to a prediction method using similarity between a current image and another image. A reference block similar to a current block of the current image is detected from a reference image encoded earlier than the current image, and a coordinate distance between the current block and the reference block is expressed as a motion vector. A difference between pixel values between the current block and the reference block may be expressed as residual data. Accordingly, due to inter prediction of the current block, instead of directly outputting image information of the current block, an index indicating the reference image, a motion vector, and residual data may be output, thereby improving encoding efficiency.

The motion information encoding apparatus 10 according to an embodiment may encode a motion vector used to inter-predict each image of video in units of blocks.

A block may have a square shape, a rectangular shape, or any geometric shape. A block according to an embodiment is not limited to a certain size of data unit, and may include a largest coding unit, a coding unit, a prediction unit, a transformation unit, or the like from among coding units according to a tree structure.

Video encoding and decoding methods based on coding units according to a tree structure are as described above with reference to FIGS. 1 through 16.

Referring to FIG. 17, the motion information encoding apparatus 10 according to an embodiment may include a prediction encoder 11 and a generator 13. As described above, the motion information encoding apparatus 10 may be included in the encoder 1610 illustrated in FIG. 16. The prediction encoder 11 may be included in the inter prediction encoder 1605 of the encoder 1610, and the generator 13 may be included in the entropy encoder of the encoder 1610.

The motion information encoding apparatus 10 may encode a motion vector by performing inter prediction in units of blocks divided from a picture.

The motion information encoding apparatus 10 according to an embodiment may search a reference image for a most similar prediction block to a current block corresponding to a coding unit or a subblock divided from the coding unit, through motion estimation with respect to the current block, and may determine a motion vector indicating a distance between the current block and a prediction block. For example, the motion vector of the current block may include information of a distant to an x axis and information of a distant to a y axis.

According to an embodiment, the prediction encoder 11 may select one motion vector resolution from among one or more candidate motion vector resolutions as motion vector resolution of the current block, and may determine the motion vector of the current block according to the selected motion vector resolution. The prediction encoder 11 may determine a motion vector of a candidate block mapped to the selected motion vector resolution of the current block from among one or more candidate blocks to be a motion vector predictor of the current block.

According to an embodiment, the prediction encoder 11 may select one candidate block for the current block from among the one or more candidate blocks, and may determine one candidate motion vector resolution mapped to the selected candidate block from among the one or more candidate motion vector resolutions to be the motion vector resolution of the current block.

According to an embodiment, a 1:1 mapping relationship or correspondence relationship between the one or more candidate motion vector resolutions and the one or more candidate blocks may be previously set in the motion information encoding apparatus 10. The one or more candidate motion vector resolutions and the one or more candidate blocks being mapped with each other in a 1:1 relationship may mean that, when one candidate motion vector resolution from among the one or more candidate motion vector resolutions is determined as the motion vector resolution of the current block, a location of one candidate block to be used as the motion vector predictor of the current block is determined, and, when one candidate block to be used as the motion vector predictor of the current block is determined from among the one or more candidate blocks, one candidate motion vector resolution is determined as the motion vector resolution of the current block. In other words, according to an embodiment of the disclosure, candidate blocks may be allocated to the one or more candidate motion vector resolutions, respectively.

The one or more candidate motion vector resolutions may be one or more of motion vector resolution of a ¼ pixel unit, motion vector resolution of a ½ pixel unit, motion vector resolution of a 1 pixel unit, motion vector resolution of a 2 pixel unit, motion vector resolution of a 4 pixel unit, and motion vector resolution of a 8 pixel unit. However, candidate motion vector resolution is not limited to the aforementioned examples, and motion vector resolutions of pixel units having various values may be included in the candidate motion vector resolution.

In the present specification, a first motion vector resolution being lower than a second motion vector resolution refers to a pixel unit of the first motion vector resolution being greater than a pixel unit of the second motion vector resolution. As a pixel unit of motion vector resolution decreases, fine motion prediction is possible. For example, when the motion vector resolution of the 1 pixel unit is lower than the motion vector resolution of the ½ pixel unit, and the motion vector resolution of the ½ pixel unit is lower than the motion vector resolution of the ¼ pixel unit. In actual, when a motion vector is determined as the motion vector resolution of the ¼ pixel unit, more precise prediction is possible than when the motion vector is determined as the motion vector resolution of the 1 pixel unit. In other words, the smaller the pixel unit of motion vector resolution is, namely, the higher the motion vector resolution is, the more fine motion prediction is possible. Alternatively or additionally, the lower the motion vector resolution is, the less fine motion prediction is possible. For convenience of explanation, a difference between heights of motion vector resolutions is explained based on the sizes of the pixel units of the motion vector resolutions.

The one or more candidate blocks may be selected from blocks including a spatial block and a temporal block associated with the current block. The spatial block associated with the current block may include one or more blocks spatially adjacent to the current block. The temporal block may include at least one block located at the same position as the current block within a reference image having a different picture order count (POC) from the POC of the current block, and at least one block spatially adjacent to the block located at the same position as the current block.

According to an embodiment, when the one or more candidate motion vector resolutions may include the motion vector resolution of the ¼ pixel unit, the motion vector resolution of the ½ pixel unit, the motion vector resolution of the 1 pixel unit, the motion vector resolution of the 2 pixel unit, and the motion vector resolution of the 4 pixel unit, and the one or more candidate blocks include a left block, an upper block, an upper right block, an upper left block, and a lower left block, mapping relationships or correspondence relationships of (motion vector resolution of ¼ pixel unit—left block), (motion vector resolution of ½ pixel unit—upper block), (motion vector resolution of 1 pixel unit—upper right block), (motion vector resolution of 2 pixel unit—upper left block), and (motion vector resolution of 4 pixel unit—lower left block) may be set in the motion information encoding apparatus 10. Accordingly, when the prediction encoder 11 selects the motion vector resolution of the ¼ pixel unit as the motion vector resolution of the current block, the prediction encoder 11 may use the motion vector of the left block as the motion vector predictor of the current block. When the prediction encoder 11 selects the upper block as the motion vector predictor of the current block, the prediction encoder 11 may determine the motion vector resolution of the ½ pixel unit as the motion vector resolution of the current block.

According to an embodiment, the prediction encoder 11 may determine one of the one or more candidate motion vector resolutions as the motion vector resolution of the current block and may determine the motion vector of the current block according to the motion vector resolution of the current block.

To determine the motion vector of the current block, the prediction encoder 11 may interpolate the reference image with a minimum motion vector resolution from among the one or more candidate motion vector resolutions.

According to an embodiment, when a candidate motion vector resolution of a smallest pixel unit (e.g., the minimum motion vector resolution) from among the one or more candidate motion vector resolutions has an 1/n pixel unit (where n is a natural number), the prediction encoder 11 may generate a subpixel of an 1/n pixel unit from an integer pixel of the reference image in order to perform motion estimation, and may determine the motion vector of the current block indicating a subpixel of a maximum 1/n pixel unit according to the motion vector resolution of the current block.

Always determining a motion vector with a motion vector resolution of a small pixel unit according to the characteristics of a current image may be less efficient than determining a motion vector with a motion vector resolution of a large pixel unit. When a motion vector is determined with a motion vector resolution of a small pixel unit, a larger number of bits are needed to express the size of the motion vector (or a differential motion vector) than when a motion vector is determined with a motion vector resolution of a large pixel unit. This may cause inefficiency in terms of bitrate. Thus, for example, adaptive determination of motion vector resolution according to the resolution of an image may reduce a bitrate and also minimize quality degradation of a reconstructed image.

The prediction encoder 11 according to an embodiment may adaptively determine the motion vector resolution of the current block, and may determine the motion vector in units of pixel units of the determined motion vector resolution. For example, when the pixel unit of the motion vector resolution of the current block is ½, the prediction encoder 11 may determine a motion vector indicating a pixel of the ½ pixel unit from the reference image interpolated with the minimum motion vector resolution.

The prediction encoder 11 according to an embodiment may use a motion vector of candidate blocks as the motion vector predictor of the current block without changes or may change the motion vector of the candidate blocks and use the changed motion vector of the candidate blocks as the motion vector predictor of the current block.

According to an embodiment, the prediction encoder 11 may adjust the motion vector of the candidate block for the current block, based on a difference between a minimum motion vector resolution from among supportable candidate motion vector resolutions and the motion vector resolution of the current block, and then may determine the motion vector of the current block using the adjusted motion vector.

Because the motion vector of the candidate block has been predicted to indicate a pixel coordinate within an image interpolated according to the minimum motion vector resolution, the motion vector of the candidate block is adjusted to correspond to the motion vector resolution of the current block. The motion vector of the candidate block is also adjusted so that, as is described later, the differential motion vector is represented as an integer unit.

For example, when the motion vector resolution of the current block is the 1 pixel unit, the motion vector of the current block needs to be determined to indicate a pixel of the 1 pixel unit within the image interpolated according to the minimum motion vector resolution. However, when the motion vector of the candidate block does not indicate a pixel of the 1 pixel unit, the motion vector of the candidate block is adjusted to indicate a pixel of the 1 pixel unit.

A method of adjusting the motion vector of the candidate block is described later with reference to FIGS. 25 and 26.

The prediction encoder 11 determines, as the motion vector predictor, the motion vector of the current block according to each of the one or more candidate motion vector resolutions using the motion vectors of the candidate blocks respectively mapped to the one or more candidate motion vector resolutions, and determines one candidate motion vector resolution from among the one or more candidate motion vector resolutions, based on a cost. A rate-distortion cost may be used to calculate the cost.

To determine the motion vector of the current block, the prediction encoder 11 may determine a search start location within the reference image using the motion vector (or the adjusted motion vector) of the candidate block allocated to each of the one or more candidate motion vector resolutions, and may determine the motion vector of the current block according to each of the one or more candidate motion vector resolutions by searching for an optimal reference block according to each of the one or more candidate motion vector resolutions. For example, the prediction encoder 11 may first perform a box search with a search range of five pixels with respect to the vicinity of the search state location. Second, the prediction encoder 11 may perform a diamond search with various step sizes. A raster search may be selectively performed, and thus an optimal location may be determined.

The prediction encoder 11 may compare rate-distortion costs based on differences between the motion vector of the current block determined according to each candidate motion vector resolution and the motion vector of the candidate block allocated to each of the one or more candidate motion vector resolutions, and may determine a candidate motion vector resolution and a candidate block each having a minimum cost as the motion vector of the current block and a candidate block for the motion vector predictor of the current block.

For example, when the motion vector resolution of the ¼ pixel unit mapped to the left block, the motion vector resolution of the ½ pixel unit mapped to the upper block, and the motion vector resolution of the 1 pixel unit mapped to the upper right block are included as the one or more candidate motion vector resolutions, the prediction encoder 11 may determine the motion vector of the current block from the reference image interpolated according to a ¼ pixel unit motion vector resolution, which is a minimum motion vector resolution, to the ¼ pixel unit, using the motion vector of the left block, may determine the motion vector of the current block from the reference image interpolated according to the ¼ pixel unit motion vector resolution to the ½ pixel unit, using the motion vector of the upper block, and may determine the motion vector of the current block from the reference image interpolated according to the ¼ pixel unit motion vector resolution to the 1 pixel unit, using the motion vector of the upper right block. The prediction encoder 11 may determine the candidate motion vector resolution selected based on the cost, as the motion vector resolution of the current block.

According to an embodiment, when no motion vectors exist in some candidate blocks from among the candidate blocks respectively mapped to the candidate motion vector resolutions for the current block, the prediction encoder 11 may exclude a candidate block having no motion vectors and may use another block having a motion vector as a candidate block. For example, the other block newly used as the candidate block may include a block other than the candidate blocks respectively mapped to the candidate motion vector resolutions. The prediction encoder 11 may use, as the motion vector predictor of the current block, a motion vector of the other block determined according to the candidate motion vector resolutions. When a certain block is intra-predicted, the intra-predicted block may be determined to be a block having no motion vectors.

For example, assuming that the one or more supportable candidate motion vector resolutions for the current block include the motion vector resolution of the ¼ pixel unit mapped to the left block, the motion vector resolution of the ½ pixel unit mapped to the upper block, and the motion vector resolution of the 1 pixel unit mapped to the upper right block and no motion vectors exist in the upper right block, the prediction encoder 11 may map the motion vector resolution of the 1 pixel unit to a block other than the candidate block, for example, to the upper left block.

According to an embodiment, when no motion vectors exist in some candidate blocks from among the one or more candidate blocks mapped to the candidate motion vector resolutions, locations and mapping priorities of blocks to be newly mapped may be previously determined.

According to an embodiment, when no motion vectors exist in some candidate blocks from among the one or more candidate blocks mapped to the one or more supportable candidate motion vector resolutions for the current block, the prediction encoder 11 may use an arbitrary motion vector (e.g., a zero vector) as the motion vectors of the some candidate blocks.

According to an embodiment, when there are candidate blocks having the same motion vector from among the one or more candidate blocks mapped to the one or more supportable candidate motion vector resolutions for the current block, the prediction encoder 11 may replace some of the candidate blocks having the same motion vector with other blocks except for the pre-mapped one or more candidate blocks. For example, when the motion vector of the left block mapped to the ¼ pixel unit motion vector resolution is identical with the motion vector of the upper block mapped to the ½ pixel unit motion vector resolution, the prediction encoder 11 may replace one block (e.g., the upper block) from among the left block and the upper block with another block (e.g., the upper left block) and may map the other block to a candidate motion vector resolution (e.g., a ½ pixel resolution).

According to an embodiment, as is described later, a determination as to whether the motion vectors of two or more candidate blocks are identical with each other may be made through a comparison between adjusted motion vectors obtained after the motion vectors of the two or more candidate blocks are completely adjusted.

When there are a plurality of candidate blocks having the same motion vectors, a priority indicating which candidate block from among the plurality of candidate blocks is to be replaced with another block, and types and priorities of blocks to be newly mapped may be pre-determined.

According to an embodiment, when a candidate block of the current block and a motion vector thereof are determined, the prediction encoder 11 may determine a differential motion vector between the motion vector of the current block and the motion vector predictor thereof.

The generator 13 may generate a bitstream including at least one of information representing the motion vector resolution of the current block or information representing the candidate block used as the motion vector predictor of the current block. As described above, because a candidate motion vector resolution and a candidate block have a 1:1 mapping relationship, when the motion vector resolution of the current block is determined, a location of the candidate block may be determined, and, alternatively or additionally, when the candidate block is determined, the motion vector resolution of the current block may be determined. Accordingly, the generator 13 may generate a bitstream including at least one of information about the motion vector resolution of the current block or information for specifying the candidate block.

The generator 13 may include, in the bitstream, an index indicating the motion vector resolution of the current block as at least one of the information representing the motion vector resolution of the current block or the information representing the candidate block used as the motion vector predictor of the current block.

According to an embodiment, when indexes are respectively allocated to the supportable candidate motion vector resolutions for the current block according to a unary method and one index is selected by the prediction encoder 11, the generator 13 may generate a bitstream including the selected index. For example, when the supportable candidate motion vector resolutions include the motion vector resolution of the ¼ pixel unit, the motion vector resolution of the ½ pixel unit, the motion vector resolution of the 1 pixel unit, the motion vector resolution of the 2 pixel unit, the motion vector resolution of the 4 pixel unit, and the motion vector resolution of the 8 pixel unit, the motion vector resolution of the ¼ pixel unit may be represented as an index of 0, the motion vector resolution of the ½ pixel unit may be represented as an index of 10, the motion vector resolution of the 1 pixel unit may be represented as an index of 110, the motion vector resolution of the 2 pixel unit may be represented as an index of 1110, the motion vector resolution of the 4 pixel unit may be represented as an index of 11110, and the motion vector resolution of the 8 pixel unit may be represented as an index of 11111.

According to an embodiment, when indexes are respectively allocated to the one or more candidate blocks respectively mapped to the one or more candidate motion vector resolutions according to a unary method and one index is selected by the prediction encoder 11, the generator 13 may generate a bitstream including the selected index. For example, when the one or more candidate blocks include the left block, the upper block, the upper left block, the lower left block, the upper left block, and the upper right block, the left block may be represented as an index of 0, the upper block may be represented as an index of 10, the upper left block may be represented as an index of 110, may be represented as an index of 1110, the upper left block may be represented as an index of 11110, and the upper right block may be represented as an index of 11111.

According to an embodiment, when there is one supportable candidate motion vector resolution for the current block, the prediction encoder 11 skips generating the information representing the motion vector resolution of the current block and the information representing the candidate block. Accordingly, the bitstream generated by the generator 13 may not include the information representing the motion vector resolution of the current block and the information representing the candidate block.

According to an embodiment, when there are two or more supportable candidate motion vector resolutions for the current block, the prediction encoder 11 may generate at least one of the information representing the motion vector resolution of the current block or the information representing the candidate block as a flag or an index.

According to an embodiment, the prediction encoder 11 may down-scale the differential motion vector between the motion vector of the current block and the motion vector predictor thereof.

For example, when the motion vector resolution of the current block is greater than the minimum motion vector resolution from among the candidate motion vector resolutions, the prediction encoder 11 may down-scale the differential motion vector, based on a difference between the minimum motion vector resolution and the motion vector resolution of the current block. For example, when the minimum motion vector resolution has the ¼ pixel unit and the motion vector resolution of the current block has the ½ pixel unit, the prediction encoder 11 may down-scale the differential motion vector by ½.

According to an embodiment, because the residual motion vector is adaptively or selectively downscaled according to the motion vector resolution adaptively selected for the current block, the motion vector of the current block may be encoded using a smaller number of bits.

The prediction encoder 11 according to an embodiment may determine the motion vector, the reference picture, and the prediction direction of the current block by determining a reference block of the current block by inter-predicting the current block.

The prediction encoder 11 may determine a motion vector resolution set including one or more selectable motion vector resolutions, based on at least one of a POC distance between a current picture including the current block and the reference picture of the current block or the prediction direction.

The generator 13 according to an embodiment may generate a resolution index indicating a motion vector resolution used to inter-predict the current block from among the motion vector resolution set determined by the prediction encoder 11. The generated index may be binarized through a preset method and then quantized to be included in the bitstream. A method, performed by the prediction encoder 11, of determining the motion vector resolution set and a method, performed by the generator 13, of generating the resolution index is described with reference to FIG. 18.

Figure 18:
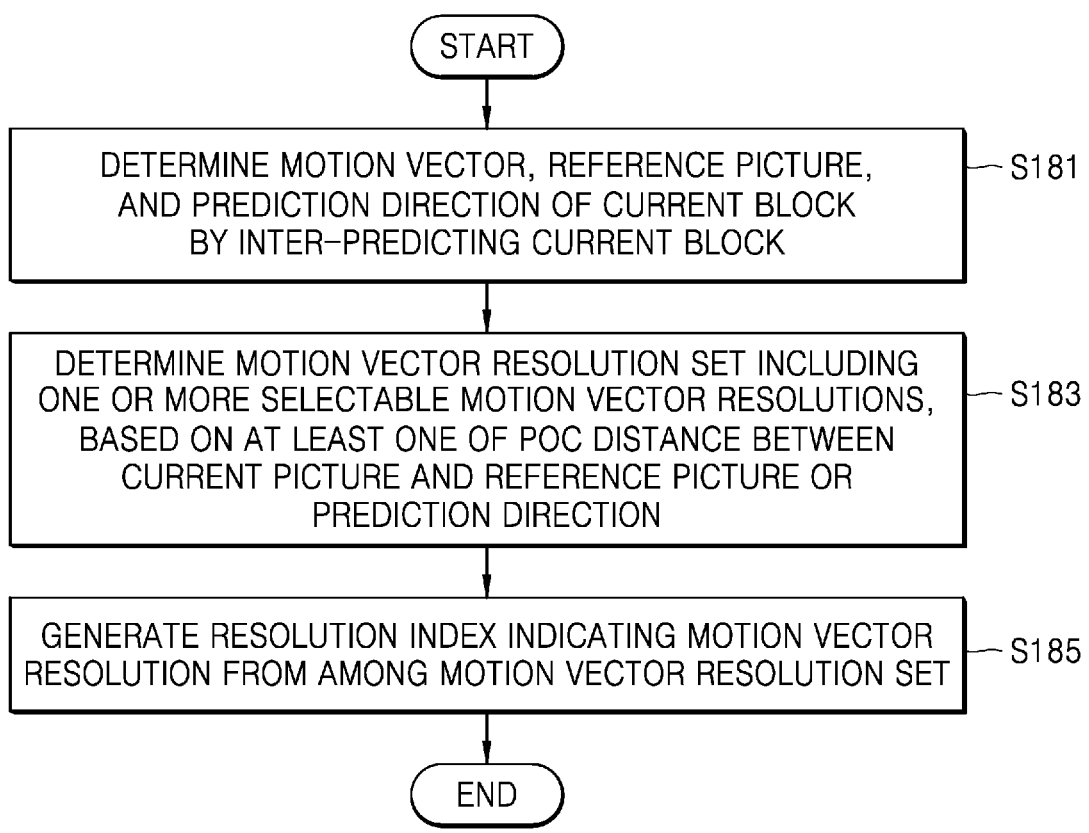
FIG. 18 is a flowchart of a motion information encoding method according to an embodiment.

FIG. 18 is a flowchart of a motion information encoding method according to an embodiment.

In operation S181, the prediction encoder 11 may determine the motion vector, the reference picture, and the prediction direction of the current block by inter-predicting the current block.

In operation S183, the prediction encoder 11 may determine the motion vector resolution set including the one or more selectable motion vector resolutions, based on at least one of the POC distance between the current picture including the current block and the reference picture of the current block or the prediction direction.

The selectable motion vector resolutions according to an embodiment may include at least one of the ¼-pixel unit, the ½-pixel unit, the 1-pixel unit, the 2-pixel unit, or the 4-pixel unit.

When the POC distance between the current picture including the current block and the reference picture of the current block is less than a preset POC distance, the prediction encoder 11 according to an embodiment may determine a first motion vector resolution set including one or more motion vector resolutions from among the selectable motion vector resolutions. When the POC distance between the current picture and the reference picture is not less than (e.g., greater than or equal to) the preset POC distance, the prediction encoder 11 may determine a second motion vector resolution set including one or more motion vector resolutions from among the selectable motion vector resolutions. The first motion vector resolution set may be different from the second motion vector resolution set, and a highest motion vector resolution included in the first motion vector resolution set may be greater than or equal to a highest motion vector resolution included in the second motion vector resolution set. A lowest motion vector resolution included in the first motion vector resolution set may be greater than or equal to a lowest motion vector resolution included in the second motion vector resolution set.

When the POC distance between the current picture including the current block and the reference picture of the current block is less than the preset POC distance, a relatively finer representation capability of a motion vector is needed, and, when the POC distance between the current picture including the current block and the reference picture of the current block is not less than (e.g., greater than or equal to) the preset POC distance, the necessity of a fine representation capability of a motion vector is relatively low. Thus, the motion vector resolutions included in the first motion vector resolution set to be used when the POC distance between the current picture including the current block and the reference picture of the current block is less than the preset POC distance need to be relatively high to represent a finer motion vector than the motion vector resolutions included in the second motion vector resolution set.

According to another embodiment, when the POC distance between the current picture including the current block and the reference picture of the current block is less than a first preset POC distance, the prediction encoder 11 may determine a first motion vector resolution set including one or more motion vector resolutions from among the selectable motion vector resolutions. When the POC distance between the current picture and the reference picture is greater than a second preset POC distance, the prediction encoder 11 may determine a second motion vector resolution set including one or more motion vector resolutions from among the selectable motion vector resolutions. When the POC distance between the current picture and the reference picture is greater than or equal to the first preset POC distance and less than or equal to the second preset POC distance, the prediction encoder 11 may determine a third motion vector resolution set including one or more motion vector resolutions from among the selectable motion vector resolutions. The first motion vector resolution set, the second motion vector resolution set, and the third motion vector resolution set may be different from one another. The number of resolutions included in the second motion vector resolution set may be different from the number of resolutions included in the third motion vector resolution set. A highest motion vector resolution included in the first motion vector resolution set may be greater than or equal to a highest motion vector resolution included in the second motion vector resolution set. A highest motion vector resolution included in the third motion vector resolution set may be included within a precision range of the motion vector resolutions included in the first motion vector resolution set. A lowest motion vector resolution included in the third motion vector resolution set may be included within a precision range of the motion vector resolutions included in the second motion vector resolution set. The precision range of a motion vector resolution set refers to a range between a highest resolution and a lowest resolution included in the motion vector resolution set.

In detail, the motion vector resolutions included in the first motion vector resolution set to be used when the POC distance between the current picture including the current block and the reference picture of the current block is less than the preset POC distance need to be relatively higher than the motion vector resolutions included in the second motion vector resolution set and the third motion vector resolution set. Similarly, the motion vector resolutions included in the third motion vector resolution set need to be relatively higher than the motion vector resolutions included in the second motion vector resolution set. Thus, a precision range of the motion vector resolutions included in the third motion vector resolution set may be determined to span the precision range of the first motion vector resolution set and the precision range of the second motion vector resolution set.

As another example, the prediction encoder 11 may determine a motion vector resolution set according to the prediction direction of the current block. When the prediction direction of the current picture is unidirectional prediction, the prediction encoder 11 may determine a first motion vector resolution set including one or more motion vector resolutions from among the selectable motion vector resolutions. When the prediction direction of the current picture is bidirectional prediction, the prediction encoder 11 may determine a second motion vector resolution set including one or more motion vector resolutions from among the selectable motion vector resolutions. The first motion vector resolution set may be different from the second motion vector resolution set, and a highest motion vector resolution included in the first motion vector resolution set may be greater than or equal to a highest motion vector resolution included in the second motion vector resolution set.

In detail, when the prediction direction of the current block is unidirectional prediction, the prediction encoder 11 performs inter prediction using a motion vector in an L0 direction or an L1 direction. When the prediction direction of the current block is bidirectional prediction, the prediction encoder 11 performs inter prediction using a motion vector obtained by averaging the motion vector in the L0 direction and the motion vector in the L1 direction. Accordingly, a finer representation of a motion vector may be needed in the case of unidirectional prediction than the case of bidirectional prediction. Therefore, the motion vector resolutions included in the first motion vector resolution set to be used when the prediction direction of the current block is unidirectional prediction may be set to be higher than the motion vector resolutions included in the second motion vector resolution set.

As another example, when the prediction direction of the current block is unidirectional prediction, the prediction encoder 11 may determine a selectable first motion vector resolution set, and, when the prediction direction of the current block is bidirectional prediction, the prediction encoder 11 may determine the second motion vector resolution set for an L0 motion vector and may determine the third motion vector resolution set for an L1 motion vector. The second motion vector resolution set may be different from the third motion vector resolution set, the motion vector resolutions included in the first motion vector resolution set may be higher than the motion vector resolutions included in the second motion vector resolution set and the motion vector resolutions included in the third motion vector resolution set.

According to another embodiment, the prediction encoder 11 may determine the motion vector resolution set by taking into account both the POC distance between the current picture and the reference picture and the prediction direction of the current block.

For example, when the prediction direction of the current block is unidirectional prediction and the POC distance between the current picture including the current block and the reference picture of the current block is less than the first preset POC distance, the prediction encoder 11 may determine the first motion vector resolution set including one or more motion vector resolutions from among the selectable motion vector resolutions. When the prediction direction of the current block is unidirectional prediction and the POC distance between the current picture and the reference picture is not less than (e.g., greater than or equal to) the first preset POC distance, the prediction encoder 11 may determine a second motion vector resolution set including one or more motion vector resolutions from among the selectable motion vector resolutions. The first motion vector resolution set may be different from the second motion vector resolution set. A highest motion vector resolution included in the first motion vector resolution set may be greater than or equal to a highest motion vector resolution included in the second motion vector resolution set.

For example, when the prediction direction of the current block is unidirectional prediction and the POC distance between the current picture including the current block and the reference picture of the current block is less than the first preset POC distance, the prediction encoder 11 may determine the first motion vector resolution set. When the prediction direction of the current block is unidirectional prediction and the POC distance between the current picture and the reference picture is greater than the second preset POC distance, the prediction encoder 11 may determine the second motion vector resolution set. When the prediction direction of the current block is unidirectional prediction and the POC distance between the current picture and the reference picture is not less than (e.g., greater than or equal to) the first preset POC distance and is not greater than the second preset POC distance, the prediction encoder 11 may determine the third motion vector resolution set. The first motion vector resolution set, the second motion vector resolution set, and the third motion vector resolution set may be different from one another. A highest motion vector resolution included in the first motion vector resolution set may be greater than or equal to highest motion vector resolutions respectively included in the second and third motion vector resolution sets. The highest motion vector resolution included in the third motion vector resolution set may be greater than or equal to the highest motion vector resolution included in the second motion vector resolution set.

For example, when the prediction direction of the current block is bidirectional prediction, a POC distance between the current picture including the current block and a L0 reference picture of the current block is less than the first preset POC distance, and a POC distance between the current picture including the current block and a L1 reference picture of the current block is less than the first preset POC distance, the prediction encoder 11 may determine a first motion vector resolution set for the L0 motion vector and the L1 motion vector. When the prediction direction of the current block is bidirectional prediction, the POC distance between the current picture including the current block and the L0 reference picture of the current block is greater than the second preset POC distance, and the POC distance between the current picture including the current block and the L1 reference picture of the current block is greater than the second preset POC distance, the prediction encoder 11 may determine a second motion vector resolution set for the L0 motion vector and the L1 motion vector. When the prediction direction of the current block is bidirectional prediction, the POC distance between the current picture including the current block and the L0 reference picture of the current block is not less than (e.g., greater than or equal to) the first preset POC distance and is not greater than the second preset POC distance, and the POC distance between the current picture including the current block and the L1 reference picture of the current block is not less than (e.g., greater than or equal to) the first preset POC distance and is not greater than the second preset POC distance, the prediction encoder 11 may determine a third motion vector resolution set for the L0 motion vector and the L1 motion vector. A highest motion vector resolution included in the first motion vector resolution set may be greater than or equal to highest motion vector resolutions included in the second and third motion vector resolution sets. The highest motion vector resolution included in the third motion vector resolution set may be greater than or equal to the highest motion vector resolution included in the second motion vector resolution set.

As another example, when the prediction direction of the current block is bidirectional prediction, a motion vector resolution set may be individually determined for each prediction direction according to a POC distance between the current picture and the reference picture according to the prediction direction. In detail, according to whether a POC distance between the reference picture and the current picture for L0 prediction is greater than the preset POC distance, the first motion vector resolution set may be determined for L0 prediction. According to whether a POC distance between the reference picture and the current picture for L1 prediction is greater than the preset POC distance, the second motion vector resolution set may be determined for L1 prediction.

The motion information encoding apparatus 10 according to an embodiment may generate one resolution index even when a first motion vector resolution set for L0 prediction is different from a second motion vector resolution set for L1 prediction. In other words, a first motion vector resolution indicated by the resolution index from among the first motion vector resolution set may be different from a second motion vector resolution indicated by the resolution index from among the second motion vector resolution set.

As another example, when the first motion vector resolution set for L0 prediction is different from the second motion vector resolution set for L1 prediction, the motion information encoding apparatus 10 may separately generate an L0 resolution index for L0 prediction and an L1 resolution index for L1 prediction. In other words, a motion vector resolution for L0 prediction indicated by the L0 resolution index from among the first motion vector resolution set and a motion vector resolution for L1 prediction indicated by the L1 resolution index from among the second motion vector resolution set may be individually determined.

The prediction encoder 11 may determine one candidate motion vector resolution from supportable candidate motion vector resolution sets for the current block as the motion vector resolution of the current block, and may determine a candidate block mapped with the selected motion vector resolution from among the one or more candidate blocks as a candidate block for the motion vector predictor of the current block.

Alternatively, when a motion vector resolution is linked to a candidate block location, the motion information encoding apparatus 10 may select a candidate block to be referred to from a candidate block list including one or more candidate blocks, and may determine a candidate motion vector resolution mapped with the selected candidate block as the motion vector resolution of the current block.

The one or more supportable candidate motion vector resolutions may be mapped with the one or more candidate blocks in a 1:1 correspondence, and the motion information encoding apparatus 10 may determine the motion vector of the current block according to each candidate motion vector resolution using each of the one or more supportable candidate motion vector resolutions and the motion vector of a candidate block mapped with each of the one or more supportable candidate motion vector resolutions. The motion information encoding apparatus 10 may select one candidate motion vector resolution and a candidate block selected based on a cost as the motion vector resolution of the current block and the candidate block for the motion vector predictor of the current block.

According to an embodiment, when the motion vector resolution of the current block is linked with a motion vector predictor candidate, the prediction encoder 11 may determine a predictor candidate list including selectable motion vector predictor candidates, based on the motion vector resolution set determined according to the POC distance between the current picture and the reference picture and the prediction direction of the current block.

For example, when the motion vector resolution of the current block is linked with the motion vector predictor candidate, a resolution index indicating a motion vector resolution selected from the motion vector resolution set determined based on at least one of the prediction direction of the current block or the POC distance between the current picture and the reference picture may also indicate a motion vector predictor candidate. In other words, the motion vector of the current block may be inter-predicted using the motion vector predictor candidate indicated by the resolution index from among the motion vector predictor candidate list. For example, when the motion vector resolution of the current block is linked with the motion vector predictor candidate and a resolution index is linked with a predictor index, a motion vector predictor determined from a motion vector predictor list may vary according to a motion vector resolution set. In detail, a case where the selectable motion vector resolutions are the ¼-pixel unit, the ½-pixel unit, the 1-pixel unit, the 2-pixel unit, and the 4-pixel unit and the selectable motion vector predictor candidates are p0, p1, p2, p3, and p4 is described as an example. When a first motion vector resolution set is {¼, ½, 1}, a motion vector predictor candidate list linked with the first motion vector resolution set may be {p0, p1, p2}. When a second motion vector resolution set is {1, 2, 4}, a motion vector predictor candidate list linked with the second motion vector resolution set may be {p0, p1, p2}. When a motion vector resolution is determined to be 1 as a result of prediction encoding, a first resolution index indicating motion vector resolution 1 from among the first motion vector resolution set may be generated as 2. For example, a motion vector predictor indicated by the first resolution index from among the motion vector predictor candidate list is p2. Alternatively or additionally, a second resolution index indicating motion vector resolution 1 from among the second motion vector resolution set may be generated as 0. For example, a motion vector predictor indicated by the second resolution index from among the motion vector predictor candidate list is p0. Thus, the motion vector predictor linked with the first resolution index according to the first motion vector resolution set and the motion vector predictor linked with the first resolution index according to the second motion vector resolution set may be differently determined.

For example, the motion vector resolution selected from the motion vector resolution set determined based on at least one of the prediction direction of the current block or the POC distance between the current picture and the reference picture may be directly linked with a motion vector predictor index. For example, even when a motion vector resolution is selected from different motion vector resolution sets, when the motion vector resolution does not change, the motion vector predictor linked with the motion vector resolution may be uniformly determined. In detail, a case where the selectable motion vector resolutions are the ¼-pixel unit, the ½-pixel unit, the 1-pixel unit, the 2-pixel unit, and the 4-pixel unit and the selectable motion vector predictor candidates are p0, p1, p2, p3, and p4 is described as an example. p0 may be linked to a ¼-pixel unit, p1 may be linked to a ½-pixel unit, p2 may be linked to a 1-pixel unit, p3 may be linked to a 2-pixel unit, and p4 may be linked to a 4-pixel unit. When a first motion vector resolution set is {¼, ½, 1}, a first motion vector predictor candidate list linked with the first motion vector resolution set may be {p0, p1, p2}. When a second motion vector resolution set is {1, 2, 4}, a second motion vector predictor candidate list linked with the second motion vector resolution set may be {p2, p3, p4}. When a motion vector resolution is determined to be 1 as a result of prediction encoding, even when the first motion vector resolution set is different from the second motion vector resolution set and a first motion vector predictor list is different from a second motion vector predictor list, the motion vector predictor linked with the motion vector resolution 1 is p2. Thus, when the motion vector resolution of the current block is linked with the motion vector predictor candidate and the motion vector resolution is linked with the predictor index, a motion vector predictor linked with a motion vector resolution that is uniform even when the motion vector resolution set varies may be uniformly determined.

According to an embodiment, when no motion vectors exist in some of the one or more candidate blocks respectively mapped with the one or more candidate motion vector resolutions, the motion information encoding apparatus 10 may newly map another candidate block except for the one or more candidate blocks respectively mapped with the one or more candidate motion vector resolutions, instead of the candidate blocks having no motion vectors, with a candidate motion vector resolution, and may use the motion vector of the newly mapped candidate block as the motion vector predictor of the current block.

According to an embodiment, when no motion vectors exist in some candidate blocks from among the one or more candidate blocks mapped to the one or more candidate motion vector resolutions, the motion information encoding apparatus 10 may use an arbitrary motion vector (e.g., a zero vector) as the motion vectors of the some candidate blocks.

According to an embodiment, when there are candidate blocks having the same motion vector from among the one or more candidate blocks respectively mapped to the one or more candidate motion vector resolutions, the motion information encoding apparatus 10 may replace some of the candidate blocks having the same motion vectors with the other candidate block except for the one or more candidate blocks respectively mapped with the one or more candidate motion vector resolutions and may newly map the other candidate block with the candidate motion vector resolution.

According to an embodiment, the motion information encoding apparatus 10 determines the motion vector of the current block from an interpolated reference image, according to the motion vector resolution of the current block. The motion information encoding apparatus 10 may adjust the motion vector of the candidate block by comparing a minimum motion vector resolution from among the one or more selectable candidate motion vector resolutions for the current block with the motion vector resolution of the current block. The motion information encoding apparatus 10 may determine a search start location within a reference image according to the adjusted motion vector of the candidate block and may search the reference image for an optimal reference block to thereby determine the motion vector of the current block according to the motion vector resolution of the current block.

The motion information encoding apparatus 10 according to an embodiment obtains a differential motion vector between the motion vector of the current block and the motion vector (or the adjusted motion vector) of the candidate block.

In operation S185, the generator 13 may generate the resolution index indicating a motion vector resolution used to inter-predict the current block from among the motion vector resolution set determined in operation S183.

The generator 13 according to an embodiment may determine a resolution index binarization method, based on the motion vector resolution set determined based on at least one of the POC distance between the current picture and the reference picture or the prediction direction of the current block.

For example, when a motion vector resolution set {¼, ½, 1, 2, 4} is determined, indexes of the resolutions may be determined as 0, 10, 110, 1110, and 1111. When a motion vector resolution set {¼, ½, 1} is determined, indexes of the resolutions may be determined as 0, 10, and 11. When a motion vector resolution set {1, 2, 4} is determined, indexes of the resolutions may be determined as 0, 10, and 11. When a motion vector resolution set {¼, 1} is determined, indexes of the resolutions may be determined as 0 and 1.

According to another embodiment, when a distance between the current picture and the reference picture is significantly large, it may be more efficient to encode a motion vector using a motion vector resolution lower than a motion vector resolution supported by the motion information encoding apparatus 10. For example, the motion vector may be scaled in the ¼-pixel unit, the ½-pixel unit, the 1-pixel unit, the 2-pixel unit, and the 4-pixel unit, which are the supportable motion vector resolutions, to the ½-pixel unit, the 1-pixel unit, the 2-pixel unit, the 4-pixel unit, and the 5-pixel unit, and, when an actually used motion vector resolution set is {½, 2, 8}, a resolution index may be generated using the motion vector resolution set {¼, 1, 4}.

To this end, when the reference picture is a long term picture or a picture significantly far from the current picture, threshold2 may be very greatly set compared to threshold1. For example, when a difference between the POC of the current picture and the POC of the reference picture is less than threshold1 (e.g., |POC_cur−POC_ref|<threshold1), a motion vector resolution list for inter-predicting the current block may be determined to be {¼, ½, 1}. When the difference between the POC of the current picture and the POC of the reference picture is greater than or equal to threshold1 and less than or equal to threshold2 (e.g., threshold1<=|POC_cur−POC_ref|<=threshold2), the motion vector resolution list for inter-predicting the current block may be determined to be {1, 2, 4}. When the difference between the POC of the current picture and the POC of the reference picture is greater than threshold2 (e.g., |POC_cur−POC_ref|>threshold2), use of a motion vector resolution list {2, 4, 8} obtained by scaling the motion vector resolution list {1, 2, 4} by twice may be determined. When the difference between the POC of the current picture and the POC of the reference picture is greater than threshold2, even when a resolution is determined from among the motion vector resolution {2, 4, 8}, the resolution index may be set using the motion vector resolution set {1, 2, 4} not yet scaled. Thus, when the motion vector resolution is determined to be 2, index 0 may be generated so that the resolution index indicates 1 from among {1, 2, 4}, when a motion vector resolution 4 is determined, resolution index 1 is generated to indicate 2 from among {1, 2, 4}, and, when a motion vector resolution 8 is determined, index 2 may be generated to indicate 4 from among {1, 2, 4}. An embodiment of scaling a motion vector resolution by twice has been described above for convenience of explanation, and thus the resolutions included in a motion vector resolution set may be scaled by two time, four times, eight times, or the like according to a pre-determined rule.

The motion information encoding apparatus 10 according to an embodiment may generate at least one of information about the motion vector resolution of the current block or information indicating a candidate block used as a motion vector predictor, and information indicating the differential motion vector.

At least one of the information about the motion vector resolution of the current block or the information indicating a candidate block used as a motion vector predictor, and the information indicating the differential motion vector may be included in the bitstream.

As described above, the motion information encoding apparatus 10 may downscale the differential motion vector by comparing the motion vector resolution of the current block and the minimum motion vector resolution from among the one or more candidate motion vector resolutions.

Figure 19:
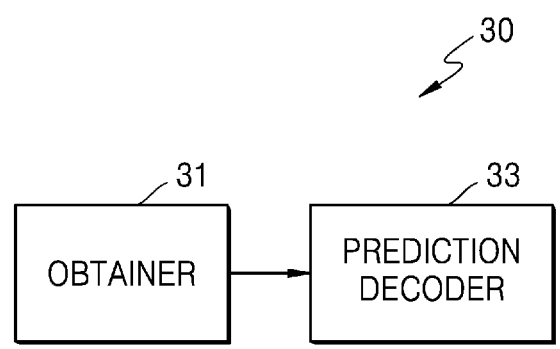
FIG. 19 is a block diagram of a structure of a motion information decoding apparatus according to an embodiment.

FIG. 19 is a block diagram of a structure of the motion information decoding apparatus 30 according to an embodiment. The motion information decoding apparatus 30 of FIG. 19 may be included in the image decoding apparatus 100 of FIG. 1. In detail, an obtainer 31 may be included in the receiver 110 of the image decoding apparatus 100, and a prediction decoder 33 may be included in the decoder 120 of the image decoding apparatus 100. Alternatively or additionally, the motion information decoding apparatus 30 of FIG. 19 may be included in the decoder 1650 of FIG. 16. For example, the obtainer 31 may be included in the entropy decoder 1655 of the decoder 1650, and the prediction decoder 33 may be included in the inter prediction decoder 1670 of the decoder 1650.

The motion information decoding apparatus 30 may determine a motion vector for performing inter prediction of the current block by parsing the obtained bitstream.

The obtainer 31 may obtain at least one of the information about the motion vector resolution of the current block or the information indicating a candidate block, and the information indicating the differential motion vector from the bitstream.

The information about the motion vector resolution of the current block may include an index indicating the motion vector resolution of the current block.

When the resolution index indicating the motion vector resolution of the current block is obtained by the obtainer 31, the prediction decoder 33 may determine a candidate block to be used as a the motion vector predictor of the current block according to the motion vector resolution of the current block.

According to an embodiment, the obtainer 31 may obtain the information about the motion vector resolution in units of predicted coding units.

According to an embodiment, a 1:1 mapping relationship may be established between the one or more selectable candidate motion vector resolutions for the current block and the one or more candidate blocks. Thus, when the resolution index indicating the motion vector resolution of the current block is obtained by the obtainer 31, the prediction decoder 33 may select the candidate block of the current block mapped with the motion vector resolution of the current block.

According to an embodiment, the one or more candidate motion vector resolutions may include at least one of the motion vector resolution of the ¼ pixel unit, the motion vector resolution of the ½ pixel unit, the motion vector resolution of the 1 pixel unit, the motion vector resolution of the 2 pixel unit, or the motion vector resolution of the 4 pixel unit. However, the one or more supportable candidate motion vector resolutions are not limited to the aforementioned examples, and motion vector resolutions of pixel units having various values may be included in the one or more supportable candidate motion vector resolutions.

Resolution indexes 0, 1, 2, 3, and 4 may indicate the motion vector resolution of the ¼ pixel unit, the motion vector resolution of the ½ pixel unit, the motion vector resolution of the 1 pixel unit, the motion vector resolution of the 2 pixel unit, or the motion vector resolution of the 4 pixel unit, respectively. The motion vector resolution of the ¼ pixel unit, the motion vector resolution of the ½ pixel unit, the motion vector resolution of the 1 pixel unit, the motion vector resolution of the 2 pixel unit, and the motion vector resolution of the 4 pixel unit may be mapped with $1^{st}$ MVP, $2^{nd}$ MVP, $3^{rd}$ MVP, $4^{th}$ MVP, and $5^{th}$ MVP, respectively.

According to an embodiment, the one or more candidate blocks may be selected from blocks including a spatial block and a temporal block associated with the current block. The spatial block may include one or more blocks spatially adjacent to the current block. The temporal block may include at least one block located at the same position as the current block within a reference image having a different POC from the POC of the current block, and at least one block spatially adjacent to the block located at the same position as the current block.

According to an embodiment, when the one or more candidate motion vector resolutions may include the motion vector resolution of the ¼ pixel unit, the motion vector resolution of the ½ pixel unit, the motion vector resolution of the 1 pixel unit, and the motion vector resolution of the 2 pixel unit, and the one or more candidate blocks include a left block, an upper block, an upper right block, an upper left block, and a lower left block, the motion information decoding apparatus 30 may determine a candidate block corresponding to a motion vector resolution according to mapping relationships or correspondence relationships of (motion vector resolution of ¼ pixel unit—left block), (motion vector resolution of ½ pixel unit—upper block), (motion vector resolution of 1 pixel unit—upper right block), (motion vector resolution of 2 pixel unit—upper left block), and (motion vector resolution of 4 pixel unit—lower left block). Accordingly, when the motion vector resolution of the ¼ pixel unit is confirmed as the motion vector resolution of the current block, the prediction decoder 33 may use the motion vector of the left block as the motion vector predictor of the current block.

For example, when the prediction decoder 33 determines the one or more selectable candidate motion vector resolutions in units of slices or pictures, the prediction decoder 33 may determine the number of supportable candidate motion vector resolutions for a current slice or a current picture and the types of the supportable candidate motion vector resolutions according to types of slices or pictures. For example, when the prediction decoder 33 determines the one or more selectable candidate motion vector resolutions in units of slices or pictures, the prediction decoder 33 may determine the number of supportable candidate motion vector resolutions for a current slice or a current picture and the types of the supportable candidate motion vector resolutions according to whether a slice or a picture is referred to by another slice or another picture.

According to an embodiment, indexes may be respectively allocated to the supportable candidate motion vector resolutions for the current block according to a unary method, and the prediction decoder 33 may select the motion vector resolution of the current block according to an index indicating the motion vector resolution of the current block obtained by the obtainer 31. For example, when the supportable candidate motion vector resolutions include the motion vector resolution of the ¼ pixel unit, the motion vector resolution of the ½ pixel unit, the motion vector resolution of the 1 pixel unit, the motion vector resolution of the 2 pixel unit, the motion vector resolution of the 4 pixel unit, and the motion vector resolution of the 8 pixel unit, the motion vector resolution of the ¼ pixel unit may be assigned an index of 0, the motion vector resolution of the ½ pixel unit may be assigned an index of 10, the motion vector resolution of the 1 pixel unit may be assigned an index of 110, the motion vector resolution of the 2 pixel unit may be assigned an index of 1110, the motion vector resolution of the 4 pixel unit may be assigned an index of 11110, and the motion vector resolution of the 8 pixel unit may be assigned an index of 11111.

According to an embodiment, indexes may be allocated to the one or more candidate blocks respectively mapped to the one or more candidate motion vector resolutions, respectively, according to a unary method, and the prediction decoder 33 may select a candidate block used for the motion vector predictor of the current block according to the motion vector resolution.

According to an embodiment, when there is one supportable candidate motion vector resolution for the current block, the obtainer 31 may skip or omit obtaining information representing the motion vector resolution of the current block and the candidate block used for the motion vector predictor of the current block. Skipping obtaining information may refer to not obtaining the information from a bitstream.

According to an embodiment, when there are two supportable candidate motion vector resolutions for the current block, the obtainer 31 may obtain a resolution index indicating the motion vector resolution of the current block.

The prediction decoder 33 according to an embodiment may use a motion vector of a candidate block as the motion vector predictor of the current block without changes or may change the motion vector of the candidate block and use the changed motion vector of the candidate block as the motion vector predictor of the current block.

According to an embodiment, when no motion vectors exist in a candidate block mapped to the candidate motion vector resolution of the current block, locations and priorities of other blocks to be newly used may be previously determined.

According to an embodiment, when no motion vectors exist in a candidate block mapped to the candidate motion vector resolution of the current block, the prediction decoder 33 may use an arbitrary motion vector (e.g., a zero vector) as the motion vector predictor of the current block.

According to an embodiment, when there are candidate blocks having the same motion vector from among the one or more candidate blocks mapped to the one or more supportable candidate motion vector resolutions for the current block, the prediction decoder 33 may replace some of the candidate blocks having the same motion vector with other blocks except for the one or more candidate blocks respectively mapped to the one or more supportable candidate motion vector resolutions. For example, when the motion vector of the left block mapped to the ¼ pixel unit motion vector resolution is identical with the motion vector of the upper block mapped to the ½ pixel unit motion vector resolution, the prediction decoder 33 may replace one block (e.g., the upper block) from among the left block and the upper block with another block (e.g., the upper left block) and may map the other block to a candidate motion vector resolution (e.g., a ½ pixel resolution).

When there are a plurality of candidate blocks having the same motion vectors, a priority indicating which candidate block from among the plurality of candidate blocks is to be replaced with another block, and types and priorities of blocks to be newly mapped may be pre-determined.

According to an embodiment, when there are candidate blocks having the same motion vector from among the one or more candidate blocks mapped to the one or more supportable candidate motion vector resolutions for the current block, the prediction decoder 33 may allocate an arbitrary motion vector (e.g., a zero vector) to some of the candidate blocks having the same motion vector. For example, the priorities of the candidate blocks to which the arbitrary motion vector is to be allocated may be pre-determined.

According to an embodiment, when there are candidate blocks having the same motion vector from among the one or more candidate blocks mapped to the one or more supportable candidate motion vector resolutions for the current block, the prediction decoder 33 may induce some of the candidate blocks having the same motion vector using the motion vector of another candidate block.

According to an embodiment, as is described later, a determination as to whether the motion vectors of two or more candidate blocks are identical with each other may be made through a comparison between adjusted motion vectors obtained after the motion vectors of the two or more candidate blocks are completely adjusted.

According to an embodiment, the prediction decoder 33 may upscale the differential motion vector obtained by the obtainer 31, based on a difference between the motion vector resolution of the current block and the minimum motion vector resolution from among the one or more candidate motion vector resolutions. For example, when the motion vector resolution of the current block is greater than the minimum motion vector resolution, the prediction decoder 33 may upscale the differential motion vector.

According to an embodiment, the prediction decoder 33 may selectively adjust the candidate block mapped to the motion vector resolution of the current block.

The prediction decoder 33 may obtain the motion vector of the current block using the selectively adjusted motion vector of the current block and the selectively upscaled differential motion vector.

The upscaling of the differential motion vector and the adjustment of the motion vector of the candidate block are described in detail below.

The prediction decoder 33 may search for a prediction block in a reference image using the motion vector of the current block, and may reconstruct the current block by adding inverse-quantized and inverse-transformed residual data to a found prediction block.

According to an embodiment, when the motion vector resolution of the current block is motion vector resolution of the 1 pixel unit or greater, the prediction decoder 33 may search for a prediction block in a non-interpolated reference image, and, when the motion vector resolution of the current block is motion vector resolution of a pixel unit less than the 1 pixel unit, the prediction decoder 33 may search for a prediction block in an interpolated reference image.

The obtainer 31 according to an embodiment may obtain, from the bitstream, a resolution index indicating a motion vector resolution for inter-predicting the current block, a reference index of the current block, and prediction direction information of the current block.

The prediction decoder 33 according to an embodiment may determine the reference picture of the current block using the reference index of the current block, and may determine whether the prediction direction of the current block is unidirectional prediction in an L0 or L1 direction or bidirectional prediction, using the prediction direction information of the current block. The prediction decoder 33 according to an embodiment may determine the motion vector resolution set including the one or more selectable motion vector resolutions, based on at least one of the current picture of the current block or the prediction direction. The prediction decoder 33 may determine a motion vector based on the prediction direction, according to the motion vector resolution indicated by the resolution index from among the motion vector resolution set.

A method, performed by the motion information decoding apparatus 30, of determining the motion vector resolution set including the one or more selectable motion vector resolutions, based on at least one of the current picture of the current block or the prediction direction is described with reference to FIG. 20.

Figure 20:
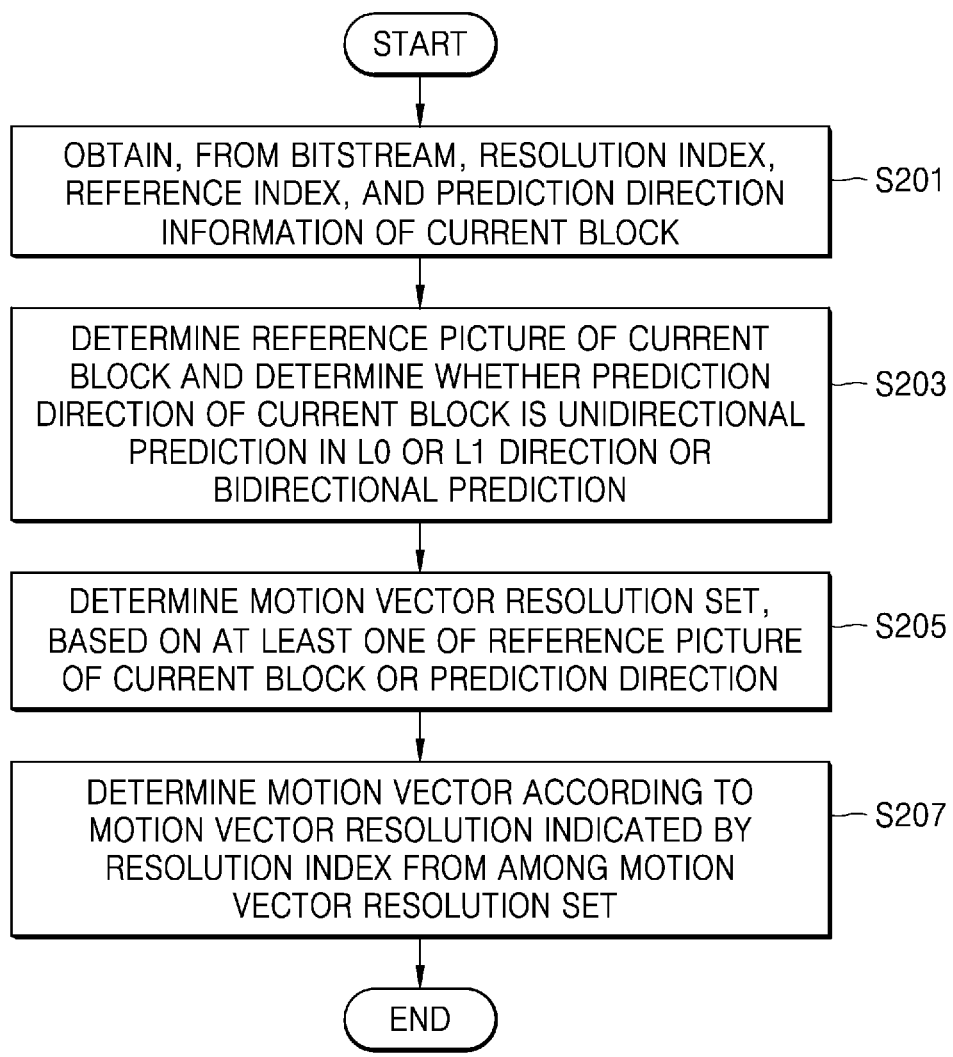
FIG. 20 is a flowchart of a motion information decoding method according to an embodiment.

FIG. 20 is a flowchart of a motion information decoding method according to an embodiment.

In operation S201, the obtainer 31 may obtain, from the bitstream, the resolution index indicating the motion vector resolution for inter-predicting the current block, the reference index of the current block, and the prediction direction information of the current block.

The obtainer 31 according to an embodiment may obtain the differential motion vector of the current block from the bitstream.

In operation S203, the prediction decoder 33 may determine the reference picture of the current block using the reference index of the current block, and may determine whether the prediction direction of the current block is unidirectional prediction in the L0 or L1 direction or bidirectional prediction, using the prediction direction information of the current block.

The prediction decoder 33 according to an embodiment may determine the motion vector resolution of the current block, and the candidate block used to determine the motion vector predictor of the current block. The motion vector resolution of the current block determined by the prediction decoder 33 may correspond to one of the one or more selectable candidate motion vector resolutions for the current block, and the candidate block for the motion vector predictor of the current block may correspond to one of the one or more candidate blocks respectively mapped to the one or more candidate motion vector resolutions.

When the resolution index indicating the motion vector resolution of the current block is obtained from the bitstream, the motion information decoding apparatus 30 may determine the candidate block to be used as the motion vector predictor of the current block, based on the resolution index.

In operation S205, the prediction decoder 33 may determine the motion vector resolution set including the one or more selectable motion vector resolutions, based on at least one of the POC distance between the current picture including the current block and the reference picture of the current block or the prediction direction.

The selectable motion vector resolutions according to an embodiment may include at least one of the ¼-pixel unit, the ½-pixel unit, the 1-pixel unit, the 2-pixel unit, or the 4-pixel unit.

When the POC distance between the current picture including the current block and the reference picture of the current block is less than the preset POC distance, the prediction decoder 33 according to an embodiment may determine the first motion vector resolution set including one or more motion vector resolutions from among the selectable motion vector resolutions. When the POC distance between the current picture and the reference picture is not less than (e.g., greater than or equal to) the preset POC distance, the prediction decoder 33 may determine the second motion vector resolution set including one or more motion vector resolutions from among the selectable motion vector resolutions. The first motion vector resolution set may be different from the second motion vector resolution set, and a highest motion vector resolution included in the first motion vector resolution set may be greater than or equal to a highest motion vector resolution included in the second motion vector resolution set. A lowest motion vector resolution included in the first motion vector resolution set may be greater than or equal to a lowest motion vector resolution included in the second motion vector resolution set.

For example, when the difference between the POC of the current picture and the POC of the reference picture is less than threshold0 (e.g., |POC_cur−POC_ref|<threshold0), the prediction decoder 33 may determine a first motion vector resolution list for inter-predicting the current block to be {¼, ½, 1}. Alternatively or additionally, when the difference between the POC of the current picture and the POC of the reference picture is greater than or equal to threshold0 (e.g., |POC_cur−POC_ref|>=threshold0), the prediction decoder 33 may determine a second motion vector resolution list for inter-predicting the current block to be {1, 2, 4}. As another example, the prediction decoder 33 may determine the first motion vector resolution list to be {¼, ½, 1}, and may determine the second motion vector resolution list to be {¼, 1, 4}. As another example, the prediction decoder 33 may determine the first motion vector resolution list to be {¼, ½, 1, 2, 4}, and may determine the second motion vector resolution list to be {¼, 1, 4}.

According to another embodiment, when the POC distance between the current picture including the current block and the reference picture of the current block is less than the first preset POC distance, the prediction decoder 33 may determine the first motion vector resolution set including one or more motion vector resolutions from among the selectable motion vector resolutions. When the POC distance between the current picture and the reference picture is greater than the second preset POC distance, the prediction decoder 33 may determine the second motion vector resolution set including one or more motion vector resolutions from among the selectable motion vector resolutions. When the POC distance between the current picture and the reference picture is greater than or equal to the first preset POC distance and less than or equal to the second preset POC distance, the prediction decoder 33 may determine the third motion vector resolution set including one or more motion vector resolutions from among the selectable motion vector resolutions. The first motion vector resolution set, the second motion vector resolution set, and the third motion vector resolution set may be different from one another. The number of resolutions included in the second motion vector resolution set may be different from the number of resolutions included in the third motion vector resolution set. A highest motion vector resolution included in the first motion vector resolution set may be greater than or equal to a highest motion vector resolution included in the second motion vector resolution set. A highest motion vector resolution included in the third motion vector resolution set may be included within a precision range of the motion vector resolutions included in the first motion vector resolution set. A lowest motion vector resolution included in the third motion vector resolution set may be included within a precision range of the motion vector resolutions included in the second motion vector resolution set. The precision range of a motion vector resolution set refers to a range between a highest resolution and a lowest resolution included in the motion vector resolution set.

For example, when the difference between the POC of the current picture and the POC of the reference picture is less than threshold1 (e.g., |POC_cur−POC_ref|<threshold1), the prediction decoder 33 may determine the motion vector resolution list for inter-predicting the current block to be {¼, ½, 1}. When the difference between the POC of the current picture and the POC of the reference picture is greater than threshold2 (e.g., |POC_cur−POC_ref|>threshold2), the prediction decoder 33 may determine the motion vector resolution list for inter-predicting the current block to be {1, 2, 4}. When the difference between the POC of the current picture and the POC of the reference picture is greater than or equal to threshold1 and less than or equal to threshold2 (e.g., threshold1<=|POC_cur−POC_ref|<=threshold2), the prediction decoder 33 may determine the motion vector resolution list for inter-predicting the current block to be {¼, ½, 1, 2, 4}.

As another example, when the difference between the POC of the current picture and the POC of the reference picture is less than threshold1 (e.g., |POC_cur−POC_ref|<threshold1), the prediction decoder 33 may determine the motion vector resolution list for inter-predicting the current block to be {¼, ½}. When the difference between the POC of the current picture and the POC of the reference picture is greater than threshold2 (e.g., |POC_cur−POC_ref|>threshold2), the prediction decoder 33 may determine the motion vector resolution list for inter-predicting the current block to be {2, 4}. When the difference between the POC of the current picture and the POC of the reference picture is greater than or equal to threshold1 and less than or equal to threshold2 (e.g., threshold1<=|POC_cur−POC_ref|<=threshold2), the prediction decoder 33 may determine the motion vector resolution list for inter-predicting the current block to be {¼, 1, 4}.

As another example, the prediction decoder 33 may determine the motion vector resolution set according to the prediction direction of the current block. When the prediction direction of the current picture is unidirectional prediction, the prediction decoder 33 may determine the first motion vector resolution set including one or more motion vector resolutions from among the selectable motion vector resolutions. When the prediction direction of the current picture is bidirectional prediction, the prediction decoder 33 may determine the second motion vector resolution set including one or more motion vector resolutions from among the selectable motion vector resolutions. The first motion vector resolution set may be different from the second motion vector resolution set, and a highest motion vector resolution included in the first motion vector resolution set may be greater than or equal to a highest motion vector resolution included in the second motion vector resolution set. A lowest motion vector resolution included in the first motion vector resolution set may be greater than or equal to a lowest motion vector resolution included in the second motion vector resolution set.

In detail, when the prediction direction of the current block is unidirectional prediction, the prediction decoder 33 may determine the motion vector predictor of the current block using the motion vector in the L0 direction or the L1 direction. When the prediction direction of the current block is bidirectional prediction, the prediction decoder 33 may determine the motion vector predictor of the current block using the motion vector obtained by averaging the motion vector in the L0 direction and the motion vector in the L1 direction.

As another example, when the prediction direction of the current block is unidirectional prediction, the prediction decoder 33 may determine the selectable first motion vector resolution set, and, when the prediction direction of the current block is bidirectional prediction, the prediction decoder 33 may determine the second motion vector resolution set for an L0 motion vector and may determine the third motion vector resolution set for an L1 motion vector. The second motion vector resolution set may be different from the third motion vector resolution set, the motion vector resolutions included in the first motion vector resolution set may be higher than the motion vector resolutions included in the second motion vector resolution set and the motion vector resolutions included in the third motion vector resolution set.

For example, when the prediction direction of the current block is unidirectional prediction and L0 prediction, the prediction decoder 33 may determine a motion vector resolution set {¼, ½, 1} for L0 prediction, and, when the prediction direction of the current block is unidirectional prediction and L1 prediction, the prediction decoder 33 may determine a first motion vector resolution set {¼, ½, 1} for L1 prediction. When the prediction direction of the current block is bidirectional prediction, the prediction decoder 33 may determine a second motion vector resolution set {1, 2, 4} for L0 prediction and L1 prediction. As another example, the prediction decoder 33 may determine the first motion vector resolution list to be {¼, ½, 1}, and may determine the second motion vector resolution list to be {¼, 1, 4}. As another example, the prediction decoder 33 may determine the first motion vector resolution list to be {¼, ½, 1, 2, 4}, and may determine the second motion vector resolution list to be {¼, 1, 4}.

As another example, when the prediction direction of the current block is unidirectional prediction and L0 prediction, the prediction decoder 33 may determine a motion vector resolution set {¼, ½} for L0 prediction, and, when the prediction direction of the current block is unidirectional prediction and L1 prediction, the prediction decoder 33 may determine a motion vector resolution set {¼, ½} for L1 prediction. When the prediction direction of the current block is bidirectional prediction, the prediction decoder 33 may determine a motion vector resolution set {1, 4} for L0 prediction and L1 prediction.

According to another embodiment, the prediction decoder 33 may determine the motion vector resolution set by taking into account both the POC distance between the current picture and the reference picture and the prediction direction of the current block.

For example, when the prediction direction of the current block is unidirectional prediction and the POC distance between the current picture including the current block and the reference picture of the current block is less than the first preset POC distance, the prediction decoder 33 may determine the first motion vector resolution set including one or more motion vector resolutions from among the selectable motion vector resolutions. When the prediction direction of the current block is unidirectional prediction and the POC distance between the current picture and the reference picture is not less than (e.g., greater than or equal to) the first preset POC distance, the prediction decoder 33 may determine the second motion vector resolution set including one or more motion vector resolutions from among the selectable motion vector resolutions. The first motion vector resolution set may be different from the second motion vector resolution set. A highest motion vector resolution included in the first motion vector resolution set may be greater than or equal to a highest motion vector resolution included in the second motion vector resolution set. A lowest motion vector resolution included in the first motion vector resolution set may be greater than or equal to a lowest motion vector resolution included in the second motion vector resolution set.

In detail, when the prediction direction of the current block is unidirectional L0 prediction and the difference between the POC of the current picture and the POC of the reference picture is less than threshold0, the prediction decoder 33 may determine the motion vector resolution set {¼, ½, 1} for L0 prediction. When the prediction direction of the current block is unidirectional L0 prediction and the difference between the POC of the current picture and the POC of the reference picture is greater than or equal to threshold0, the prediction decoder 33 may determine the motion vector resolution set {1, 2, 4} for L0 prediction. When the prediction direction of the current block is unidirectional L1 prediction and the difference between the POC of the current picture and the POC of the reference picture is less than threshold0, the prediction decoder 33 may determine the motion vector resolution set {¼, ½, 1} for L1 prediction. When the prediction direction of the current block is unidirectional L1 prediction and the difference between the POC of the current picture and the POC of the reference picture is greater than or equal to threshold0, the prediction decoder 33 may determine the motion vector resolution set {1, 2, 4} for L1 prediction.

For example, when the prediction direction of the current block is unidirectional prediction and the POC distance between the current picture including the current block and the reference picture of the current block is less than the first preset POC distance, the prediction decoder 33 may determine the first motion vector resolution set. When the prediction direction of the current block is unidirectional prediction and the POC distance between the current picture and the reference picture is greater than the second preset POC distance, the prediction decoder 33 may determine the second motion vector resolution set. When the prediction direction of the current block is unidirectional prediction and the POC distance between the current picture and the reference picture is not less than (e.g., greater than or equal to) the first preset POC distance and is not greater than the second preset POC distance, the prediction decoder 33 may determine the third motion vector resolution set. The first motion vector resolution set, the second motion vector resolution set, and the third motion vector resolution set may be different from one another. A highest motion vector resolution included in the first motion vector resolution set may be greater than or equal to highest motion vector resolutions respectively included in the second and third motion vector resolution sets. A lowest motion vector resolution included in the first motion vector resolution set may be greater than or equal to lowest motion vector resolutions respectively included in the second and third motion vector resolution sets. The highest motion vector resolution included in the third motion vector resolution set may be greater than or equal to the highest motion vector resolution included in the second motion vector resolution set.

In detail, when the prediction direction of the current block is unidirectional L0 prediction and the difference between the POC of the current picture and the POC of the reference picture is less than threshold1, the prediction decoder 33 may determine the motion vector resolution set {¼, ½, 1} for L0 prediction. When the prediction direction of the current block is unidirectional L0 prediction and the difference between the POC of the current picture and the POC of the reference picture is greater than threshold2, the prediction decoder 33 may determine the motion vector resolution set {1, 2, 4} for L0 prediction. When the prediction direction of the current block is unidirectional L0 prediction and the difference between the POC of the current picture and the POC of the reference picture is greater than or equal to threshold1 and is less than or equal to threshold2, the prediction decoder 33 may determine the motion vector resolution set {¼, ½, 1, 2, 4} for L0 prediction. When the prediction direction of the current block is unidirectional L1 prediction and the difference between the POC of the current picture and the POC of the reference picture is less than threshold1, the prediction decoder 33 may determine the motion vector resolution set {¼, ½, 1} for L1 prediction. When the prediction direction of the current block is unidirectional L1 prediction and the difference between the POC of the current picture and the POC of the reference picture is greater than threshold2, the prediction decoder 33 may determine the motion vector resolution set {1, 2, 4} for L1 prediction. When the prediction direction of the current block is unidirectional L0 prediction and the difference between the POC of the current picture and the POC of the reference picture is greater than or equal to threshold1 and is less than or equal to threshold2, the prediction decoder 33 may determine the motion vector resolution set {¼, ½, 1, 2, 4} for L1 prediction.

For example, when the prediction direction of the current block is bidirectional prediction, the POC distance between the current picture including the current block and the L0 reference picture of the current block is less than the first preset POC distance, and the POC distance between the current picture including the current block and the L1 reference picture of the current block is less than the first preset POC distance, the prediction encoder 11 may determine a first motion vector resolution set for the L0 motion vector and the L1 motion vector. When the prediction direction of the current block is bidirectional prediction, the POC distance between the current picture including the current block and the L0 reference picture of the current block is greater than the second preset POC distance, and the POC distance between the current picture including the current block and the L1 reference picture of the current block is greater than the second preset POC distance, the prediction encoder 11 may determine a second motion vector resolution set for the L0 motion vector and the L1 motion vector. When the prediction direction of the current block is bidirectional prediction, the POC distance between the current picture including the current block and the L0 reference picture of the current block is not less than (e.g., greater than or equal to) the first preset POC distance and is not greater than the second preset POC distance, and the POC distance between the current picture including the current block and the L1 reference picture of the current block is not less than (e.g., greater than or equal to) the first preset POC distance and is not greater than the second preset POC distance, the prediction encoder 11 may determine a third motion vector resolution set for the L0 motion vector and the L1 motion vector. A highest motion vector resolution included in the first motion vector resolution set may be greater than or equal to highest motion vector resolutions included in the second and third motion vector resolution sets. A lowest motion vector resolution included in the first motion vector resolution set may be greater than or equal to lowest motion vector resolutions respectively included in the second and third motion vector resolution sets. The highest motion vector resolution included in the third motion vector resolution set may be greater than or equal to the highest motion vector resolution included in the second motion vector resolution set.

For example, when the prediction direction of the current block is bidirectional prediction and a distance between the POC of the current picture and the POC of the L0 reference picture is less than threshold1 and a distance between the POC of the current picture and the POC of the L1 reference picture is less than threshold1, the prediction decoder 33 may determine the motion vector resolution set {¼, ½, 1} for the L0 motion vector and the L1 motion vector. When the prediction direction of the current block is bidirectional prediction and the distance between the POC of the current picture and the POC of the L0 reference picture is greater than threshold2 and the distance between the POC of the current picture and the POC of the L1 reference picture is greater than threshold2, the prediction decoder 33 may determine the motion vector resolution set {1, 2, 4} for the L0 motion vector and the L1 motion vector. When the prediction direction of the current block is bidirectional prediction, both the distance between the POC of the current picture and the POC of the L0 reference picture and the distance between the POC of the current picture and the POC of the L1 reference picture threshold1 are not less than (e.g., greater than or equal to) threshold1, and both the distance between the POC of the current picture and the POC of the L0 reference picture and the distance between the POC of the current picture and the POC of the L1 reference picture threshold1 are not large, the prediction decoder 33 may determine the motion vector resolution set {¼, ½, 1, 2, 4} for the L0 motion vector and the L1 motion vector.

As another example, when the prediction direction of the current block is bidirectional prediction, a motion vector resolution set may be individually determined for each prediction direction according to a POC distance between the current picture and the reference picture according to the prediction direction. In detail, when the prediction direction of the current block is bidirectional prediction, the first motion vector resolution set may be determined for L0 prediction according to whether the POC distance between the reference picture and the current picture for L0 prediction is greater than the preset POC distance, and the second motion vector resolution set may be determined for L1 prediction according to whether the POC distance between the reference picture and the current picture for L1 prediction is greater than the preset POC distance.

According to an embodiment, when the first motion vector resolution set for L0 prediction is different from the second motion vector resolution set for L1 prediction, the obtainer 31 may obtain one resolution index from the bitstream. For example, the first motion vector resolution indicated by the resolution index from among the first motion vector resolution set may be different from the second motion vector resolution indicated by the resolution index from among the second motion vector resolution set.

As another example, when the first motion vector resolution set for L0 prediction is different from the second motion vector resolution set for L1 prediction, the obtainer 31 may separately obtain the L0 resolution index for L0 prediction and the L1 resolution index for L1 prediction from the bitstream. In other words, the prediction decoder 33 may individually determine the motion vector resolution for L0 prediction indicated by the L0 resolution index from among the first motion vector resolution set and the motion vector resolution for L1 prediction indicated by the L1 resolution index from among the second motion vector resolution set.

In detail, when the prediction direction of the current block is bidirectional prediction, the motion vector resolution set {¼, ½, 1} may be determined for L0 prediction according to whether the POC distance between the reference picture and the current picture for L0 prediction is greater than the preset POC distance, and the motion vector resolution set {1, 2, 4} may be determined for L1 prediction according to whether the POC distance between the reference picture and the current picture for L1 prediction is greater than the preset POC distance. When a single motion vector resolution is shared for L0 prediction and L1 prediction and the resolution index is 1, ½ from among {¼, ½, 1} may be selected as the motion vector resolution for L0 prediction, and 2 from among {1, 2, 4} may be selected as the motion vector resolution for L1 prediction. When a motion vector resolution index for L0 prediction and a motion vector resolution index for L1 prediction are separately obtained, then when the motion vector resolution index for L0 prediction is 1, ½ from among {¼, ½, 1} may be selected, and, when the motion vector resolution index for L1 prediction is 0, 1 from among {1, 2, 4} may be selected.

The prediction decoder 33 may determine a candidate motion vector resolution indicated by the resolution index from among the supportable candidate motion vector resolution set for the current block as the motion vector resolution of the current block, and may determine a candidate block mapped with the selected motion vector resolution from among the one or more candidate blocks as a candidate block for the motion vector predictor of the current block.

The one or more supportable candidate motion vector resolutions may be mapped with the one or more candidate blocks in a 1:1 correspondence, and the motion information decoding apparatus 30 may determine the motion vector of the current block according to each candidate motion vector resolution using each of the one or more supportable candidate motion vector resolutions and the motion vector of a candidate block mapped with each of the one or more supportable candidate motion vector resolutions.

According to an embodiment, when the motion vector resolution of the current block is linked with a motion vector predictor candidate, the prediction decoder 33 may determine a predictor candidate list including selectable motion vector predictor candidates, based on the motion vector resolution set determined according to the POC distance between the current picture and the reference picture and the prediction direction of the current block.

For example, when the motion vector resolution of the current block is linked with the motion vector predictor candidate, a resolution index indicating a motion vector resolution selected from the motion vector resolution set determined based on at least one of the prediction direction of the current block or the POC distance between the current picture and the reference picture may also indicate a motion vector predictor candidate. In other words, the motion vector of the current block may be inter-predicted using the motion vector predictor candidate indicated by the resolution index from among the motion vector predictor candidate list. For example, when the motion vector resolution of the current block is linked with the motion vector predictor candidate and a resolution index is linked with a predictor index, a motion vector predictor determined from a motion vector predictor list may vary according to a motion vector resolution set. In detail, a case where selectable motion vector resolutions are the ¼-pixel unit, the ½-pixel unit, the 1-pixel unit, the 2-pixel unit, and the 4-pixel unit and selectable motion vector predictor candidates are p0, p1, p2, p3, and p4 is described as an example. When a first motion vector resolution set is {¼, ½, 1}, a motion vector predictor candidate list linked with the first motion vector resolution set may be {p0, p1, p2}. When a second motion vector resolution set is {1, 2, 4}, a motion vector predictor candidate list linked with the second motion vector resolution set may be {p0, p1, p2}. When a motion vector resolution is determined to be 1 as a result of prediction encoding, a first resolution index indicating motion vector resolution 1 from among the first motion vector resolution set may be generated as 2. For example, a motion vector predictor indicated by the first resolution index from among the motion vector predictor candidate list is p2. Alternatively or additionally, a second resolution index indicating motion vector resolution 1 from among the second motion vector resolution set may be generated as 0. For example, a motion vector predictor indicated by the second resolution index from among the motion vector predictor candidate list is p0. Thus, the motion vector predictor linked with the first resolution index according to the first motion vector resolution set and the motion vector predictor linked with the first resolution index according to the second motion vector resolution set may be differently determined.

For example, the motion vector resolution selected from the motion vector resolution set determined based on at least one of the prediction direction of the current block or the POC distance between the current picture and the reference picture may be directly linked with a motion vector predictor index. For example, even when a motion vector resolution is selected from different motion vector resolution sets, when the motion vector resolution does not change, the motion vector predictor linked with the motion vector resolution may be uniformly determined. In detail, a case where selectable motion vector resolutions are the ¼-pixel unit, the ½-pixel unit, the 1-pixel unit, the 2-pixel unit, and the 4-pixel unit and selectable motion vector predictor candidates are p0, p1, p2, p3, and p4 is described as an example. p0 may be linked to a ¼-pixel unit, p1 may be linked to a ½-pixel unit, p2 may be linked to a 1-pixel unit, p3 may be linked to a 2-pixel unit, and p4 may be linked to a 4-pixel unit. When a first motion vector resolution set is {¼, ½, 1}, a first motion vector predictor candidate list linked with the first motion vector resolution set may be {p0, p1, p2}. When a second motion vector resolution set is {1, 2, 4}, a second motion vector predictor candidate list linked with the second motion vector resolution set may be {p2, p3, p4}. When a motion vector resolution is determined to be 1 as a result of prediction encoding, even when the first motion vector resolution set is different from the second motion vector resolution set and a first motion vector predictor list is different from a second motion vector predictor list, the motion vector predictor linked with the motion vector resolution 1 is p2. Thus, when the motion vector resolution of the current block is linked with the motion vector predictor candidate and the motion vector resolution is linked with the predictor index, a motion vector predictor linked with a motion vector resolution that is uniform even when the motion vector resolution set varies may be uniformly determined.

The prediction decoder 33 according to an embodiment determines the motion vector of the current block from an interpolated reference image, according to the motion vector resolution of the current block. The prediction decoder 33 may adjust the motion vector of the candidate block according to the motion vector resolution of the current block. The prediction decoder 33 may determine the reference block in the reference image according to the adjusted motion vector of the candidate block.

The prediction decoder 33 may determine the motion vector of the current block using the motion vector resolution indicated by the resolution index from among the motion vector resolution set determined in operation S205.

The prediction decoder 33 according to an embodiment may determine a debinarization method of a resolution index, based on the motion vector resolution set determined based on at least one of the POC distance between the current picture and the reference picture or the prediction direction of the current block.

For example, when a motion vector resolution set {¼, ½, 1, 2, 4} is determined, indexes of the resolutions may be determined as 0, 10, 110, 1110, and 1111. When a motion vector resolution set {¼, ½, 1} is determined, indexes of the resolutions may be determined as 0, 10, and 11. When a motion vector resolution set {1, 2, 4} is determined, indexes of the resolutions may be determined as 0, 10, and 11. When a motion vector resolution set {¼, 1} is determined, indexes of the resolutions may be determined as 0 and 1. Thus, because a debinarization method may vary according to the motion vector resolution set, the prediction decoder 33 may determine the motion vector resolution indicated by the resolution index from among the motion vector resolution set using a debinarization method suitable for the motion vector resolution set.

According to another embodiment, when a distance between the current picture and the reference picture is significantly large, it may be more efficient to decode a motion vector using a motion vector resolution lower than a motion vector resolution supported by the motion information decoding apparatus 30. For example, a motion vector resolution to be actually used may be determined from among a motion vector resolution set {½, 2, 8}, by scaling the ¼-pixel unit, the ½-pixel unit, the 1-pixel unit, the 2-pixel unit, and the 4-pixel unit, which are the supportable motion vector resolutions, to the ½-pixel unit, the 1-pixel unit, the 2-pixel unit, the 4-pixel unit, and the 5-pixel unit and scaling a motion vector resolution corresponding to the resolution index from among a motion vector resolution set {¼, 1, 4} by two times.

To this end, when the reference picture is a long term picture or a picture significantly far from the current picture, threshold2 may be very greatly set compared to threshold1. For example, when the difference between the POC of the current picture and the POC of the reference picture is less than threshold1 (e.g., |POC_cur−POC_ref|<threshold1), a motion vector resolution list for inter-predicting the current block may be determined to be {¼, ½, 1}. When the difference between the POC of the current picture and the POC of the reference picture is greater than or equal to threshold1 and less than or equal to threshold2 (e.g., threshold1<=|POC_cur−POC_ref|<=threshold2), the motion vector resolution list for inter-predicting the current block may be determined to be {1, 2, 4}. When the difference between the POC of the current picture and the POC of the reference picture is greater than threshold2 (e.g., |POC_cur−POC_ref|>threshold2), use of a motion vector resolution list {2, 4, 8} obtained by scaling the motion vector resolution list {1, 2, 4} by twice may be determined. When the difference between the POC of the current picture and the POC of the reference picture POC is greater than threshold2, a motion vector resolution indicated by the resolution index may be determined from among the motion vector resolution set {2, 4, 8} obtained by scaling the motion vector resolution list {1, 2, 4} by twice. Accordingly, when an obtained resolution index 0 indicates 1 from among the motion vector resolution set {1, 2, 4}, the motion vector resolution to be actually used may be determined to be 2, when an obtained resolution index 1 indicates 2 from among the motion vector resolution set {1, 2, 4}, the motion vector resolution to be actually used may be determined to be 4, and when an obtained resolution index 2 indicates 4 from among the motion vector resolution set {1, 2, 4}, the motion vector resolution to be actually used may be determined to be 8. An embodiment of scaling a motion vector resolution by twice has been described above for convenience of explanation, and thus the resolutions included in a motion vector resolution set may be scaled by two time, four times, eight times, or the like according to a pre-determined rule.

In operation S207, the prediction decoder 33 may determine a motion vector based on the prediction direction, according to the motion vector resolution indicated by the resolution index from among the motion vector resolution set.

When the differential motion vector between the motion vector of the current block and the motion vector (or the adjusted motion vector) of the candidate block obtained by the obtainer 31 according to an embodiment exists, the prediction decoder 33 may obtain the motion vector of the current block using the motion vector of the candidate block and the differential motion vector.

According to an embodiment, the motion information decoding apparatus 30 may selectively adjust the motion vector of the candidate block according to the difference between the motion vector resolution of the current block and the minimum motion vector resolution, and may selectively upscale the differential motion vector according to the difference between the minimum motion vector resolution and the motion vector resolution of the current block.

In the motion information encoding apparatus 10 and the motion information decoding apparatus 30 according to an embodiment, inter prediction is performed using only available motion vector resolutions according to the characteristics of the motion information of the current block, and a resolution index indicating an actually used motion vector resolution among a set including only the available motion vector resolutions is used, and thus the bit amount of an index for encoding or decoding the resolution index in units of coding units may be reduced.

Figure 21:
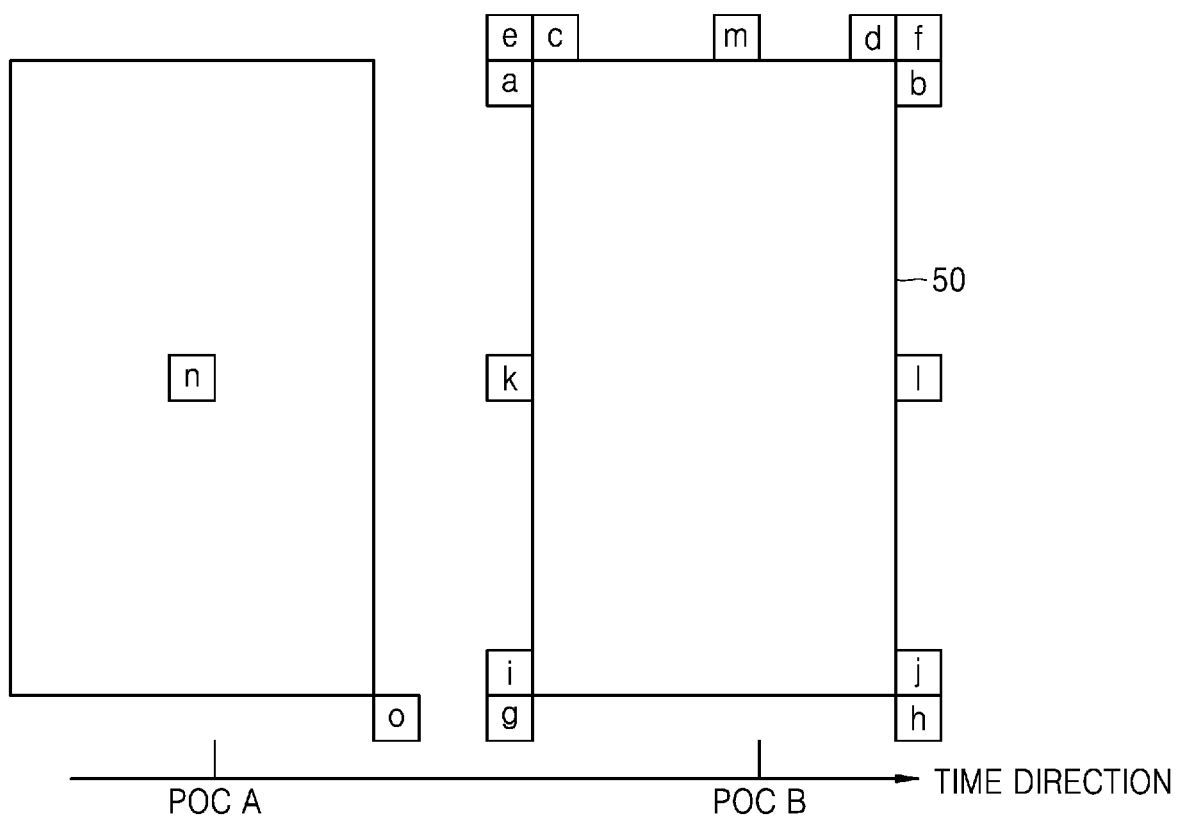
FIG. 21 is a view for explaining one or more candidate blocks mapped to one or more candidate motion vector resolutions in a 1:1 correspondence.
Figure 24A:
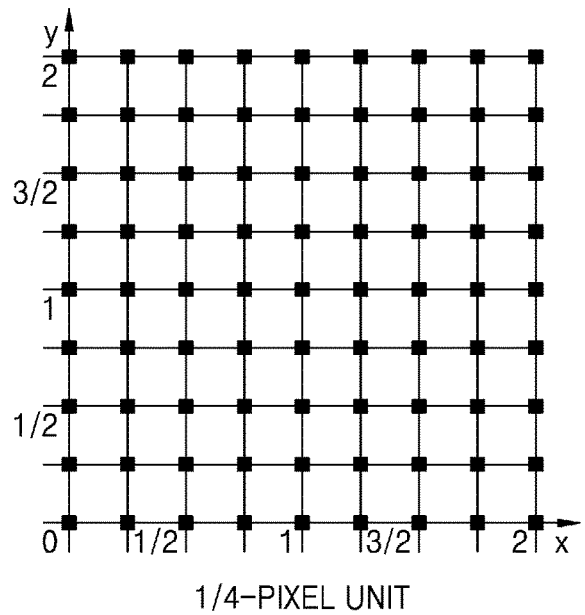
FIG. 24A illustrates locations of pixels that may be indicated by a motion vector of a ¼ pixel unit motion vector resolution, when a supportable minimum motion vector resolution is a ¼ pixel unit.
Figure 24B:
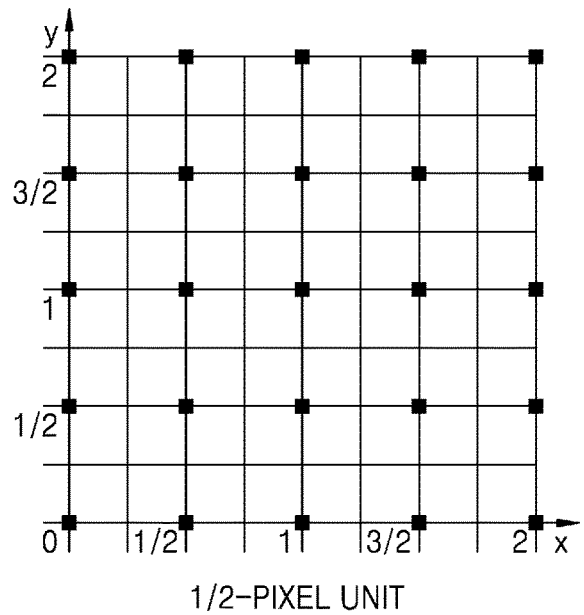
FIG. 24B illustrates locations of pixels that may be indicated by a motion vector of a ½ pixel unit motion vector resolution, when a supportable minimum motion vector resolution is a ¼ pixel unit.
Figure 24C:
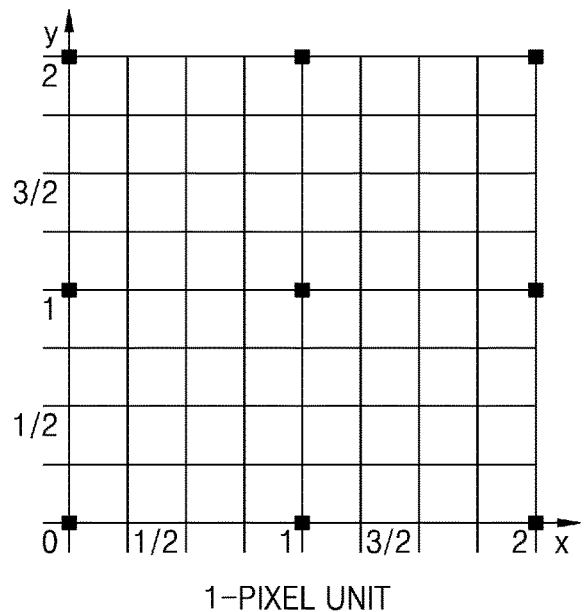
FIG. 24C illustrates locations of pixels that may be indicated by a motion vector of a 1 pixel unit motion vector resolution, when a supportable minimum motion vector resolution is a ¼ pixel unit.
Figure 24D:
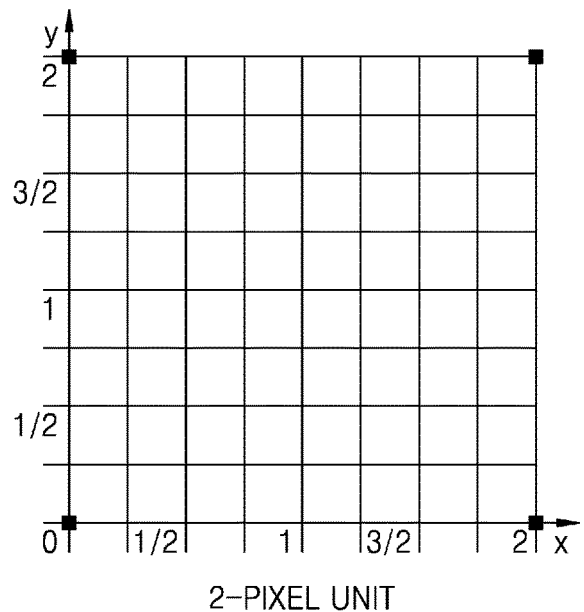
FIG. 24D illustrates locations of pixels that may be indicated by a motion vector of a 2 pixel unit motion vector resolution, when a supportable minimum motion vector resolution is a ¼ pixel unit.

FIG. 21 is a view for explaining one or more candidate blocks mapped to one or more candidate motion vector resolutions in a 1:1 correspondence.

One or more candidate blocks selected from spatial blocks and temporal blocks associated with a current block 50 may be mapped to candidate motion vector resolutions, respectively.

For example, the spatial blocks may include an upper left block a, an upper right block b, an upper left block c, an upper right block d, an upper left corner block e, an upper right corner block f, a lower left corner block g, a lower right corner block h, a lower left block i, a lower right block j, a left block k, a right block l, and an upper block m which are adjacent to the current block 50. The temporal blocks may include a co-located block n belonging to a reference image having a different POC from the current block 50, and an adjacent block o of the co-located block.

The one or more candidate blocks selected from among the spatial blocks and the temporal blocks may be mapped to the candidate motion vector resolutions, respectively. As shown in FIG. 22, the motion vector resolution of the ¼ pixel unit may be mapped to the left block k, the motion vector resolution of the ½ pixel unit may be mapped to the upper block m, the motion vector resolution of the 1 pixel unit may be mapped to the upper left block a, the motion vector resolution of the 2 pixel unit may be mapped to the upper left block c, and the motion vector resolution of the 4 pixel unit may be mapped to the lower left block i. The shown mapping relationship is merely an example, and thus various other mapping relations may be set.

According to the example shown in FIG. 22, when the motion information encoding apparatus 10 determines the motion vector resolution of the current block as the ¼ pixel unit, the motion information encoding apparatus 10 uses a motion vector of the left block as the motion vector predictor of the current block. When the motion information encoding apparatus 10 uses a motion vector of the upper block as the motion vector predictor of the current block, the motion information encoding apparatus 10 may determine the motion vector resolution of the current block as the ½ pixel unit.

When the motion information decoding apparatus 30 confirms the motion vector resolution of the current block as the ¼ pixel unit, the motion information decoding apparatus 30 uses the motion vector of the left block as the motion vector predictor of the current block. When the motion information decoding apparatus 30 confirms that the motion vector of the upper block is used as the motion vector predictor of the current block, the motion information decoding apparatus 30 may determine the motion vector resolution of the current block as the ½ pixel unit.

Figure 23:
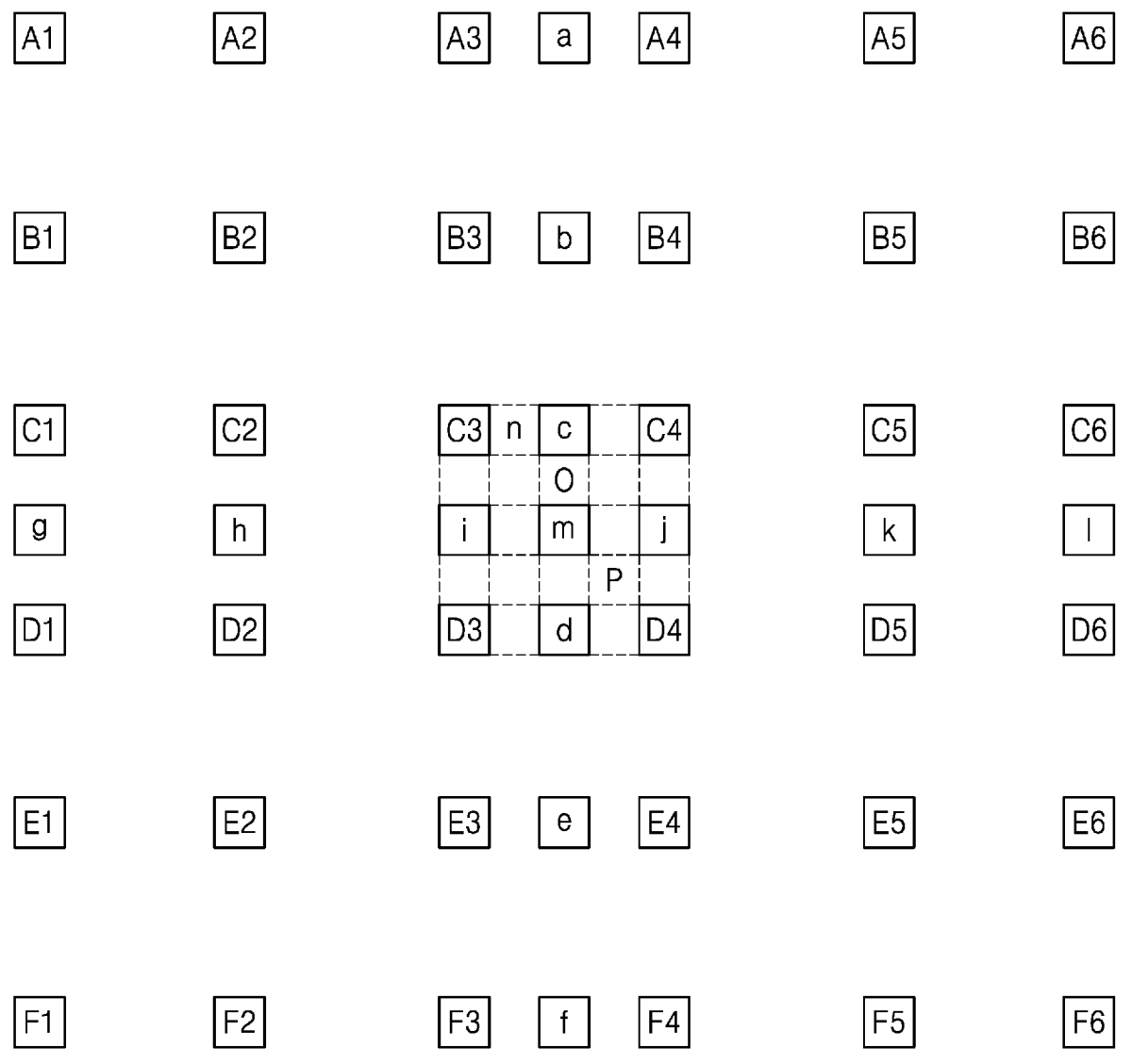

FIG. 23 is a view for explaining interpolation for determining a motion vector according to various motion vector resolutions.

The motion information encoding apparatus 10 may determine the motion vector of the current block according to the one or more candidate motion vector resolutions in order to inter-predict the current block. The supportable candidate motion vector resolutions may include motion vector resolution of a 2k pixel unit (where k is an integer). When k is greater than 0, a motion vector may indicate only integer pixels within an interpolated reference image. When k is less than 0, the motion vector may indicate subpixels and the integer pixels within the interpolated reference image.

For example, when the minimum motion vector resolution has the ¼ pixel unit, the motion information encoding apparatus 10 may interpolate the reference image so that the subpixels of the ¼ pixel unit are generated, and may determine the motion vector so that the motion vector indicates a pixel corresponding to a candidate motion vector resolution, for example, a ¼ pixel unit motion vector resolution, a ½ pixel unit motion vector resolution, a 1 pixel unit motion vector resolution, or a 2 pixel unit motion vector resolution.

For example, the motion information encoding apparatus 10 may generate subpixels a through l of the ½ pixel unit by performing interpolation on the reference image using an n-tap finite impulse response (FIR) filter. Regarding ½ subpixels in a vertical direction, interpolation is performed using A1, A2, A3, A4, A5, and A6 in integer pixel units to generate a subpixel a, and interpolation is performed using B1, B2, B3, B4, B5, and B6 in integer pixel units to generate a subpixel b. In the same manner as described above, subpixels c, d, e, and f may be generated.

Pixel values of subpixels in the vertical direction may be calculated as follows. For example, the pixel values of subpixels in the vertical direction may be calculated as in $a=(A1-5\times A2+20\times A3+20\times A4-5\times A5+A6)/32$, $b=(B1-5\times B2+20\times B3+20\times B4-5\times B5+B6)/32$. Pixel values of the subpixels c, d, e, and f may be calculated using the same method as described above.

The motion information encoding apparatus 10 may generate subpixels in a horizontal direction by performing interpolation using a 6-tap FIR filter, like the subpixels in the vertical direction. The motion information encoding apparatus 10 may generate a subpixel g using A1, B1, C1, D1, E1, and F1 and may generate a subpixel h using A2, B2, C2, D2, E2, and F2.

Pixel values of the subpixels in the horizontal direction are also calculated using the same method as the method used to generate the pixel values of the subpixels in the vertical direction. For example, the pixel values of the subpixels in the horizontal direction may be calculated as in $g=(A1-5\times B1+20\times C1+20\times D1-5\times E1+F1)/32$.

A subpixel m of the ½ pixel unit in a diagonal direction may be interpolated using another ½ pixel unit subpixel. In other words, a pixel value of the subpixel m may be calculated as $m=(a-5\times b+20\times c+20\times d-5\times e+f)/32$.

When subpixels of the ½ pixel unit are generated, the motion information encoding apparatus 10 may generate subpixels of the ¼ pixel unit using integer pixels and the subpixels of the ½ pixel unit. The subpixels of the ¼ pixel unit may be generated by performing interpolation using two adjacent pixels. Alternatively, the subpixels of the ¼ pixel unit may be generated by directly applying an interpolation filter to pixel values of the integer pixels without using the subpixel values of the ½ pixel unit.

Although the above-described interpolation filter has been described above using a 6-tap filter as an example, the motion information encoding apparatus 10 may interpolate a picture using a filter having a different number of taps from the 6-tap filter. Examples of the interpolation filter may include a 4-tap filter, a 7-tap filter, an 8-tap filter, and a 12-tap filter.

FIGS. 24A-24D illustrate locations of pixels that may be indicated by motion vectors in correspondence with the ¼ pixel unit motion vector resolution, the ½ pixel unit motion vector resolution, the 1 pixel unit motion vector resolution, and the 2 pixel unit motion vector resolution, when a supportable minimum motion vector resolution is the ¼ pixel unit motion vector resolution.

FIGS. 24A-24D illustrate coordinates (marked with black rectangles) of the pixels that may be indicated by the motion vectors of the ¼ pixel unit motion vector resolution, the ½ pixel unit motion vector resolution, the 1 pixel unit motion vector resolution, and the 2 pixel unit motion vector resolution with respect to coordinates (0, 0), respectively.

When the minimum motion vector resolution is the ¼ pixel unit motion vector resolution, coordinates of a pixel that may be indicated by the motion vector of the ¼ pixel unit motion vector resolution are (a/4, b/4) (where a and b are integers), coordinates of a pixel that may be indicated by the motion vector of the ½ pixel unit motion vector resolution are (2c/4, 2d/4) (where c and d are integers), coordinates of a pixel that may be indicated by the motion vector of the 1 pixel unit motion vector resolution are (4e/4, 4f/4) (where e and f are integers), and coordinates of a pixel that may be indicated by the motion vector of the 2 pixel unit motion vector resolution are (8g/4, 8h/4) (where g and h are integers). In other words, when the minimum motion vector resolution has a 2m (where m is an integer) pixel unit, coordinates of a pixel that may be indicated by a 2n (where n is an integer) pixel unit motion vector resolution are (2n−m×i/2−m, 2n−m×j/2−m) (where i and j are integers). Even when a motion vector is determined according to a specific motion vector resolution, the motion vector is expressed as coordinates in an image interpolated according to a ¼ pixel unit.

According to an embodiment, because the motion information encoding apparatus 10 determines a motion vector from an image interpolated according to the minimum motion vector resolution, a motion vector (and a motion vector predictor) may be multiplied by a reciprocal of a pixel unit value of the minimum motion vector resolution, for example, by 2 minus m (e.g., 2−m) when the minimum motion vector resolution has a 2m (where m is an integer) pixel unit, to represent a motion vector of an integer unit, so that the motion vector (and the motion vector predictor) may be expressed as an integer. The motion vector of the integer unit obtained via the multiplication by 2−m may be used in the motion information encoding apparatus 10 and the motion information decoding apparatus 30.

When the motion vector of the ½ pixel unit motion vector resolution starting from the coordinates (0, 0) indicates coordinates (2/4, 6/4) and the minimum motion vector resolution has the ¼ pixel unit, the motion information encoding apparatus 10 may determine, as the motion vector, (2, 6) that is a value resulting from a multiplication of the motion vector by an integer of 4.

When the size of the motion vector resolution is less than the 1 pixel unit, the motion information encoding apparatus 10 according to an embodiment may search for a block similar to the current block within the reference image, using a motion vector determined in an integer pixel unit, based on a subpixel unit, in order to perform motion prediction with the subpixel unit.

For example, when the motion vector resolution of the current block is the ¼ pixel unit motion vector resolution, the motion information encoding apparatus 10 may determine a motion vector in an integer pixel unit, may interpolate the reference image so that subpixels of the ½ pixel unit are generated, and then may search for a most similar prediction block within the range of (−1−1, −1−1), based on a motion vector determined in an integer pixel unit. Next, the motion information encoding apparatus 10 may interpolate the reference image so that subpixels of the ¼ pixel unit are generated, and then search for a most similar prediction block within the range of (−1−1, −1−1), based on a motion vector determined in the ½ pixel unit, thereby determining the motion vector of the final ¼ pixel unit motion vector resolution.

For example, when the motion vector of the integer pixel unit is (−4, −3) based on the coordinates (0,0), the motion vector in the ½ pixel unit motion vector resolution is (−8, −6) (=(−4×2, −3×2)), and, when the motion vector moves by (0, −1), the motion vector of the ½ pixel unit motion vector resolution is finally determined as (−8, −7) (=(−8, −6−1)). When the motion vector in the ¼ pixel unit motion vector resolution is changed to (−16, −14) (=(−8×2, −7×2)) and moves again by (−1,0), a final motion vector of the ¼ pixel unit motion vector resolution may be determined as (−17, −14) (=(−16−1, −14)).

When the motion vector resolution of the current block is greater than the 1 pixel unit motion vector resolution, the motion information encoding apparatus 10 according to an embodiment search for a block similar to the current block within the reference picture, using a motion vector determined in the integer pixel unit, based on a larger pixel unit than the 1 pixel unit, in order to perform motion prediction with a large pixel unit. Pixels located at larger pixel units (e.g., the 2 pixel unit, the 3 pixel unit, and the 4 pixel unit) than the 1 pixel unit may be referred to as super pixels.

A motion vector predictor adjustment method selectively performed by the motion information encoding apparatus 10 and the motion information decoding apparatus 30 according to an embodiment are described with reference to FIGS. 25 and 26.

When the motion vector resolution of the current block is greater than the minimum motion vector resolution from among the selectable candidate motion vector resolutions, the motion information encoding apparatus 10 and the motion information decoding apparatus 30 may adjust the motion vector of the candidate block that is used as the motion vector predictor of the current block.

In order to adjust a motion vector predictor expressed in coordinates within an image interpolated according to the minimum motion vector resolution to the motion vector resolution of the current block, the motion information encoding apparatus 10 and the motion information decoding apparatus 30 may adjust the motion vector predictor so that the motion vector predictor indicates neighboring pixels instead of a pixel indicated by the motion vector predictor.

Figure 25:
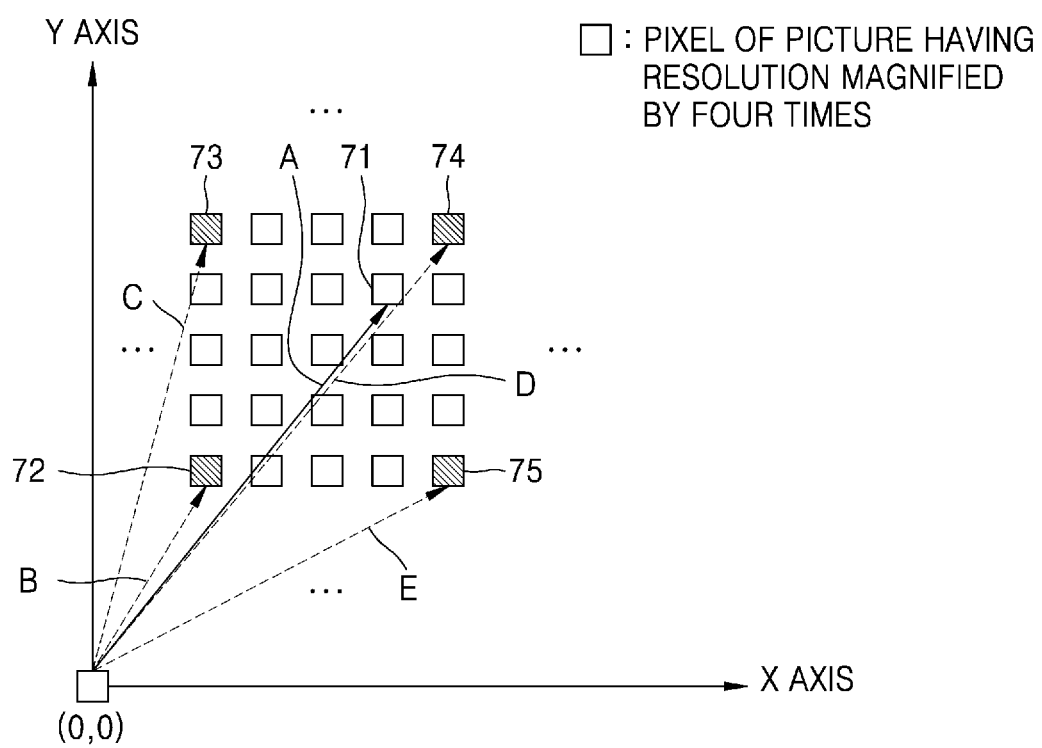
FIGS. 25 and 26 are views for explaining a method of adjusting a motion vector predictor.

For example, in FIG. 25, to adjust a motion vector predictor A indicating a pixel 71 of coordinates (19, 27) based on the coordinates (0,0) to the 1 pixel unit motion vector resolution, which is the motion vector resolution of the current block, the coordinates (19, 27) of the pixel 71 indicated by the motion vector predictor A is divided by an integer of 4 (e.g., is downscaled), and a case where coordinates (19/4, 27/4) resulting from the division do not indicate the integer pixel unit occurs.

The motion information encoding apparatus 10 and the motion information decoding apparatus 30 may adjust the downscaled motion vector predictor to indicate the integer pixel unit. For example, respective coordinates of neighboring integer pixels around the coordinates (19/4, 27/4) are (16/4, 28/4), (16/4, 24/4), (20/4, 28/4), and (20/4, 24/4). At this time, the motion information encoding apparatus 10 and the motion information decoding apparatus 30 may adjust the downscaled motion vector predictor A to indicate coordinates (20/4, 28/4) located on the upper right side instead of the coordinates (19/4, 27/4), and then again multiply the adjusted downscaled motion vector predictor A by an integer of 4 (e.g., upscaling) so that a finally adjusted motion vector predictor D indicates a pixel 74 corresponding to coordinates (20, 28).

Referring to FIG. 25, the motion vector predictor A not yet adjusted may indicate the pixel 71, and the finally adjusted motion vector predictor D may indicate the pixel 74 of an integer unit located on the upper right side.

According to an embodiment, when adjusting the motion vector predictor according to the motion vector resolution of the current block, the motion information encoding apparatus 10 and the motion information decoding apparatus 30 may allow an adjusted motion vector predictor to indicate a pixel located on an upper right side of a pixel indicated by the motion vector predictor not yet adjusted. According to another embodiment, the motion information encoding apparatus 10 and the motion information decoding apparatus 30 may allow the adjusted motion vector predictor to indicate a pixel located on a left upper side of the pixel indicated by the motion vector predictor not yet adjusted, a pixel located on a left lower side of the pixel indicated by the motion vector predictor not yet adjusted, or a pixel located on a right lower side of the pixel indicated by the motion vector predictor not yet adjusted.

According to an embodiment, one of an x-coordinate value and a y-coordinate value indicated by the downscaled motion vector predictor indicates an integer pixel, the motion information encoding apparatus 10 and the motion information decoding apparatus 30 may adjust the downscaled motion vector predictor to indicate the integer pixel by increasing or decreasing only the coordinate value not indicating the integer pixel. In other words, when the x-coordinate value indicated by the downscaled motion vector predictor indicates the integer pixel, the motion information encoding apparatus 10 and the motion information decoding apparatus 30 may allow the adjusted motion vector predictor to indicate an integer pixel located on the upper or lower side of the pixel indicated by the motion vector predictor not yet adjusted. Alternatively, when the y-coordinate value indicated by the downscaled motion vector predictor indicates the integer pixel, the motion information encoding apparatus 10 and the motion information decoding apparatus 30 may allow the adjusted motion vector predictor to indicate an integer pixel located on the left or right side of the pixel indicated by the motion vector predictor not yet adjusted.

When adjusting the motion vector predictor, the motion information encoding apparatus 10 and the motion information decoding apparatus 30 may differently select a point indicated by the adjusted motion vector predictor according to the motion vector resolution of the current block.

Figure 26:
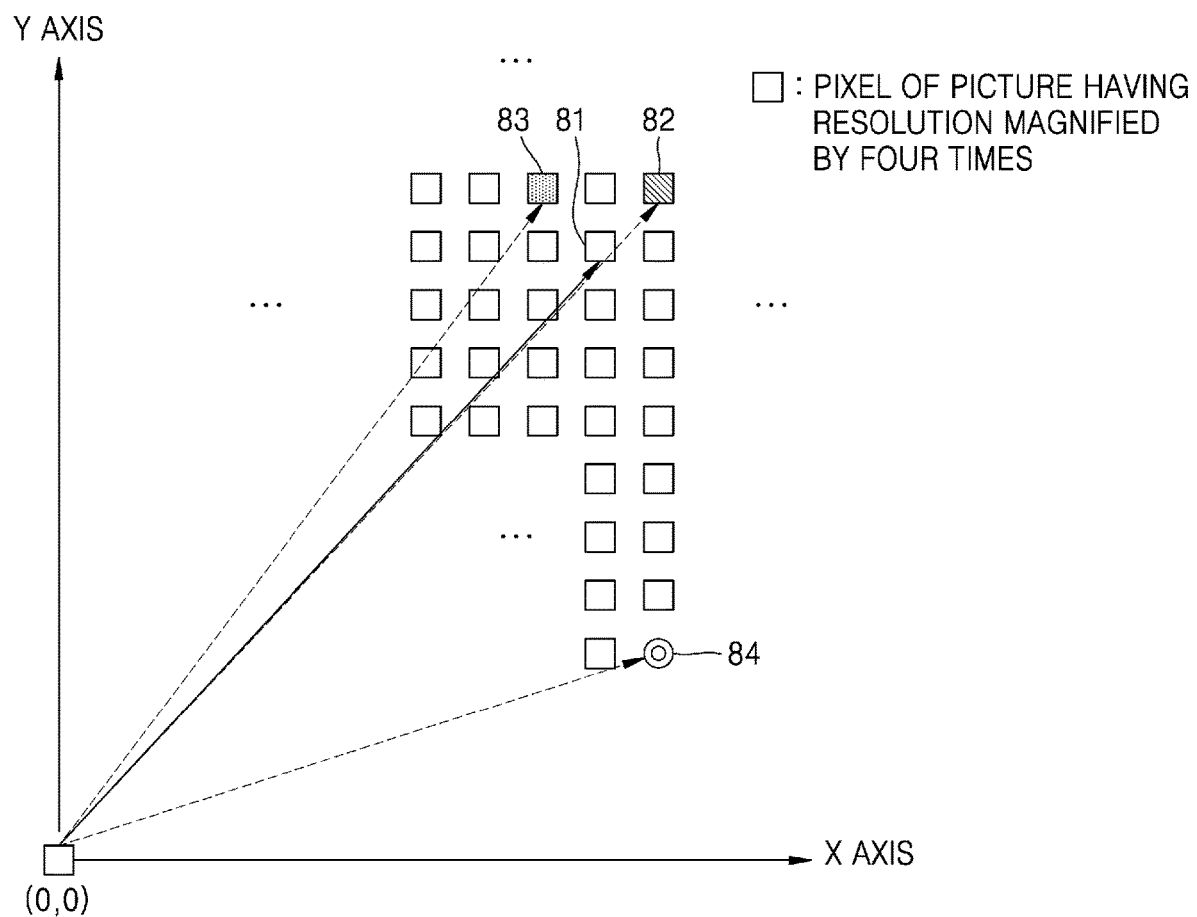

For example, referring to FIG. 26, when the motion vector resolution of the current block is the ½ pixel unit motion vector resolution, the adjusted motion vector predictor may be allowed to indicate a pixel 83 on an upper left side of a pixel 81 indicated by the motion vector predictor not yet adjusted, when the motion vector resolution of the current block is the 1 pixel unit motion vector resolution, the adjusted motion vector predictor may be allowed to indicate a pixel 82 on an upper right side of the pixel 81 indicated by the motion vector predictor not yet adjusted, and, when the motion vector resolution of the current block is the 2 pixel unit motion vector resolution, the adjusted motion vector predictor may be allowed to indicate a pixel 84 on a lower right side of the pixel 81 indicated by the motion vector predictor not yet adjusted.

The motion information encoding apparatus 10 and the motion information decoding apparatus 30 may determine which pixel is indicated by the adjusted motion vector predictor, based on at least one of the motion vector resolution of the current block, the motion vector predictor, information of a neighboring block, encoding information, or an arbitrary pattern.

The motion information encoding apparatus 10 and the motion information decoding apparatus 30 may adjust the motion vector of the candidate block by taking into account the motion vector resolution of the current block and the minimum motion vector resolution, according to Eq. 1 below.

$$pMV'=((pMV>>k)+\text{offset})<<k \quad [\text{Eq. 1}]$$

In Eq. 1, pMV' indicates the adjusted motion vector predictor and k is a value determined according to a difference between the motion vector resolution of the current block and the minimum motion vector resolution. When the motion vector resolution of the current block is a 2m pixel unit (where m is an integer), the minimum motion vector resolution is a 2n pixel unit (where n is an integer), and m>n, k may be m−n.

According to an embodiment, k may be an index of a motion vector resolution, and, when the candidate motion vector resolutions include the ¼ pixel unit motion vector resolution, the ½ pixel unit motion vector resolution, the 1 pixel unit motion vector resolution, the 2 pixel unit motion vector resolution, and the 4 pixel unit motion vector resolution, respective indexes indicating the motion vector resolutions may be determined as 0, 1, 2, 3, and 4. When receiving a motion vector resolution index from the bitstream, the motion information decoding apparatus 30 may adjust the motion vector of the candidate block according to Eq. 1, using the motion vector resolution index as k.

In Eq. 1, >> or << is a bit shift operation, and thus refers to an operation of decreasing or increasing the size of the motion vector predictor. In Eq. 1, offset refers to a value added or subtracted to indicate an integer pixel when a pMV downscaled according to the k value does not indicate an integer pixel. The offset may be differently determined for each of the x-coordinate value and the y-coordinate value of a basic MV.

According to an embodiment, the motion information encoding apparatus 10 and the motion information decoding apparatus 30 may change the downscaled pMV to indicate an integer pixel, according to the same criterion.

According to an embodiment, when the x-coordinate value and the y-coordinate value of the downscaled pMV do not indicate an integer pixel, the x-coordinate value and the y-coordinate value of the downscaled pMV may be increased always to indicate an integer pixel, and may be decreased always to indicate an integer pixel. Alternatively, the x-coordinate value and the y-coordinate value of the downscaled pMV may be rounded off to indicate an integer pixel.

According to an embodiment, when adjusting the motion vector of the candidate block, the motion information encoding apparatus 10 and the motion information decoding apparatus 30 may omit downscaling and upscaling the motion vector, and may adjust the motion vector on a coordinate plane within a reference image interpolated according to the minimum motion vector resolution so that the motion vector indicates a pixel unit corresponding to the motion vector resolution of the current block.

According to an embodiment, the motion information encoding apparatus 10 and the motion information decoding apparatus 30 may adjust the motion vector of the candidate block by taking into account the motion vector resolution of the current block and the minimum motion vector resolution, according to Eq. 2 below instead of Eq. 1 above.

$$pMV'=((pMV+\text{offset})>>k)<<k \quad [\text{Eq. 1}]$$

Eq. 2 is similar to Eq. 1, but, in contrast with Eq. 1, offset is not applied to the downscaled pMV, and offset is applied to the original pmV and then the original pmV is downscaled according to k.

The motion information encoding apparatus 10 searches for the motion vector of the current block with the motion vector resolution of the current block, and obtains a difference between the motion vector of the current block and the selectively adjusted motion vector predictor as the differential motion vector.

The motion information encoding apparatus 10 may determine the differential motion vector as in Eq. 3 below and encode the differential motion vector. In Eq. 3, MV indicates the motion vector of the current block, pMV' indicates the adjusted motion vector predictor, and MVD indicates the differential motion vector.

$$MVD=MV-pMV' \quad [\text{Eq. 3}]$$

The motion information encoding apparatus 10 may downscale the differential motion vector as in Eq. 4 below when the motion vector resolution of the current block is greater than the minimum motion vector resolution, and may generate a bitstream including information representing the downscaled differential motion vector.

$$MVD'=(MVD>>k) \quad [\text{Eq. 4}]$$

In Eq. 4, MVD' indicates the downscaled differential motion vector, and k is a value determined according to a difference between the minimum motion vector resolution and the motion vector resolution of the current block, and is the same as k of Eq. 1 above.

According to an embodiment, the motion information encoding apparatus 10 may downscale the motion vector of the current block and the motion vector predictor (or the adjusted motion vector predictor) according to the k value, and then may encode a difference between the two values of the motion vector of the current block and the motion vector predictor as the differential motion vector.

According to an embodiment, the motion information encoding apparatus 10 may calculate the downscaled differential motion vector according to Eq. 5 below instead of Eqs. 3 and 4.

$$MVD'=(MV-pMV')/(R \times S) \quad [\text{Eq. 5}]$$

In Eq. 5, MVD' indicates the downscaled differential motion vector, MV indicates the motion vector of the current block, and pMV' indicates the adjusted motion vector predictor. In Eq. 5, R indicates a pixel unit value of the motion vector resolution of the current block, for example, R is ¼ in case of the ¼ pixel unit motion vector resolution. In Eq. 5, S is a reciprocal of the pixel unit value of the minimum motion vector resolution, and indicates 4 when the minimum motion vector resolution is the ¼ pixel unit.

The motion information decoding apparatus 30 may reconstruct the motion vector of the current block using the differential motion vector and at least one of information representing the motion vector resolution of the current block or information representing the candidate block obtained from the bitstream.

When the motion vector resolution of the current block is greater than the minimum motion vector resolution, the motion information decoding apparatus 30 may adjust the motion vector predictor as shown in Eq. 1 or Eq. 2.

When the motion vector resolution of the current block is greater than the minimum motion vector resolution, the motion information decoding apparatus 30 may upscale differential motion data as shown in Eq. 6 below.

$$MVD''=(MVD'<<k) \quad [\text{Eq. 6}]$$

In Eq. 6, MVD' indicates a downscaled differential motion vector on the side of an encoding apparatus, and MVD'' indicates an upscaled differential motion vector. In Eq. 6, k is a value determined according to a difference between the minimum motion vector resolution and the motion vector resolution of the current block, and is the same as k of Eq. 1 above.

The motion information decoding apparatus 30 may decode the motion vector of the current block by summing the motion vector predictor and the differential motion vector both selectively adjusted according to the difference between the sizes of the minimum motion vector resolution and the motion vector resolution of the current block.

According to an embodiment, the motion information decoding apparatus 30 may determine the upscaled differential motion vector according to Eq. 7 below instead of Eq. 6 above.

$$MVD''=MVD'*(R \times S) \quad [\text{Eq. 7}]$$

In Eq. 7, MVD' indicates a downscaled differential motion vector, and R indicates a pixel unit value of the motion vector resolution of the current block, for example, R is ¼ in case of the ¼ pixel unit motion vector resolution. In Eq. 7, S is a reciprocal of the pixel unit value of the minimum motion vector resolution, and indicates 4 when the minimum motion vector resolution is the ¼ pixel unit.

According to an embodiment, when the motion vector resolution of the current block is less than the 1 pixel unit motion vector resolution, the motion information decoding apparatus 30 may interpolate the reference image according to the minimum motion vector resolution and then may search for the prediction block according to the motion vector of the current block. When the motion vector resolution of the current block is equal to or greater than the 1 pixel unit motion vector resolution, the motion information decoding apparatus 30 may search for the prediction block according to the motion vector of the current block without interpolating the reference image.

A motion information encoding method and a motion information decoding method in which a motion vector resolution set is determined for each slice or sequence are described with reference to FIGS. 27 and 28.

Figure 27:
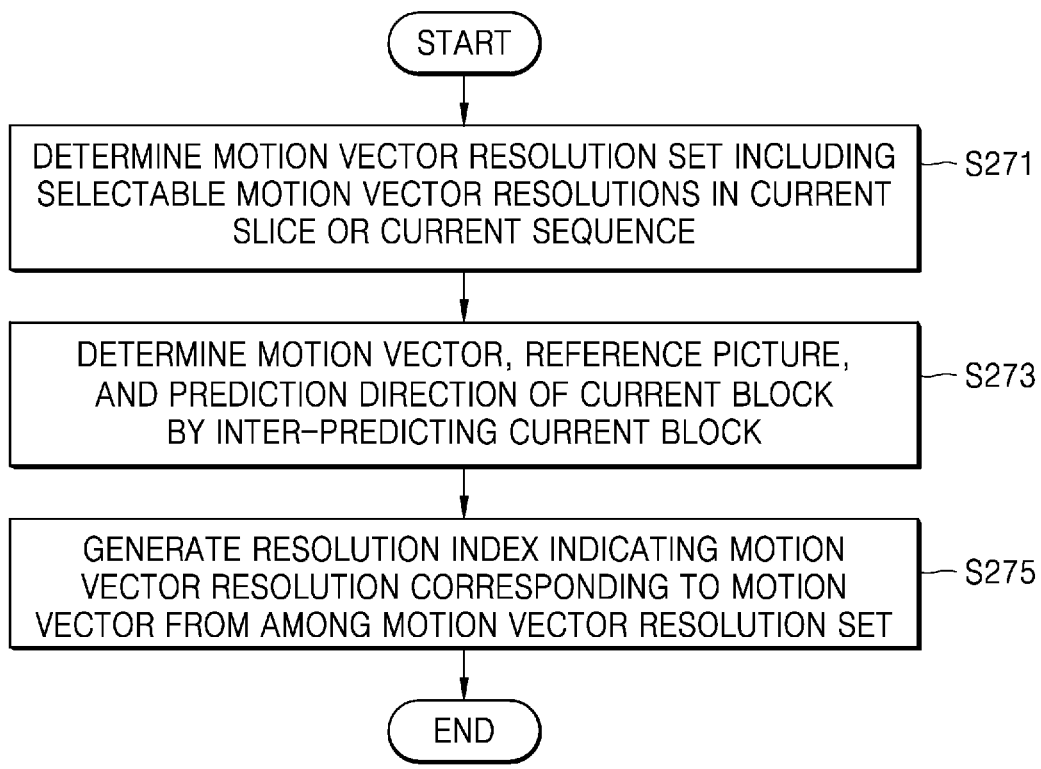
FIG. 27 is a flowchart of a motion information encoding method according to another embodiment.

FIG. 27 is a flowchart of a motion information encoding method according to another embodiment.

In operation S271, the motion information encoding apparatus 10 according to another embodiment may determine the motion vector resolution set including selectable motion vector resolutions in a current slice or current sequence.

For example, when the pictures included in a reference picture list are all close to current pictures, a relatively high motion vector resolution is needed so that a finer motion expression is possible. Alternatively or additionally, when the pictures included in the reference picture list are far from the current pictures, a relatively low motion vector resolution is needed.

Accordingly, the motion information encoding apparatus 10 may determine whether each motion vector resolution is usable in the current slice or the current picture.

For example, the motion information encoding apparatus 10 may determine whether each of the motion vector resolutions of the ¼-, ½-, 1-, 2-, and 4-pixel units is usable in the current slice. As another example, the motion information encoding apparatus 10 may determine whether each of the motion vector resolutions of the ¼-, ½-, 1-, 2-, and 4-pixel units is usable in the current picture.

For example, when a preset number of motion vector resolution sets are usable, the motion information encoding apparatus 10 may determine which set may be used in the current slice. As another example, when a preset number of motion vector resolution sets are usable, the motion information encoding apparatus 10 may determine which set may be used in the current picture.

The motion information encoding apparatus 10 may also determine how to determine a motion vector resolution set (e.g., whether to determine motion vector resolution or which motion vector resolution set is to be determined), for each of the coding units included in the current slice or the current picture, according to the number of candidate resolutions included in the motion vector resolution set.

In operation S273, the motion information encoding apparatus 10 according to another embodiment may determine the motion vector, the reference picture, and the prediction direction of the current block by inter-predicting the current block, based on the motion vector resolution set determined in operation S271.

An operation of determining the motion vector of the current block through motion estimation of the current block and determining the remaining pieces of motion information is the same as described above with reference to FIGS. 17 and 18.

In operation S275, the motion information encoding apparatus 10 according to another embodiment may generate a resolution index indicating a motion vector resolution corresponding to the motion vector from among the motion vector resolution set.

For example, the motion information encoding apparatus 10 may generate a flag indicating whether each of the motion vector resolutions of the ¼-, ½-, 1-, 2-, and 4-pixel units is usable in the current slice. As another example, the motion information encoding apparatus 10 may generate a flag indicating whether each of the motion vector resolutions of the ¼-, ½-, 1-, 2-, and 4-pixel units is usable in the current sequence.

For example, when a preset number of motion vector resolution sets are usable, the motion information encoding apparatus 10 may generate information representing which set may be used in the current slice. As another example, when a preset number of motion vector resolution sets are usable, the motion information encoding apparatus 10 may generate information representing which set may be used in the current sequence.

The motion information encoding apparatus 10 may individually set information for determining the motion vector resolution set, for each of the coding units included in the current slice or the current picture, according to the number of candidate resolutions included in motion vector resolution sets usable in the current slice or the current sequence. For example, the motion information encoding apparatus 10 may generate a flag indicating whether each motion vector resolution is usable or may generate information representing which motion vector resolution set may be used, for each coding unit, according to the number of candidate resolutions included in motion vector resolution sets usable in the current slice or the current sequence.

Whether each motion vector resolution is usable or which motion vector resolution set is to be used, as exemplified above, may be determined for each sequence, each picture, each slice, or each tile. Thus, at least one of the flag indicating whether each motion vector resolution is usable or the information representing which motion vector resolution set may be used may be defined for each sequence parameter set (SPS), each picture parameter set (PPS), each slice header, or each tile.

For example, which set from among the motion vector resolution set $\{¼, ½, 1\}$ or $\{¼, 1, 4\}$ is used may be determined for the current slice. Thus, information representing which set from among the motion vector resolution set $\{¼, ½, 1\}$ or $\{¼, 1, 4\}$ is used may be included in a slice header for the current slice. As another example, which set from among the motion vector resolution set $\{¼, ½, 1\}$ or $\{¼, 1, 4\}$ is used may be determined for the current sequence. Thus, information representing which set from among the motion vector resolution set $\{¼, ½, 1\}$ or $\{¼, 1, 4\}$ is used may be included in an SPS for the current sequence.

As another example, when whether each motion vector resolution is usable in the current slice or the current sequence is determined, a resolution index indicating a resolution determined to be used from among a set including only usable motion vector resolutions may be generated for a coding unit included in the current slice. In detail, a flag indicating whether each of the motion vector resolutions of the ¼-, ½-, 1-, 2-, and 4-pixel units is usable may be included in the SPS or slice header, and only a resolution index may be signaled for each coding unit. Because a motion vector resolution set including only usable motion vector resolutions is used in a sequence, the number of bits of an index for expressing a resolution index determined for each coding unit may be reduced.

Figure 28:
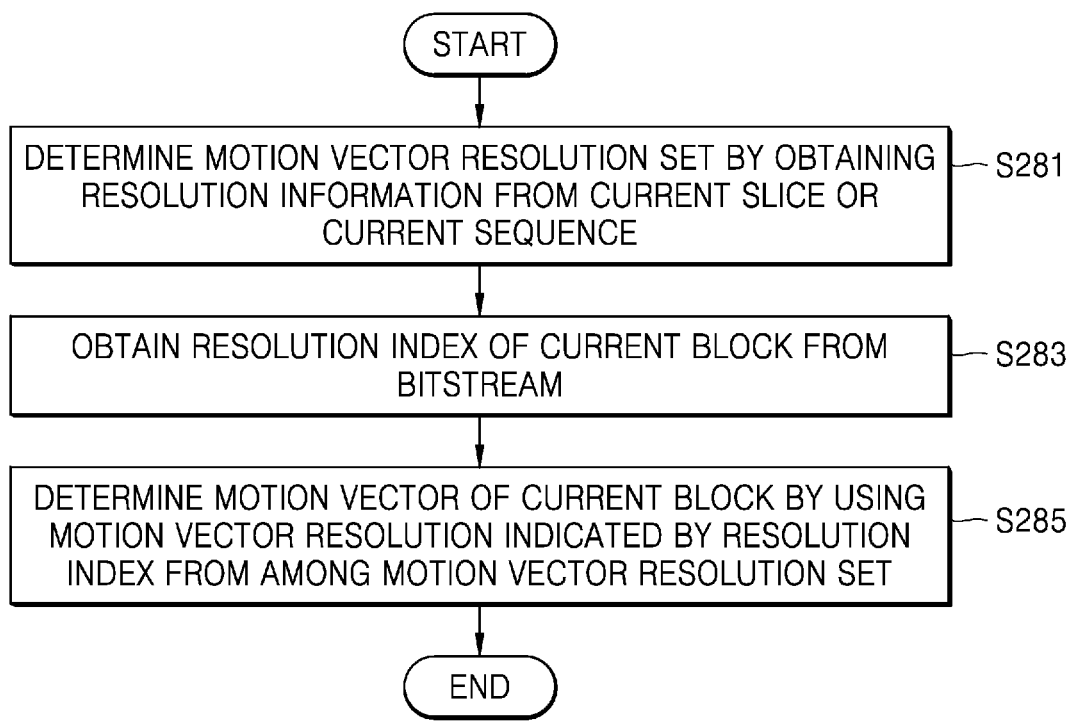
FIG. 28 is a flowchart of a motion information decoding method according to another embodiment.

FIG. 28 is a flowchart of a motion information decoding method according to another embodiment.

In operation S281, the motion information decoding apparatus 30 according to another embodiment may determine a motion vector resolution set by obtaining resolution information from a current slice or current sequence.

In operation S283, the motion information decoding apparatus 30 according to another embodiment may obtain the resolution index of the current block from the bitstream.

For example, the motion information decoding apparatus 30 may obtain, from the bitstream, the flag indicating whether each of the motion vector resolutions of the ¼-, ½-, 1-, 2-, and 4-pixel units is usable in the current slice. As another example, the motion information decoding apparatus 30 may obtain, from the SPS, the flag indicating whether each of the motion vector resolutions of the ¼-, ½-, 1-, 2-, and 4-pixel units is usable in the current sequence.

For example, when a preset number of motion vector resolution sets are usable, the motion information decoding apparatus 30 may obtain, from the slice header, the information representing which set may be used in the current slice. As another example, when a preset number of motion vector resolution sets are usable, the motion information decoding apparatus 30 may obtain, from the SPS, the information representing which set may be used in the current sequence.

Information for determining the motion vector resolution set may be individually obtained for each of the coding units included in the current slice or the current picture, according to the number of candidate resolutions included in motion vector resolution sets usable in the current slice or the current sequence. For example, a flag indicating whether each motion vector resolution is usable may be obtained or information representing which motion vector resolution set may be used may be obtained, for each coding unit, according to the number of candidate resolutions included in motion vector resolution sets usable in the current slice or the current sequence.

At least one of the flag indicating whether each motion vector resolution is usable or the information representing which motion vector resolution set may be used may be obtained for each SPS, each PPS, each slice header, or each tile. Thus, whether each motion vector resolution is usable or which motion vector resolution set is to be used may be determined for each sequence, each picture, each slice, or each tile.

For example, information representing which set from among the motion vector resolution set $\{¼, ½, 1\}$ or $\{¼, 1, 4\}$ is used may be obtained from the slice header for the current slice. Thus, which set from among the motion vector resolution set $\{¼, ½, 1\}$ or $\{¼, 1, 4\}$ is used may be determined for the current slice according to the obtained information. As another example, information representing which set from among the motion vector resolution set $\{¼, ½, 1\}$ or $\{¼, 1, 4\}$ is used may be obtained from the SPS for the current sequence. Thus, which set from among the motion vector resolution set $\{¼, ½, 1\}$ or $\{¼, 1, 4\}$ is used may be determined for the current sequence according to the obtained information.

As another example, when whether each motion vector resolution is usable in the current slice or the current sequence is determined, a resolution index based on a set including only usable motion vector resolutions may be obtained for a coding unit included in the current slice or current sequence. A flag indicating whether each of the motion vector resolutions of the ¼-, ½-, 1-, 2-, and 4-pixel units is usable may be obtained from the SPS or slice header, and a resolution index indicating one from among the set including only usable motion vector resolutions may be obtained for each coding unit. Thus, a motion vector resolution for a current coding unit may be determined from among the set including only usable motion vector resolutions in the current slice or the current sequence.

In operation S285, the motion information decoding apparatus 30 according to another embodiment may determine the motion vector of the current block using the motion vector resolution indicated by the resolution index from among the motion vector resolution set.

An operation of reconstructing the current block using the motion vector of the current block is the same as described above with reference to FIGS. 19 and 20.

The above-described embodiments can be written as computer-executable programs, and the written computer-executable programs can be stored in a medium.

The medium may continuously store the computer-executable programs, or temporarily store the computer-executable programs for execution or downloading. Alternatively or additionally, the medium may be any one of various recording media or storage media in which a single piece or plurality of pieces of hardware are combined, and the medium is not limited to a medium directly connected to a computer system, but may be distributed on a network. Examples of the medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a ROM, a random-access memory (RAM), and a flash memory, which are configured to store program instructions. Other examples of the medium include recording media and storage media managed by application stores distributing applications or by websites, servers, and the like supplying or distributing other various types of software.

While one or more embodiments of the disclosure have been described with reference to the figures, it may be understood by those of ordinary skill in the art that various changes in form and details may be made therein without departing from the spirit and scope as defined by the following claims.

What is claimed is:

1. A method of decoding motion information, comprising:
    obtaining, from a bitstream, a resolution index indicating a motion vector resolution for inter-predicting a current block, a reference index of the current block, and prediction direction information of the current block;
    determining a reference picture of the current block using the reference index of the current block;
    determining whether a prediction direction of the current block is unidirectional prediction in an L0 or L1 direction or bidirectional prediction, using the prediction direction information of the current block;
    determining a motion vector resolution set including one or more selectable motion vector resolutions, based on at least one of the reference picture of the current block or the prediction direction;
    determining a motion vector based on the prediction direction, according to the motion vector resolution indicated by the resolution index from among the motion vector resolution set; and
    reconstructing an image using the motion vector,
    wherein determining the motion vector resolution set comprises:
        when a picture order count (POC) distance between a current picture including the current block and the reference picture of the current block is less than a first preset POC distance, determining a first motion vector resolution set including one or more first motion vector resolutions from among the one or more selectable motion vector resolutions;
        when the POC distance between the current picture and the reference picture is greater than a second preset POC distance, determining a second motion vector resolution set including one or more second motion vector resolutions from among the one or more selectable motion vector resolutions; and
        when the POC distance between the current picture and the reference picture is greater than or equal to the first preset POC distance and less than or equal to the second preset POC distance, determining a third motion vector resolution set including one or more third motion vector resolutions from among the one or more selectable motion vector resolutions,
    wherein the first motion vector resolution set, the second motion vector resolution set, and the third motion vector resolution set are different from one another, and a first highest motion vector resolution included in the first motion vector resolution set is greater than or equal to a second highest motion vector resolution included in the second motion vector resolution set,
    wherein a third highest motion vector resolution included in the third motion vector resolution set is within a first precision range of first motion vector resolutions included in the first motion vector resolution set, and a lowest motion vector resolution included in the third motion vector resolution set is within a second precision range of second motion vector resolutions included in the second motion vector resolution set,
    wherein a number of motion vector resolutions included in the first motion vector resolution set is equal to a number of motion vector resolutions included in the second motion vector resolution set, and
    wherein a number of motion vector resolutions included in the third motion vector resolution set is greater than the number of motion vector resolutions included in the first motion vector resolution set.

2. The method of claim 1, wherein the motion vector resolution set includes at least one of a ¼-pixel unit, a ½-pixel unit, a 1-pixel unit, a 2-pixel unit, or a 4-pixel unit.

3. The method of claim 1, wherein determining the motion vector resolution set further comprises:
    when the POC distance between the current picture and the reference picture is less than a preset POC distance, determining the first motion vector resolution set including the one or more first motion vector resolutions from among the one or more selectable motion vector resolutions; and
    when the POC distance between the current picture and the reference picture is greater than or equal to the preset POC distance, determining the second motion vector resolution set including second one or more motion vector resolutions from among the one or more selectable motion vector resolutions,
    wherein the first motion vector resolution set is different from the second motion vector resolution set, and the first highest motion vector resolution included in the first motion vector resolution set is greater than or equal to the second highest motion vector resolution included in the second motion vector resolution set.

4. The method of claim 1, wherein determining the motion vector resolution set comprises:
    when the prediction direction of the current block is unidirectional prediction, determining the first motion vector resolution set including the one or more first motion vector resolutions from among the one or more selectable motion vector resolutions; and when the prediction direction of the current block is bidirectional prediction, determining the second motion vector resolution set including the one or more second motion vector resolutions from among the one or more selectable motion vector resolutions, wherein the first motion vector resolution set is different from the second motion vector resolution set, and the first highest motion vector resolution included in the first motion vector resolution set is greater than or equal to the second highest motion vector resolution included in the second motion vector resolution set.

5. The method of claim 1, wherein determining the motion vector resolution set comprises:

when the prediction direction of the current block is unidirectional prediction, determining the first motion vector resolution set including the one or more first motion vector resolutions from among the one or more selectable motion vector resolutions; and when the prediction direction of the current block is bidirectional prediction, determining, for a L0 motion vector, the second motion vector resolution set including the one or more second motion vector resolutions from among the one or more selectable motion vector resolutions, and determining, for a L1 motion vector, the third motion vector resolution set including the one or more third motion vector resolutions from among the one or more selectable motion vector resolutions.

6. The method of claim 1, wherein determining the motion vector resolution set comprises:

when the prediction direction of the current block is unidirectional prediction and the POC distance between the current picture and the reference picture is less than the first preset POC distance, determining the first motion vector resolution set including the one or more first motion vector resolutions from among the one or more selectable motion vector resolutions; and when the prediction direction of the current block is unidirectional prediction and the POC distance between the current picture and the reference picture is greater than or equal to the first preset POC distance, determining the second motion vector resolution set including one or more motion second vector resolutions from among the one or more selectable motion vector resolutions.

7. The method of claim 1, wherein determining the motion vector resolution set comprises:

when the prediction direction of the current block is bidirectional prediction, the POC distance between the current picture and an L0 reference picture of the current block is less than the second preset POC distance, and the POC distance between the current picture including the current block and an L1 reference picture of the current block is less than the first preset POC distance, determining the first motion vector resolution set for an L0 motion vector and an L1 motion vector; and when the prediction direction of the current block is bidirectional prediction, the POC distance between the current picture including the current block and the L0 reference picture of the current block is greater than or equal to the second preset POC distance, and the POC distance between the current picture including the current block and the L1 reference picture of the current block is greater than or equal to the first preset POC distance, determining the second motion vector resolution set for the L0 motion vector and the L1 motion vector.

8. The method of claim 5, wherein determining the motion vector comprises applying the resolution index applied to the second motion vector resolution set for the L0 motion vector, to the third motion vector resolution set for the L1 motion vector.

9. The method of claim 5, wherein obtaining the resolution index comprises obtaining an L0 resolution index indicating an L0 motion vector resolution and an L1 resolution index indicating an L1 motion vector resolution.

10. The method of claim 1, wherein determining the motion vector comprises determining a debinarization method for parsing the resolution index, based on the determined motion vector resolution set.

11. The method of claim 1, wherein determining the motion vector resolution set comprises determining a predictor candidate list including a selectable motion vector predictor candidate, based on the determined motion vector resolution set, when the motion vector resolution of the current block is coupled to a motion vector predictor candidate.

12. An apparatus for decoding motion information, comprising:

an obtainer configured to obtain, from a bitstream, a resolution index indicating a motion vector resolution for inter-predicting a current block, a reference index of the current block, and prediction direction information of the current block;

a prediction decoder configured to:

determine a reference picture of the current block using the reference index of the current block, determine whether a prediction direction of the current block is unidirectional prediction in an L0 or L1 direction or bidirectional prediction, using the prediction direction information of the current block, determine a motion vector resolution set including one or more selectable motion vector resolutions, based on at least one of a picture order count (POC) distance between a current picture including the current block and the reference picture of the current block or the prediction direction of the current block, determine a motion vector based on the prediction direction, according to the motion vector resolution indicated by the resolution index from among the motion vector resolution set, and reconstruct an image using the motion vector, wherein the prediction decoder is further configured to:

when the POC distance between the current picture and the reference picture is less than a first preset POC distance, determine a first motion vector resolution set including one or more first motion vector resolutions from among the one or more selectable motion vector resolutions, when the POC distance between the current picture and the reference picture is greater than a second preset POC distance, determine a second motion vector resolution set including one or more second motion vector resolutions from among the one or more selectable motion vector resolutions, and when the POC distance between the current picture and the reference picture is greater than or equal to the first preset POC distance and less than or equal to the second preset POC distance, determine a third motion vector resolution set including one or more third motion vector resolutions from among the one or more selectable motion vector resolutions, wherein the first motion vector resolution set, the second motion vector resolution set, and the third motion vector resolution set are different from one another, and a first highest motion vector resolution included in the first motion vector resolution set is greater than or equal to a second highest motion vector resolution included in the second motion vector resolution set, wherein a third highest motion vector resolution included in the third motion vector resolution set is within a first precision range of first motion vector resolutions included in the first motion vector resolution set, and a lowest motion vector resolution included in the third motion vector resolution set is within a second precision range of second motion vector resolutions included in the second motion vector resolution set, wherein a number of motion vector resolutions included in the first motion vector resolution set is equal to a number of motion vector resolutions included in the second motion vector resolution set, and wherein a number of motion vector resolutions included in the third motion vector resolution set is greater than the number of motion vector resolutions included in the first motion vector resolution set.

13. A method of encoding motion information, comprising:

determining a motion vector, a reference picture, and a prediction direction of a current block by inter-predicting the current block;

determining a motion vector resolution set including one or more selectable motion vector resolutions, based on at least one of a picture order count (POC) distance between a current picture including the current block and the reference picture of the current block or the prediction direction;

generating a resolution index indicating a motion vector resolution; and inter-predicting the current block from among the determined motion vector resolution set, using the resolution index, wherein determining the motion vector resolution set comprises:

when the POC distance between the current picture and the reference picture is less than a first preset POC distance, determining a first motion vector resolution set including one or more first motion vector resolutions from among the one or more selectable motion vector resolutions;

when the POC distance between the current picture and the reference picture is greater than a second preset POC distance, determining a second motion vector resolution set including one or more second motion vector resolutions from among the one or more selectable motion vector resolutions; and when the POC distance between the current picture and the reference picture is greater than or equal to the first preset POC distance and less than or equal to the second preset POC distance, determining a third motion vector resolution set including one or more third motion vector resolutions from among the one or more selectable motion vector resolutions, wherein the first motion vector resolution set, the second motion vector resolution set, and the third motion vector resolution set are different from one another, and a first highest motion vector resolution included in the first motion vector resolution set is greater than or equal to a second highest motion vector resolution included in the second motion vector resolution set, wherein a third highest motion vector resolution included in the third motion vector resolution set is within a first precision range of first motion vector resolutions included in the first motion vector resolution set, and a lowest motion vector resolution included in the third motion vector resolution set is within a second precision range of second motion vector resolutions included in the second motion vector resolution set, wherein a number of motion vector resolutions included in the first motion vector resolution set is equal to a number of motion vector resolutions included in the second motion vector resolution set, and wherein a number of motion vector resolutions included in the third motion vector resolution set is greater than the number of motion vector resolutions included in the first motion vector resolution set.

* * * * *